(12) United States Patent
Wu et al.

(10) Patent No.: US 12,716,729 B2
(45) Date of Patent: Aug. 25, 2026

(54) POSITIONING METHOD AND APPARATUS

(71) Applicant: Yinwang Intelligent Technologies Co., Ltd., Shenzhen (CN)

(72) Inventors: Yong Wu, Beijing (CN); Lei Wan, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 255 days.

(21) Appl. No.: 17/896,960

(22) Filed: Aug. 26, 2022

(65) Prior Publication Data

US 2022/0412746 A1 Dec. 29, 2022

Related U.S. Application Data

(63) Continuation of application No. PCT/CN2020/077297, filed on Feb. 28, 2020.

(51) Int. Cl.
*G01C 21/00* (2006.01)
*G01C 21/30* (2006.01)

(52) U.S. Cl.
CPC .................................... *G01C 21/30* (2013.01)

(58) Field of Classification Search
CPC .... G01C 21/30; G08G 1/0112; G08G 1/0116; G08G 1/0133; G08G 1/0141; H04W 4/02; H04W 4/44
See application file for complete search history.

(56) References Cited

U.S. PATENT DOCUMENTS 7,114,388 B1 * 10/2006 French .................... G01W 1/00 73/170.16
8,872,889 B2 * 10/2014 Soucy .................... G01C 21/20 348/42

(Continued)

FOREIGN PATENT DOCUMENTS

CN 106969779 A 7/2017
CN 109540148 A 3/2019
CN 110296686 A 10/2019

OTHER PUBLICATIONS

Wen, T et al, High Precision Target Positioning Method for RSU in Cooperative Perception, 2019 IEEE 21st International Workshop on Multimedia Signal Processing (MMSP), Kuala Lumpur, Malaysia, 2019, pp. 1-6 [online], [retrieved Jul. 13, 2024]. Retrieved from: <https://ieeexplore.ieee.org/document/8901755> (Year: 2019).*

(Continued)

*Primary Examiner* — Peter D Nolan
*Assistant Examiner* — Peter Y Ning
(74) *Attorney, Agent, or Firm* — Leydig, Voit & Mayer, Ltd.

(57) ABSTRACT

A positioning method and related apparatus are provided. The method includes obtaining information about a first coordinate system relative to a second coordinate system, wherein the first coordinate system is a coordinate system used by a measurement device, the second coordinate system is a coordinate system used by a map, and the information about the first coordinate system relative to the second coordinate system includes translation information and rotation information that are from the first coordinate system to the second coordinate system; obtaining, by the measurement device, a position of a measurement target in the first coordinate system through measurement; and determining a position of the measurement target in the second coordinate system based on the information about the first (Continued)

coordinate system relative to the second coordinate system and the position of the measurement target in the first coordinate system.

30 Claims, 13 Drawing Sheets

(56) References Cited

U.S. PATENT DOCUMENTS

| | | | | |
|---|---|---|---|---|
| 2008/0177417 | A1* | 7/2008 | Kasuga | G05B 19/41875 700/213 |
| 2016/0236523 | A1* | 8/2016 | Moreau | B60C 23/0474 |
| 2019/0220003 | A1* | 7/2019 | Sharma | G01C 21/32 |
| 2019/0265222 | A1* | 8/2019 | Troxler | G01N 9/00 |
| 2019/0301873 | A1* | 10/2019 | Prasser | G01C 21/3848 |
| 2020/0339124 | A1* | 10/2020 | Vassilovski | B60W 30/18159 |
| 2021/0092292 | A1* | 3/2021 | Shah | H04N 23/90 |
| 2021/0102811 | A1* | 4/2021 | Zhang | G01C 21/1652 |
| 2021/0333092 | A1* | 10/2021 | Yamaguchi | B25J 13/02 |
| 2022/0163680 | A1* | 5/2022 | Kato | G01S 19/393 |
| 2022/0412746 | A1* | 12/2022 | Wu | G08G 1/0116 |
| 2024/0236626 | A1* | 7/2024 | Li | H04L 67/289 |

OTHER PUBLICATIONS

Wen et al., "High Precision Target Positioning Method for RSU in Cooperative Perception," 2019 IEEE 21st International Workshop on Multimedia Signal Processing (MMSP), Total 6 pages, Institute of Electrical and Electronics Engineers, New York, New York (Sep. 27-29, 2019).

Yang et al., "Large-scale 3D Semantic Mapping Using Stereo Vision," International Journal of Automation and Computing, vol. 15, No. 2, pp. 194-206, Springer (Issue Date: Apr. 2018).

Arnold et al., "Cooperative Perception for 3D Object Detection in Driving Scenarios Using Infrastructure Sensors," IEEE Transactions on Intelligent Transportation Systems, vol. 23, No. 3, Mar. 2022, pp. 1852-1864, Institute of Electrical and Electronics Engineers, New York, New York (Oct. 16, 2020).

* cited by examiner

POSITIONING METHOD AND APPARATUS

CROSS-REFERENCE TO RELATED APPLICATIONS

This application is a continuation of International Application No. PCT/CN2020/077297, filed on Feb. 28, 2020, the disclosure of which is hereby incorporated by reference in its entirety.

TECHNICAL FIELD

Embodiments of this application relate to the field of autonomous driving or assisted driving technologies, and in particular, to a positioning method and apparatus.

BACKGROUND

With rapid development of artificial intelligence, assisted driving and autonomous driving emerge accordingly. When enabling an assisted driving function or an autonomous driving function, a vehicle needs to sense a surrounding driving environment, for example, sense information such as a pedestrian, a vehicle, a lane line, a drivable area, and an obstacle on a driving path, to avoid collision with another vehicle, the pedestrian, or the obstacle, a deviation from the lane line, or the like.

Currently, in the prior art, precision of obtaining a position of a measurement target by a vehicle cannot meet a requirement of autonomous driving. How the vehicle accurately obtains position information of the measurement target in a surrounding environment is a current research hotspot.

SUMMARY

This application provides a positioning method and apparatus, so that a vehicle can accurately obtain position information of a measurement target in a surrounding environment.

According to a first aspect, an embodiment of this application provides a positioning method, including:

obtaining information about a first coordinate system relative to a second coordinate system, where the first coordinate system is a coordinate system used by a measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system; obtaining a position of a measurement target in the first coordinate system, where the position of the measurement target in the first coordinate system is obtained by the measurement device through measurement; and determining a position of the measurement target in the second coordinate system based on the information about the first coordinate system relative to the second coordinate system and the position of the measurement target in the first coordinate system.

The method may be performed by a first device. The first device may be a communications device or a communications apparatus that can support the communications device in implementing a function of the method, for example, a chip system. For example, the first device may be a terminal device, a map server, a road side unit, a vehicle, or a vehicle-mounted apparatus. In a possible implementation, the measurement device includes a road side unit, a measurement apparatus in a road side unit, a vehicle, or a measurement apparatus in a vehicle.

In this embodiment of this application, after obtaining the information about the first coordinate system relative to the second coordinate system and the position of the measurement target in the first coordinate system, the first device may transform the position of the measurement target in the first coordinate system into the position of the measurement target in the second coordinate system based on the information about the first coordinate system relative to the second coordinate system. Because the coordinate system used by the map is the second coordinate system, a position of the measurement target relative to another device (for example, a self-driving car) that uses the map may be further accurately determined. Therefore, according to the foregoing method, a relatively large positioning error caused by an offset error of a coordinate system can be avoided, and a relatively high-precision coordinate system can be fully used for positioning, thereby improving autonomous driving safety.

In a possible design, a manner of the obtaining information about a first coordinate system relative to a second coordinate system may include:

obtaining an identifier of the measurement device; and obtaining the information about the first coordinate system relative to the second coordinate system based on the identifier of the measurement device. The identifier of the measurement device may include one or more of the following: a number of the measurement device in the second coordinate system, or a unique number of the measurement device. Therefore, position information of the measurement device in the second coordinate system is determined by using the identifier of the measurement device, and the information about the first coordinate system relative to the second coordinate system is further determined, to distinguish between different second coordinate systems used by different maps, thereby effectively distinguishing between different information about the first coordinate system relative to the second coordinate systems, and improving precision of relative positions of measurement targets relative to the vehicle in different map coordinate systems.

In a possible design, the first device may obtain the information about the first coordinate system relative to the second coordinate system in the following manners.

Manner 1: The first device may read the information about the first coordinate system relative to the second coordinate system from a memory.

Example a1: The first device is the map server. The map server stores the information about the first coordinate system relative to the second coordinate system. The map server reads, from the memory, the information that is about the first coordinate system relative to the second coordinate system and that is obtained when the measurement device determines the position of the measurement target in the first coordinate system.

Example b1: The first device is the measurement device (for example, the road side unit or the vehicle is used as the measurement device). The measurement device stores the information about the first coordinate system relative to the second coordinate system. The measurement device reads, from the memory, the information that is about the first coordinate system relative to the second coordinate system and that is obtained when the measurement device determines the position of the measurement target in the first coordinate system.

Example c1: The first device is the vehicle-mounted apparatus. The vehicle-mounted apparatus stores the information about the first coordinate system relative to the second coordinate system. The vehicle-mounted apparatus reads, from the memory, the information that is about the first coordinate system relative to the second coordinate system and that is obtained when the measurement device determines the position of the measurement target in the first coordinate system.

According to the foregoing method in which the first device obtains the information about the first coordinate system relative to the second coordinate system from the memory, the information is easily obtained and an obtaining speed is relatively fast, thereby avoiding a possible delay that is of obtaining the information about the first coordinate system relative to the second coordinate system in a network and that is caused by signaling interaction.

Manner 2: The first device may receive the information about the first coordinate system relative to the second coordinate system by using a receiver.

Example a2: The first device is the map server. The measurement device (for example, the road side unit or the vehicle is used as the measurement device) stores the information about the first coordinate system relative to the second coordinate system. The map server receives, from the measurement device, the information that is about the first coordinate system relative to the second coordinate system and that is obtained when the measurement device determines the position of the measurement target in the first coordinate system. According to the foregoing method, in a manner in which the measurement device actively sends the information about the first coordinate system relative to the second coordinate system, the first device does not need to request the information, thereby reducing signaling overheads.

The map server may further send a query request for the information about the first coordinate system relative to the second coordinate system to the measurement device. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system. According to the foregoing method, the measurement device sends the information about the first coordinate system relative to the second coordinate system only when the first device requests the information, so that the measurement device can be prevented from sending the information about the first coordinate system relative to the second coordinate system to an irrelevant device, thereby protecting privacy of the measurement device, and reducing signaling overheads.

Example b2: The first device is the measurement device (for example, the road side unit or the vehicle is used as the measurement device). The map server stores the information about the first coordinate system relative to the second coordinate system. The measurement device receives, from the map server, the information that is about the first coordinate system relative to the second coordinate system and that is obtained when the measurement device determines the position of the measurement target in the first coordinate system. According to the foregoing method, in a manner in which the map server actively sends the information about the first coordinate system relative to the second coordinate system, the first device does not need to request the information, thereby reducing signaling overheads.

The measurement device may further send a query request for the information about the first coordinate system relative to the second coordinate system to the map server. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system. According to the foregoing method, the map server sends the information about the first coordinate system relative to the second coordinate system only when the first device requests the information, so that the map server can be prevented from sending the information about the first coordinate system relative to the second coordinate system to an irrelevant device, thereby protecting privacy of the measurement device, and reducing signaling overheads.

Example c2.1: The first device is the vehicle-mounted apparatus. The map server stores the information about the first coordinate system relative to the second coordinate system. The vehicle-mounted apparatus receives, from the map server, the information that is about the first coordinate system relative to the second coordinate system and that is obtained when the measurement device determines the position of the measurement target in the first coordinate system. According to the foregoing method, in a manner in which the map server actively sends the information about the first coordinate system relative to the second coordinate system, the first device does not need to request the information, thereby reducing signaling overheads.

The vehicle-mounted apparatus further sends a query request for the information about the first coordinate system relative to the second coordinate system to the map server. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system. According to the foregoing method, the map server sends the information about the first coordinate system relative to the second coordinate system only when the first device requests the information, so that the map server can be prevented from sending the information about the first coordinate system relative to the second coordinate system to an irrelevant device, thereby protecting privacy of the measurement device, and reducing signaling overheads.

Example c2.2: The first device is the vehicle-mounted apparatus. The measurement device (for example, the road side unit or the vehicle is used as the measurement device)

stores the information about the first coordinate system relative to the second coordinate system. The vehicle-mounted apparatus receives, from the measurement device, the information that is about the first coordinate system relative to the second coordinate system and that is obtained when the measurement device determines the position of the measurement target in the first coordinate system. According to the foregoing method, in a manner in which the measurement device actively sends the information about the first coordinate system relative to the second coordinate system, the first device does not need to request the information, thereby reducing signaling overheads.

The vehicle-mounted apparatus further sends a query request for the information about the first coordinate system relative to the second coordinate system to the measurement device. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system. According to the foregoing method, the measurement device sends the information about the first coordinate system relative to the second coordinate system only when the first device requests the information, so that the measurement device can be prevented from sending the information about the first coordinate system relative to the second coordinate system to an irrelevant device, thereby protecting privacy of the measurement device, and reducing signaling overheads.

Manner 3: The first device may obtain initial information of the first coordinate system relative to the second coordinate system, where the initial information is determined based on an initial position and an initial posture that are of the measurement device in the second coordinate system; obtain a position change of a position in which the measurement device measures the measurement target and that is relative to the initial position, and obtain a posture change of a posture in which the measurement device measures the measurement target and that is relative to the initial posture; and determine the information about the first coordinate system relative to the second coordinate system based on the initial information, the position change, and the posture change.

According to the foregoing method, the first device may determine the information about the first coordinate system relative to the second coordinate system based on the historically obtained initial information of the first coordinate system relative to the second coordinate system, and first position change information (the position change of the position in which the measurement device measures the measurement target and that is relative to the initial position, and the posture change of the posture in which the measurement device measures the measurement target and that is relative to the initial posture) that is of the measurement device and that is determined when the measurement device determines the position of the measurement target in the first coordinate system. A manner of obtaining the information about the first coordinate system relative to the second coordinate system is flexibly configured, so that signaling interaction between the first device and the measurement device is flexibly configured, to adapt to more scenarios.

Example a3.1: The first device is the map server. The map server stores the initial information of the first coordinate system relative to the second coordinate system. The map server receives the identifier of the measurement device and first position change information of the measurement device. The first position change information includes at least one of the following: the position change of the position in which the measurement device measures the measurement target and that is relative to the initial position, and the posture change of the posture in which the measurement device measures the measurement target and that is relative to the initial posture. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The map server determines the information about the first coordinate system relative to the second coordinate system based on the first position change information of the measurement device and the initial information of the first coordinate system relative to the second coordinate system. According to the foregoing method, the measurement device sends the initial information of the first coordinate system relative to the second coordinate system. This can enable the map server to effectively use the obtained initial position of the measurement device in the second coordinate system and reduce a quantity of times of information sending compared with a manner of sending the information about the first coordinate system relative to the second coordinate system. In addition, in a manner in which the measurement device actively sends the initial information, the first device does not need to request the initial information, thereby reducing signaling overheads.

Example a3.2: The first device is the map server. The measurement device (for example, the road side unit or the vehicle is used as the measurement device) stores the initial information of the first coordinate system relative to the second coordinate system. The map server receives the initial information of the first coordinate system relative to the second coordinate system from the measurement device. The map server receives the identifier of the measurement device and first position change information of the measurement device from the measurement device. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The map server determines the information about the first coordinate system relative to the second coordinate system based on the first position change information of the measurement device and the initial information of the first coordinate system relative to the second coordinate system.

According to the foregoing method, the measurement device may separately send the initial information of the first coordinate system relative to the second coordinate system and the first position change information of the measurement device to the map server based on a requirement. For example, the initial information of the first coordinate system relative to the second coordinate system may be sent to the map server in advance, and the first position change information of the measurement device may be sent together with the position of the measurement target in the first coordinate system, to adapt to more application scenarios and improve positioning flexibility of the map server.

The map server may further send a query request for the initial information of the first coordinate system relative to the second coordinate system to the measurement device. The query request for the initial information of the first coordinate system relative to the second coordinate system is used to query position information of the initial position of the measurement device in the second coordinate system. The query request for the initial information of the first coordinate system relative to the second coordinate system includes the identifier of the measurement device and/or an identifier of the second coordinate system. According to the foregoing method, the measurement device sends the initial information of the first coordinate system relative to the second coordinate system only when the first device requests the initial information, so that the measurement device can be prevented from sending the initial information of the first coordinate system relative to the second coordinate system to an irrelevant device, thereby protecting privacy of the measurement device, and reducing signaling overheads.

The map server may further send a query request for the first position change information of the measurement device to the measurement device. The query request for the first position change information of the measurement device is used to query a measurement position that is of the measurement device relative to the initial position and that is obtained when the measurement device determines the position of the measurement target in the first coordinate system. The query request for the first position change information of the measurement device includes the identifier of the measurement device and/or an identifier of the second coordinate system. According to the foregoing method, the measurement device sends the first position change information of the measurement device only when the map server requests the first position change information of the measurement device, so that the measurement device can be prevented from sending the first position change information of the measurement device to an irrelevant device, thereby protecting privacy of the measurement device and the map coordinate system, and reducing signaling overheads.

Example a3.3: The first device is the map server. The vehicle-mounted apparatus stores the initial information of the first coordinate system relative to the second coordinate system. The map server receives the initial information of the first coordinate system relative to the second coordinate system from the vehicle-mounted apparatus. The map server receives the identifier of the measurement device and first position change information of the measurement device from the measurement device. The first position change information of the measurement device (for example, the road side unit or a vehicle other than a vehicle in which the vehicle-mounted apparatus is located is used as the measurement device) is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The map server determines the information about the first coordinate system relative to the second coordinate system based on the first position change information of the measurement device and the initial information of the first coordinate system relative to the second coordinate system. According to the foregoing method, the vehicle-mounted apparatus may send the initial information of the first coordinate system relative to the second coordinate system to the map server based on a requirement, and the measurement device may send the first position change information of the measurement device to the map server based on a requirement. For example, the initial information of the first coordinate system relative to the second coordinate system may be sent to the map server in advance, and the first position change information of the measurement device may be sent together with the position of the measurement target in the first coordinate system, to adapt to more application scenarios and improve positioning flexibility of the map server.

The map server may further send a query request for the initial information of the first coordinate system relative to the second coordinate system to the vehicle-mounted apparatus. The query request for the initial information of the first coordinate system relative to the second coordinate system is used to query position information of the initial position of the measurement device in the second coordinate system. The query request for the initial information of the first coordinate system relative to the second coordinate system includes the identifier of the measurement device and/or an identifier of the second coordinate system. According to the foregoing method, the vehicle-mounted apparatus sends the initial information of the first coordinate system relative to the second coordinate system only when the first device requests the initial information, so that the vehicle-mounted apparatus can be prevented from sending the initial information of the first coordinate system relative to the second coordinate system to an irrelevant device, thereby protecting privacy of the measurement device, and reducing signaling overheads.

Example b3.1: The first device is the measurement device (for example, the road side unit or a vehicle other than a vehicle in which the vehicle-mounted apparatus is located is used as the measurement device). The map server stores the initial information of the first coordinate system relative to the second coordinate system. The measurement device receives the initial information of the first coordinate system relative to the second coordinate system from the map server. The measurement device determines the information about the first coordinate system relative to the second coordinate system based on first position change information of the measurement device and the initial information of the first coordinate system relative to the second coordinate system. According to the foregoing method, the measurement device does not need to store the initial information of the first coordinate system relative to the second coordinate system, so that occupation of storage space is reduced, and impact on performance of the measurement device that may be caused by occupation of additional storage space is avoided.

The measurement device may further send a query request for the initial information of the first coordinate system relative to the second coordinate system to the map server. The query request for the initial information of the first coordinate system relative to the second coordinate system is used to query position information of the initial position of the measurement device in the second coordinate system. The query request for the initial information of the first coordinate system relative to the second coordinate system includes the identifier of the measurement device and/or an identifier of the second coordinate system. According to the foregoing method, the map server sends the initial information of the first coordinate system relative to the second coordinate system only when the measurement device requests the initial information, so that the map server can be prevented from sending the initial information of the first coordinate system relative to the second coordinate system to an irrelevant device, thereby protecting privacy of the measurement device and the map coordinate system, and reducing signaling overheads.

Example b3.2: The first device is the measurement device (for example, the road side unit or a vehicle other than a vehicle in which the vehicle-mounted apparatus is located is used as the measurement device). The measurement device stores the initial information of the first coordinate system relative to the second coordinate system. The measurement device reads the initial information that is of the first coordinate system relative to the second coordinate system and that is of the measurement device from the memory. The measurement device reads first position change information of the measurement device from the memory. The measurement device determines the information about the first coordinate system relative to the second coordinate system based on the first position change information of the measurement device and the initial information of the first coordinate system relative to the second coordinate system. According to the foregoing method, the measurement device separately stores the initial information of the first coordinate system relative to the second coordinate system and the first position change information of the measurement device. This can effectively reduce occupation of storage space compared with a case in which the measurement device stores the information about the first coordinate system relative to the second coordinate system each time the measurement device determines the measurement target, especially in a case in which only one piece of first position change information of the measurement device needs to be stored in a scenario in which there are a plurality of second coordinate systems.

Example b3.3: The first device is the measurement device (for example, the road side unit or a vehicle other than a vehicle in which the vehicle-mounted apparatus is located is used as the measurement device). The vehicle-mounted apparatus stores the initial information of the first coordinate system relative to the second coordinate system. The measurement device receives the initial information of the first coordinate system relative to the second coordinate system from the vehicle-mounted apparatus. The measurement device determines the information about the first coordinate system relative to the second coordinate system based on first position change information of the measurement device and the initial information of the first coordinate system relative to the second coordinate system. According to the foregoing method, the measurement device does not need to store the initial information of the first coordinate system relative to the second coordinate system, so that occupation of storage space is reduced, and impact on performance of the measurement device that may be caused by occupation of additional storage space is avoided.

The measurement device may further send a query request for the initial information of the first coordinate system relative to the second coordinate system to the vehicle-mounted apparatus. The query request for the initial information of the first coordinate system relative to the second coordinate system is used to query position information of the initial position of the measurement device in the second coordinate system. The query request for the initial information of the first coordinate system relative to the second coordinate system includes the identifier of the measurement device and/or an identifier of the second coordinate system. According to the foregoing method, the vehicle-mounted apparatus sends the initial information of the first coordinate system relative to the second coordinate system only when the first device requests the initial information, so that the vehicle-mounted apparatus can be prevented from sending the initial information of the first coordinate system relative to the second coordinate system to an irrelevant device, thereby protecting privacy of the measurement device, and reducing signaling overheads.

Example c3.1: The first device is the vehicle-mounted apparatus. The map server stores the initial information of the first coordinate system relative to the second coordinate system. The vehicle-mounted apparatus receives first position change information that is of the measurement device and that is sent by the measurement device (for example, the road side unit or a vehicle other than a vehicle in which the vehicle-mounted apparatus is located is used as the measurement device). The first position change information of the measurement device is used to indicate a difference between position information that is of the measurement device and that is obtained when the measurement device determines the position of the measurement target in the first coordinate system and the initial information. The vehicle-mounted apparatus receives the initial information of the first coordinate system relative to the second coordinate system from the map server. The vehicle-mounted apparatus determines the information about the first coordinate system relative to the second coordinate system based on the first position change information of the measurement device and the initial information of the first coordinate system relative to the second coordinate system. According to the foregoing method, the vehicle-mounted apparatus receives the initial information of the first coordinate system relative to the second coordinate system by using the map server, and receives the first position change information of the measurement device by using the measurement device, so that information can be sent more flexibly, to avoid a case in which network congestion occurs because a large amount of information is simultaneously sent, and consequently the vehicle-mounted apparatus may delay obtaining the position of the measurement target and autonomous driving performance is affected.

In a possible implementation, the vehicle-mounted apparatus further sends a query request for the initial information of the first coordinate system relative to the second coordinate system to the map server. The query request for the initial information of the first coordinate system relative to the second coordinate system is used to query the initial position of the measurement device in the second coordinate system. The query request for the initial information of the first coordinate system relative to the second coordinate system includes the identifier of the measurement device and/or an identifier of the second coordinate system.

Example c3.2: The first device is the vehicle-mounted apparatus. The measurement device (for example, the road side unit or a vehicle other than a vehicle in which the vehicle-mounted apparatus is located is used as the measurement device) stores the initial information of the first coordinate system relative to the second coordinate system. The vehicle-mounted apparatus receives first position change information that is of the measurement device and that is sent by the measurement device. The first position change information of the measurement device is used to indicate a difference between position information that is of the measurement device and that is obtained when the measurement device determines the position of the measurement target in the first coordinate system and the initial information. The vehicle-mounted apparatus receives the initial information of the first coordinate system relative to the second coordinate system from the measurement device. The vehicle-mounted apparatus determines the information about the first coordinate system relative to the second coordinate system based on the first position change information of the measurement device and the initial information of the first coordinate system relative to the second coordinate system. According to the foregoing method, the vehicle-mounted apparatus separately receives the initial information of the first coordinate system relative to the second coordinate system and the first position change information of the measurement device by using the measurement device, so that information can be sent more flexibly, to avoid a case in which network congestion occurs because a large amount of information is simultaneously sent, and consequently the vehicle-mounted apparatus may delay obtaining the position of the measurement target and autonomous driving performance is affected.

In a possible implementation, the vehicle-mounted apparatus further sends a query request for the initial information of the first coordinate system relative to the second coordinate system to the measurement device. The query request for the initial information of the first coordinate system relative to the second coordinate system is used to query the initial position of the measurement device in the second coordinate system. The query request for the initial information of the first coordinate system relative to the second coordinate system includes the identifier of the measurement device and/or an identifier of the second coordinate system.

Example c3.3: The first device is the vehicle-mounted apparatus. The vehicle-mounted apparatus stores the initial information of the first coordinate system relative to the second coordinate system. The vehicle-mounted apparatus receives at least one of the following of the measurement device (for example, the road side unit or a vehicle other than a vehicle in which the vehicle-mounted apparatus is located is used as the measurement device): first position change information of the measurement device, the identifier of the measurement device, and an identifier of the second coordinate system. The vehicle-mounted apparatus determines the information about the first coordinate system relative to the second coordinate system based on the first position change information of the measurement device and the initial information of the first coordinate system relative to the second coordinate system. According to the foregoing method, the vehicle-mounted apparatus can effectively use the obtained initial position of the measurement device in the second coordinate system, to reduce a quantity of times of information sending. In addition, in a manner in which the measurement device or the map server actively sends the first position change information of the measurement device, the vehicle-mounted apparatus does not need to request the first position change information of the measurement device, thereby reducing signaling overheads.

In a possible implementation, the vehicle-mounted apparatus sends a query request for the first position change information of the measurement device to the measurement device. Alternatively, the vehicle-mounted apparatus sends a query request for the first position change information of the measurement device to the map server. The query request for the first position change information of the measurement device is used to query a difference that is of the measurement device relative to the initial position and that is obtained when the measurement device determines the position of the measurement target in the first coordinate system. The query request for the first position change information of the measurement device includes the identifier of the measurement device and/or an identifier of the second coordinate system.

According to the foregoing method, the vehicle-mounted apparatus may actively initiate the query request to the map server or the measurement device, so that information can be sent more flexibly, and the map server or the measurement device can be prevented from sending the initial information of the first coordinate system relative to the second coordinate system to an irrelevant device; or the map server or the measurement device can be prevented from sending the first position change information of the measurement device to an irrelevant device, thereby protecting privacy of the measurement device and the map coordinate system, and reducing signaling overheads.

Manner 4: The first device may obtain historical information of the first coordinate system relative to the second coordinate system. The historical information is determined based on an initial historical position and a historical posture that are of the measurement device in the second coordinate system. The second position change information includes the position change of the position in which the measurement device measures the measurement target and that is relative to the initial position, and the posture change of the posture in which the measurement device measures the measurement target and that is relative to the initial posture. The first device determines the information about the first coordinate system relative to the second coordinate system based on the historical information and the second position change information of the measurement device.

According to the foregoing method, the first device may determine the information about the first coordinate system relative to the second coordinate system based on the historical information that is of the first coordinate system relative to the second coordinate system and that is obtained based on a measured position of a historical target, and the second position change determined when the measurement device determines the position of the measurement target in the first coordinate system. A manner in which the first device obtains the information about the first coordinate system relative to the second coordinate system can be flexibly configured, so that signaling interaction between the first device and the measurement device can be flexibly configured, and an amount of information sent when the measurement device determines the position of the measurement target in the first coordinate system can be further reduced, to adapt to more scenarios.

Example a4.1: The first device is the map server. The map server stores the historical information of the first coordinate system relative to the second coordinate system. The map server receives the identifier of the measurement device (for example, the road side unit or the vehicle is used as the measurement device) and the second position change information of the measurement device. The second position change information of the measurement device is used to indicate a difference between position information that is of the measurement device and that is obtained when the measurement device determines the position of the measurement target in the first coordinate system and historical information that is of the first coordinate system relative to the second coordinate system and that is obtained when the measurement device measures a position of a historical target. The identifier of the measurement device is used by the map server to determine the historical information of the first coordinate system relative to the second coordinate system. The map server determines the information about the first coordinate system relative to the second coordinate system based on the second position change information of the measurement device and the historical information of the first coordinate system relative to the second coordinate system.

According to the foregoing method, the measurement device sends the historical information of the first coordinate system relative to the second coordinate system. This can enable the map server to effectively use the obtained historical position of the measurement device in the second coordinate system and reduce a quantity of times of information sending compared with a manner of sending the information about the first coordinate system relative to the second coordinate system. In addition, in a manner in which the measurement device actively sends the historical information, the first device does not need to request the historical information, thereby reducing signaling overheads.

Example a4.2: The first device is the map server. The measurement device (for example, the road side unit or the vehicle is used as the measurement device) stores the historical information of the first coordinate system relative to the second coordinate system. The map server receives the historical information of the first coordinate system relative to the second coordinate system from the measurement device. The map server receives the identifier of the measurement device and the second position change information of the measurement device from the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system. The map server determines the information about the first coordinate system relative to the second coordinate system based on the second position change information of the measurement device and the historical information of the first coordinate system relative to the second coordinate system.

According to the foregoing method, the measurement device may separately send the historical information of the first coordinate system relative to the second coordinate system and the second position change information of the measurement device to the map server based on a requirement. For example, the historical information of the first coordinate system relative to the second coordinate system may be sent to the map server in advance, and the second position change information of the measurement device may be sent together with the position of the measurement target in the first coordinate system, to adapt to more application scenarios and improve positioning flexibility of the map server.

The map server may further send a query request for the historical information of the first coordinate system relative to the second coordinate system to the measurement device. The query request for the historical information of the first coordinate system relative to the second coordinate system is used to query position information that is of the measurement device in the second coordinate system and that is obtained when the measurement device measures the position of the historical target. The query request for the historical information of the first coordinate system relative to the second coordinate system includes the identifier of the measurement device and/or an identifier of the second coordinate system. According to the foregoing method, the measurement device sends the historical information of the first coordinate system relative to the second coordinate system only when the first device requests the historical information, so that the measurement device can be prevented from sending the historical information of the first coordinate system relative to the second coordinate system to an irrelevant device, thereby protecting privacy of the measurement device, and reducing signaling overheads.

Example a4.3: The first device is the map server. The vehicle-mounted apparatus stores the historical information of the first coordinate system relative to the second coordinate system. The map server receives the historical information of the first coordinate system relative to the second coordinate system from the vehicle-mounted apparatus. The map server receives the identifier of the measurement device and the second position change information of the measurement device from the measurement device (for example, the road side unit or a vehicle other than a vehicle in which the vehicle-mounted apparatus is located is used as the measurement device). The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system. The map server determines the information about the first coordinate system relative to the second coordinate system based on the second position change information of the measurement device and the historical information of the first coordinate system relative to the second coordinate system. According to the foregoing method, the vehicle-mounted apparatus may send the historical information of the first coordinate system relative to the second coordinate system to the map server based on a requirement, and the measurement device may send the second position change information of the measurement device to the map server based on a requirement. For example, the historical information of the first coordinate system relative to the second coordinate system may be sent to the map server in advance, and the second position change information of the measurement device may be sent together with the position of the measurement target in the first coordinate system, to adapt to more application scenarios and improve positioning flexibility of the map server.

The map server may further send a query request for the historical information of the first coordinate system relative to the second coordinate system to the vehicle-mounted apparatus. The query request for the historical information of the first coordinate system relative to the second coordinate system is used to query position information that is of the measurement device in the second coordinate system and that is obtained when the measurement device measures the position of the historical target. The query request for the historical information of the first coordinate system relative to the second coordinate system includes the identifier of the measurement device and/or an identifier of the second coordinate system. According to the foregoing method, the vehicle-mounted apparatus sends the historical information of the first coordinate system relative to the second coordinate system only when the first device requests the historical information, so that the vehicle-mounted apparatus can be prevented from sending the historical information of the first coordinate system relative to the second coordinate system to an irrelevant device, thereby protecting privacy of the measurement device, and reducing signaling overheads.

The map server further sends a query request for the second position change information of the measurement device to the measurement device. The query request for the second position change information of the measurement device is used to query a measurement position that is of the measurement device relative to the historical position and that is obtained when the measurement device determines the position of the measurement target in the first coordinate system. The query request for the second position change information of the measurement device includes the identifier of the measurement device and/or an identifier of the second coordinate system. According to the foregoing method, the measurement device sends the second position change information of the measurement device only when the map server requests the second position change information of the measurement device, so that the measurement device can be prevented from sending the second position change information of the measurement device to an irrelevant device, thereby protecting privacy of the measurement device and the map coordinate system, and reducing signaling overheads.

Example b4.1: The first device is the measurement device (for example, the road side unit or the vehicle is used as the measurement device). The map server stores the historical information of the first coordinate system relative to the second coordinate system. The measurement device receives the second position change information that is of the measurement device and that is sent by the map server. The measurement device determines the information about the first coordinate system relative to the second coordinate system based on the second position change information of the measurement device and the historical information of the first coordinate system relative to the second coordinate system. According to the foregoing method, the measurement device does not need to store the historical information of the first coordinate system relative to the second coordinate system, so that occupation of storage space is reduced, and impact on performance of the measurement device that may be caused by occupation of additional storage space is avoided.

The measurement device may further send a query request for the historical information of the first coordinate system relative to the second coordinate system to the map server. The query request for the historical information of the first coordinate system relative to the second coordinate system is used to query position information of the historical position of the measurement device in the second coordinate system. The query request for the historical information of the first coordinate system relative to the second coordinate system includes the identifier of the measurement device and/or an identifier of the second coordinate system. According to the foregoing method, the map server sends the historical information of the first coordinate system relative to the second coordinate system only when the first device requests the historical information, so that the map server can be prevented from sending the historical information of the first coordinate system relative to the second coordinate system to an irrelevant device, thereby protecting privacy of the measurement device, and reducing signaling overheads.

Example b4.2: The first device is the measurement device (for example, the road side unit or the vehicle is used as the measurement device). The measurement device stores the historical information of the first coordinate system relative to the second coordinate system. The measurement device reads the historical information that is of the first coordinate system relative to the second coordinate system and that is of the measurement device from the memory. The measurement device reads the second position change information of the measurement device from the memory. The measurement device determines the information about the first coordinate system relative to the second coordinate system based on the second position change information of the measurement device and the historical information of the first coordinate system relative to the second coordinate system. According to the foregoing method, the measurement device separately stores the historical information of the first coordinate system relative to the second coordinate system and the second position change information of the measurement device. This can effectively reduce occupation of storage space compared with a case in which the measurement device stores the information about the first coordinate system relative to the second coordinate system each time the measurement device determines the measurement target, especially in a case in which only one piece of second position change information of the measurement device needs to be stored in a scenario in which there are a plurality of second coordinate systems.

Example b4.3: The first device is the measurement device (for example, the road side unit or the vehicle is used as the measurement device). The vehicle-mounted apparatus stores the historical information of the first coordinate system relative to the second coordinate system. The measurement device receives the historical information of the first coordinate system relative to the second coordinate system from the vehicle-mounted apparatus. The measurement device determines the information about the first coordinate system relative to the second coordinate system based on the second position change information of the measurement device and the historical information of the first coordinate system relative to the second coordinate system. According to the foregoing method, the measurement device does not need to store the historical information of the first coordinate system relative to the second coordinate system, so that occupation of storage space is reduced, and impact on performance of the measurement device that may be caused by occupation of additional storage space is avoided.

The measurement device may further send a query request for the historical information of the first coordinate system relative to the second coordinate system to the vehicle-mounted apparatus. The query request for the historical information of the first coordinate system relative to the second coordinate system is used to query position information of the historical position of the measurement device in the second coordinate system. The query request for the historical information of the first coordinate system relative to the second coordinate system includes the identifier of the measurement device and/or an identifier of the second coordinate system. According to the foregoing method, the vehicle-mounted apparatus sends the historical information of the first coordinate system relative to the second coordinate system only when the first device requests the historical information, so that the vehicle-mounted apparatus can be prevented from sending the historical information of the first coordinate system relative to the second coordinate system to an irrelevant device, thereby protecting privacy of the measurement device, and reducing signaling overheads.

Example c4.1: The first device is the vehicle-mounted apparatus. The map server stores the historical information of the first coordinate system relative to the second coordinate system. The vehicle-mounted apparatus receives the second position change information that is of the measurement device and that is sent by the measurement device (for example, the road side unit or a vehicle other than a vehicle in which the vehicle-mounted apparatus is located is used as the measurement device). The second position change information of the measurement device is used to indicate a difference between position information that is of the measurement device and that is obtained when the measurement device determines the position of the measurement target in the first coordinate system and the historical information. The vehicle-mounted apparatus receives the historical information of the first coordinate system relative to the second coordinate system from the map server. The vehicle-mounted apparatus determines the information about the first coordinate system relative to the second coordinate system based on the second position change information of the measurement device and the historical information of the first coordinate system relative to the second coordinate system.

According to the foregoing method, the vehicle-mounted apparatus receives the historical information of the first coordinate system relative to the second coordinate system by using the map server, and receives the second position change information of the measurement device by using the measurement device, so that information can be sent more flexibly, to avoid a case in which because a large amount of information is simultaneously sent, network congestion may occur, and therefore the vehicle-mounted apparatus may delay obtaining the position of the measurement target and autonomous driving performance is affected.

In a possible implementation, the vehicle-mounted apparatus further sends a query request for the historical information of the first coordinate system relative to the second coordinate system to the map server. The query request for the historical information of the first coordinate system relative to the second coordinate system is used to query the historical position of the measurement device in the second coordinate system. The query request for the historical information of the first coordinate system relative to the second coordinate system includes the identifier of the measurement device and/or an identifier of the second coordinate system.

Example c4.2: The first device is the vehicle-mounted apparatus. The measurement device (for example, the road side unit or a vehicle other than a vehicle in which the vehicle-mounted apparatus is located is used as the measurement device) stores the initial information of the first coordinate system relative to the second coordinate system. The vehicle-mounted apparatus receives the second position change information that is of the measurement device and that is sent by the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The vehicle-mounted apparatus receives the historical information of the first coordinate system relative to the second coordinate system from the measurement device. The vehicle-mounted apparatus determines the information about the first coordinate system relative to the second coordinate system based on the second position change information of the measurement device and the historical information of the first coordinate system relative to the second coordinate system. According to the foregoing method, the vehicle-mounted apparatus separately receives the historical information of the first coordinate system relative to the second coordinate system and the second position change information of the measurement device by using the measurement device, so that information can be sent more flexibly, to avoid a case in which network congestion occurs because a large amount of information is simultaneously sent, and consequently the vehicle-mounted apparatus may delay obtaining the position of the measurement target and autonomous driving performance is affected.

In a possible implementation, the vehicle-mounted apparatus further sends a query request for the historical information of the first coordinate system relative to the second coordinate system to the measurement device. The query request for the historical information of the first coordinate system relative to the second coordinate system is used to query the historical position of the measurement device in the second coordinate system. The query request for the initial information of the first coordinate system relative to the second coordinate system includes the identifier of the measurement device and/or an identifier of the second coordinate system.

Example c4.3: The first device is the vehicle-mounted apparatus. The vehicle-mounted apparatus stores the historical information of the first coordinate system relative to the second coordinate system. The vehicle-mounted apparatus receives at least one of the following of the measurement device (for example, the road side unit or a vehicle other than a vehicle in which the vehicle-mounted apparatus is located is used as the measurement device): the second position change information of the measurement device, the identifier of the measurement device, and an identifier of the second coordinate system. The vehicle-mounted apparatus determines the information about the first coordinate system relative to the second coordinate system based on the second position change information of the measurement device and the historical information of the first coordinate system relative to the second coordinate system. According to the foregoing method, the vehicle-mounted apparatus can effectively use the obtained historical position of the measurement device in the second coordinate system, to reduce a quantity of times of information sending. In addition, in a manner in which the measurement device or the map server actively sends the second position change information of the measurement device, the vehicle-mounted apparatus does not need to request the second position change information of the measurement device, thereby reducing signaling overheads.

In a possible implementation, the vehicle-mounted apparatus sends a query request for the second position change information of the measurement device to the measurement device. Alternatively, the vehicle-mounted apparatus sends a query request for the second position change information of the measurement device to the map server. The query request for the second position change information of the measurement device is used to query a difference that is of the measurement device relative to the historical position and that is obtained when the measurement device determines the position of the measurement target in the first coordinate system. The query request for the second position change information of the measurement device includes the identifier of the measurement device and/or an identifier of the second coordinate system.

According to the foregoing method, the vehicle-mounted apparatus may actively initiate the query request to the map server or the measurement device, so that information can be sent more flexibly, and the map server or the measurement device can be prevented from sending the historical information of the first coordinate system relative to the second coordinate system to an irrelevant device; or the map server or the measurement device can be prevented from sending the second position change information of the measurement device to an irrelevant device, thereby protecting privacy of the measurement device and the map coordinate system, and reducing signaling overheads.

In a possible implementation, the vehicle-mounted apparatus further sends a query request for the second position change information of the measurement device to the map server. Alternatively, the vehicle-mounted apparatus sends a query request for the second position change information of the measurement device to the measurement device. The query request for the second position change information of the measurement device is used to query the first position change information that is of the measurement device in the second coordinate system and that is obtained when the measurement device determines the position of the measurement target in the first coordinate system. The query request for the second position change information of the measurement device includes the identifier of the measurement device and/or an identifier of the second coordinate system.

According to the foregoing method, the vehicle-mounted apparatus may actively initiate the query request to the map server or the measurement device, so that information can be sent more flexibly, and the map server or the measurement device can be prevented from sending the second position change information of the measurement device to an irrelevant device, thereby protecting privacy of the measurement device and the map coordinate system, and reducing signaling overheads.

In a possible design, a manner of the obtaining a position of a measurement target in the first coordinate system may be as follows:

Manner 1: The first device obtains the position of the measurement target in the first coordinate system through measurement by using a sensor.

Example A1: The measurement device is used as the first device that performs the positioning method, and obtains the position of the measurement target in the first coordinate system through measurement by using the sensor.

Manner 2: The first device receives the position of the measurement target in the first coordinate system by using a receiver.

Example A2: The first device is the map server. The map server receives the position of the measurement target in the first coordinate system from the measurement device by using the receiver.

According to the foregoing method, the map server can obtain the position that is of the measurement target in the first coordinate system and that is obtained by the measurement device through measurement, so that the map server transforms the position of the measurement target into the second coordinate system based on the position of the measurement target in the first coordinate system and the information that is about the first coordinate system relative to the second coordinate system and that is stored in the map server, to meet a requirement of obtaining the position of the measurement target in the second coordinate system by the vehicle. Alternatively, the map server may forward the position of the measurement target in the first coordinate system to the vehicle-mounted apparatus based on the position that is of the measurement target in the first coordinate system and that is sent by the measurement device, and the vehicle-mounted device is used as the first device that performs the positioning method, so that related information can be sent more flexibly to adapt to more scenarios.

The map server may further send a query request for the position of the measurement target in the first coordinate system to the measurement device. The query request for the position of the measurement target in the first coordinate system is used to query a relative position relationship between the measurement device and the measurement target. The query request for the position of the measurement target in the first coordinate system includes the identifier of the measurement device and/or an identifier of the second coordinate system.

According to the foregoing method, the map server may actively initiate the query request to the measurement device, so that information can be sent more flexibly, and the measurement device can be prevented from sending the position of the measurement target in the first coordinate system to an irrelevant device, thereby protecting privacy of the measurement target, and reducing a quantity of times of signaling sending.

Example B2: The first device is the vehicle-mounted apparatus. The vehicle-mounted apparatus receives the position of the measurement target in the first coordinate system by using the receiver.

Example B2.1: The vehicle-mounted apparatus receives, by using the receiver, the position that is of the measurement target in the first coordinate system and that is sent by the map server.

The vehicle-mounted apparatus receives the position that is of the measurement target in the first coordinate system and that is sent by the map server, so that the position of the measurement target in the first coordinate system can be flexibly obtained. In addition to sending the position of the measurement target in the first coordinate system to the vehicle-mounted apparatus by the measurement device, effective offloading can be performed by using the map server. This helps implement effective resource utilization.

The vehicle-mounted apparatus may further send a query request for a position of a to-be-identified object in the first coordinate system to the map server. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is an object in a preset range of the measurement device. The map server receives a query request for a target position from the vehicle-mounted apparatus. The map server determines, based on position information of the measurement device in the first coordinate system, that the to-be-identified object includes at least the measurement target.

According to the foregoing method, the vehicle-mounted apparatus may actively initiate the query request for the position of the to-be-identified object in the first coordinate system to the map server, so that the map server determines the to-be-identified object and the position that is of the measurement target in the first coordinate system and that corresponds to the to-be-identified object, to prevent the map server from sending the position of the measurement target in the first coordinate system to an irrelevant device.

Example B2.2: The vehicle-mounted apparatus receives, by using the receiver, the position that is of the measurement target in the first coordinate system and that is sent by the measurement device (for example, the measurement device is the road side unit or a measurement device in the vehicle).

The vehicle-mounted apparatus receives the position that is of the measurement target in the first coordinate system and that is sent by the measurement device, so that the position of the measurement target in the first coordinate system can be directly obtained. This helps reduce a delay and increase a speed of obtaining the position information of the measurement target in the first coordinate system.

The vehicle-mounted apparatus further sends a query request for a position of a to-be-identified object in the first coordinate system to the measurement device. The request for the position of the to-be-identified object in the first coordinate system is used to query position information of the to-be-identified object in the first coordinate system. The to-be-identified object is an object in a preset range of the measurement device. The query request for the position of the to-be-identified object in the first coordinate system includes the identifier of the measurement device. The measurement device receives the query request for the position of the to-be-identified object in the first coordinate system from the vehicle-mounted apparatus. The measurement device determines, based on the query request for the position of the to-be-identified object in the first coordinate system, that the to-be-identified object includes at least the measurement target.

According to the foregoing method, the vehicle-mounted apparatus may actively initiate the query request for the position of the to-be-identified object in the first coordinate system to the measurement device, so that the measurement device determines the to-be-identified object and the position that is of the measurement target in the first coordinate system and that corresponds to the to-be-identified object, to prevent the measurement device from sending the position of the measurement target in the first coordinate system to an irrelevant device.

In a possible design, the vehicle-mounted apparatus may further receive the position of the measurement target in the second coordinate system by using the receiver.

Example a: The map server sends at least one of the position of the measurement target in the second coordinate system, the identifier of the second coordinate system, and the identifier of the measurement device to the vehicle-mounted apparatus. The vehicle-mounted apparatus further receives the at least one of the position of the measurement target in the second coordinate system, the identifier of the second coordinate system, and the identifier of the measurement device that are sent by the map server.

The map server sends the position of the measurement target in the second coordinate system to the vehicle-mounted apparatus, so that the vehicle-mounted apparatus directly determines the position of the measurement target in the second coordinate system by using the map server, and the vehicle-mounted apparatus does not need to further determine the position of the measurement target in the second coordinate system, thereby reducing processing complexity of the vehicle-mounted apparatus, reducing a response time of the vehicle-mounted apparatus, and improving autonomous driving safety of the vehicle-mounted apparatus.

The vehicle-mounted apparatus may further send a query request for a position of a to-be-identified object in the second coordinate system to the map server. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system. The map server receives the query request for the position of the to-be-identified object in the second coordinate system from the vehicle-mounted apparatus. The map server determines, based on the position information of the measurement target in the second coordinate system, that the to-be-identified object includes at least the measurement target. The map server further returns the position of the measurement target in the second coordinate system to the vehicle-mounted apparatus. For a specific manner in which the map server obtains the position of the measurement target in the second coordinate system, refer to the foregoing embodiment. Details are not described herein again.

Therefore, the vehicle-mounted apparatus may actively send the query request for the position of the to-be-identified object in the second coordinate system to the map server based on a requirement, to avoid a case in which the map server cannot perform a corresponding driving operation for a distance of the target relative to the vehicle in a timely manner because the map server does not send the position of the measurement target in the second coordinate system in a timely manner, and consequently autonomous driving safety is affected.

Example b: The measurement device (for example, the measurement device is the road side unit or a measurement device in the vehicle) sends at least one of the position of the measurement target in the second coordinate system, the identifier of the second coordinate system, and the identifier of the measurement device to the vehicle-mounted apparatus. The vehicle-mounted apparatus further receives the at least one of the position of the measurement target in the second coordinate system, the identifier of the second coordinate system, and the identifier of the measurement device that are sent by the measurement device.

The measurement device sends the position of the measurement target in the second coordinate system to the vehicle-mounted apparatus, so that the vehicle-mounted apparatus directly determines the position of the measurement target in the second coordinate system by using the measurement device, and the vehicle-mounted apparatus does not need to further determine the position of the measurement target in the second coordinate system, thereby reducing processing complexity of the vehicle-mounted apparatus, reducing a response time of the vehicle-mounted apparatus, and improving autonomous driving safety of the vehicle-mounted apparatus.

The vehicle-mounted apparatus further sends a query request for a position of a to-be-identified object in the second coordinate system to the measurement device. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system. The measurement device receives the query request for the position of the to-be-identified object in the second coordinate system from the vehicle-mounted apparatus. The measurement device determines, based on the position information of the measurement target in the second coordinate system, that the to-be-identified object includes at least the measurement target. The measurement device further returns the position of the measurement target in the second coordinate system to the vehicle-mounted apparatus. For a specific manner in which the measurement device obtains the position of the measurement target in the second coordinate system, refer to the foregoing embodiment. Details are not described herein again.

In a possible implementation, the information about the first coordinate system relative to the second coordinate system includes at least one of the following:

position information of the measurement device in the second coordinate system, and posture information of the measurement device in the second coordinate system, where the position information includes at least one of the following: a coordinate position of the measurement device in the second coordinate system or a position of an outer line vertex of the measurement device in the second coordinate system; and the posture information includes at least one of the following: a yaw angle, a pitch angle, or a roll angle of the measurement device in the second coordinate system.

In a possible implementation, the position information of the measurement target in the first coordinate system includes at least one of the following:

position information of the measurement target in the first coordinate system, where the position information includes at least one of the following: a coordinate position of the measurement target in the first coordinate system or a position of an outer line vertex of the measurement target in the first coordinate system; and posture information of the measurement target in the first coordinate system, where the posture information includes at least one of the following: a yaw angle, a pitch angle, or a roll angle of the measurement target in the first coordinate system.

In a possible implementation, the rotation information includes at least one of a rotation matrix from the second coordinate system to the first coordinate system, a rotation matrix from the first coordinate system to the second coordinate system, Euler angles of the first coordinate system with respect to the second coordinate system, Euler angles of the second coordinate system with respect to the first coordinate system, a rotation vector from the second coordinate system to the first coordinate system, a rotation vector from the first coordinate system to the second coordinate system, a rotation quaternion from the second coordinate system to the first coordinate system, or a rotation quaternion from the first coordinate system to the second coordinate system.

According to a second aspect, an embodiment of this application provides a positioning apparatus, including:

an obtaining unit, configured to: obtain information about a first coordinate system relative to a second coordinate system, where the first coordinate system is a coordinate system used by a measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system; and obtain a position of a measurement target in the first coordinate system, where the position of the measurement target in the first coordinate system is obtained by the measurement device through measurement; and a determining unit, configured to determine a position of the measurement target in the second coordinate system based on the information about the first coordinate system relative to the second coordinate system and the position of the measurement target in the first coordinate system.

In a possible design, the measurement device includes a road side unit, a measurement apparatus in a road side unit, a vehicle, or a measurement apparatus in a vehicle.

In a possible design, the apparatus is applied to a map server, a road side unit, or a vehicle.

In a possible design, that an obtaining unit obtains information about a first coordinate system relative to a second coordinate system includes: reading the information about the first coordinate system relative to the second coordinate system from a memory; or receiving the information about the first coordinate system relative to the second coordinate system.

In a possible design, the obtaining unit is specifically configured to:

obtain initial information of the first coordinate system relative to the second coordinate system, where the initial information is determined based on an initial position and an initial posture that are of the measurement device in the second coordinate system;

obtain a position change of a position in which the measurement device measures the measurement target and that is relative to the initial position, and obtain a posture change of a posture in which the measurement device measures the measurement target and that is relative to the initial posture; and determine the information about the first coordinate system relative to the second coordinate system based on the initial information, the position change, and the posture change.

In a possible design, that an obtaining unit obtains a position of a measurement target in the first coordinate system includes: obtaining the position of the measurement target in the first coordinate system through measurement by using a sensor; or receiving the position of the measurement target in the first coordinate system.

In a possible design, the rotation information includes at least one of a rotation matrix from the second coordinate system to the first coordinate system, a rotation matrix from the first coordinate system to the second coordinate system, Euler angles of the first coordinate system with respect to the second coordinate system, Euler angles of the second coordinate system with respect to the first coordinate system, a rotation vector from the second coordinate system to the first coordinate system, a rotation vector from the first coordinate system to the second coordinate system, a rotation quaternion from the second coordinate system to the first coordinate system, or a rotation quaternion from the first coordinate system to the second coordinate system.

In a possible design, that an obtaining unit obtains information about a first coordinate system relative to a second coordinate system includes: obtaining an identifier of the measurement device; and obtaining the information about the first coordinate system relative to the second coordinate system based on the identifier of the measurement device.

For technical effects brought by the second aspect or the possible implementations, refer to the descriptions of the technical effects brought by the first aspect or the corresponding implementations.

According to a third aspect, an embodiment of this application provides a positioning apparatus, applied to a map server. The positioning apparatus includes a processor, configured to implement the method according to the first aspect. The apparatus may further include a memory, configured to store a program instruction. The memory is coupled to the processor, and when executing the program instruction stored in the memory, the processor can implement the method according to the first aspect. The apparatus may further include an interface circuit. The interface circuit is used by the apparatus to communicate with another device. For example, the interface circuit may be a transceiver, a circuit, a bus, a module, or an interface circuit of another type. For example, the positioning apparatus is a map server, or a chip disposed in a map server. For example, the transceiver is implemented by using an antenna, a feeder, a codec, and the like in the map server. Alternatively, if the positioning apparatus is the chip disposed in the map server, the interface circuit is, for example, a communications interface in the chip, and the communications interface is connected to a radio frequency transceiver component in the map server, to implement information receiving and sending by using the radio frequency transceiver component. For technical effects brought by the third aspect or the possible implementations, refer to the descriptions of the technical effects brought by the first aspect or the corresponding implementations.

According to a fourth aspect, an embodiment of this application provides a positioning apparatus, applied to a measurement device. For example, the measurement device includes a road side unit, a measurement apparatus in a road side unit, a vehicle, or a measurement apparatus in a vehicle. The measurement device may be a road side unit, or may be a chip applied to a road side unit, or may be a measurement apparatus in a road side unit, or may be a chip applied to a measurement apparatus in a road side unit. Alternatively, the measurement device may be a vehicle having a function of the measurement device, or a chip applied to a vehicle having a function of the measurement device. Alternatively, the measurement device may be a measurement apparatus in a vehicle having a function of the measurement device, a chip applied to a measurement apparatus in a vehicle having a function of the measurement device, a combined component or part having a function of the measurement device in a vehicle-mounted apparatus, or another combined component or part having a function of the measurement device. The positioning apparatus includes a processor, configured to implement the method according to the first aspect. The apparatus may further include a memory, configured to store a program instruction. The memory is coupled to the processor, and when executing the program instruction stored in the memory, the processor can implement the method according to the first aspect. The apparatus may further include an interface circuit. The interface circuit is used by the apparatus to communicate with another device. For example, the interface circuit may be a transceiver, a circuit, a bus, a module, or an interface circuit of another type. For example, the positioning apparatus is a measurement device, or a chip disposed in a measurement device. For example, the transceiver is implemented by using an antenna, a feeder, a codec, and the like in the measurement device. Alternatively, if the positioning apparatus is the chip disposed in the measurement device, the interface circuit is, for example, a communications interface in the chip, and the communications interface is connected to a radio frequency transceiver component in the measurement device, to implement information receiving and sending by using the radio frequency transceiver component. For technical effects brought by the fourth aspect or the possible implementations, refer to the descriptions of the technical effects brought by the first aspect or the corresponding implementations.

According to a fifth aspect, an embodiment of this application provides a positioning apparatus, applied to a vehicle or a vehicle having a vehicle-mounted apparatus. The positioning apparatus includes a processor, configured to implement the method according to the first aspect. The apparatus may further include a memory, configured to store a program instruction. The memory is coupled to the processor, and when executing the program instruction stored in the memory, the processor can implement the method according to the first aspect. The apparatus may further include an interface circuit. The interface circuit is used by the apparatus to communicate with another device. For example, the interface circuit may be a transceiver, a circuit, a bus, a module, or an interface circuit of another type. For example, the positioning apparatus is a vehicle, or a chip disposed in a vehicle. For example, the transceiver is implemented by using an antenna, a feeder, a codec, and the like in the vehicle. Alternatively, if the positioning apparatus is the chip disposed in the vehicle, the interface circuit is, for example, a communications interface in the chip, and the communications interface is connected to a radio frequency transceiver component in the vehicle, to implement information receiving and sending by using the radio frequency transceiver component. For technical effects brought by the fifth aspect or the possible implementations, refer to the descriptions of the technical effects brought by the first aspect or the corresponding implementations.

According to a sixth aspect, a communications system is provided. The communications system includes the positioning apparatus according to the third aspect, the positioning apparatus according to the fourth aspect, or the positioning apparatus according to the fifth aspect.

According to an eighth aspect, a computer storage medium is provided. The computer readable storage medium stores an instruction, and when the instruction is run on a processor, the positioning apparatus is enabled to perform the method according to any one of the first aspect or the possible implementations.

According to a ninth aspect, a computer program product including an instruction is provided. The computer program product stores the instruction, and when the computer program product is run on a processor, the positioning apparatus is enabled to perform the method according to any one of the first aspect or the possible implementations.

DESCRIPTION OF EMBODIMENTS

Figure 1A:
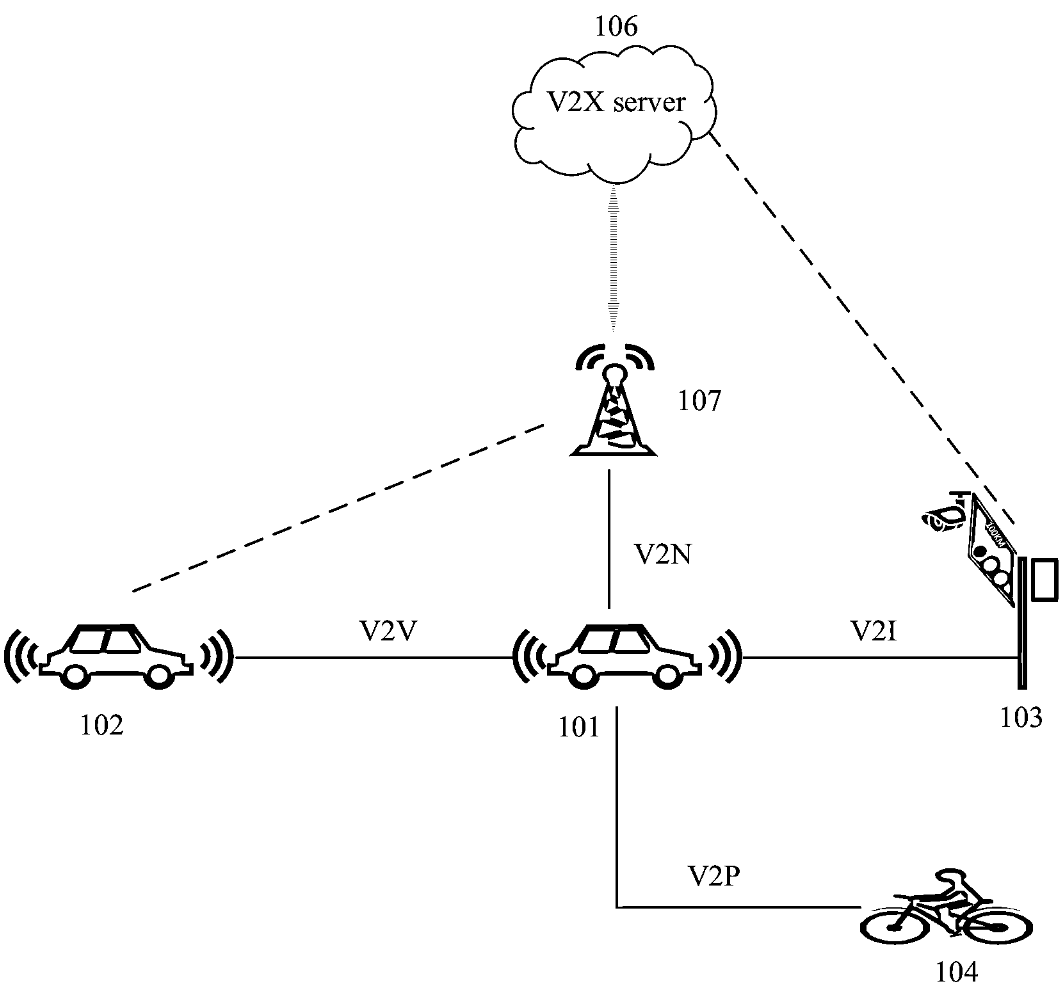
FIG. 1A and FIG. 1B are schematic diagrams of application architectures according to an embodiment of this application.

For ease of understanding, terms in the embodiments of this application are explained and described, and the explanations and descriptions of the terms are also used as a part of application content of the embodiments of this application.

(1) Vehicle-mounted apparatus: The vehicle-mounted apparatus, for example, an on-board unit (OBU), is usually installed on a vehicle. In an ETC system, a road side unit (RSU) is disposed on a road side. The OBU may communicate with the RSU. For example, the OBU may communicate with the RSU through a microwave. When the vehicle passes through the RSU, the OBU and the RSU may communicate with each other through the microwave. In the electronic toll collection (ETC) system, the OBU establishes a microwave communication link with the RSU by using a dedicated short-range communications (DSRC) technology, to implement process such as vehicle identification or electronic fee deduction on a travel of the vehicle without stopping the vehicle.

Alternatively, in addition to the OBU, the vehicle-mounted apparatus may also be another apparatus installed on the vehicle. For example, if various terminal devices described below are located on the vehicle (for example, placed in the vehicle or installed in the vehicle), the terminal devices may be considered as vehicle-mounted apparatus, or referred to as vehicle-mounted apparatus. An in-vehicle system of the vehicle may include at least the vehicle, an in-vehicle network, and the vehicle-mounted apparatus. The vehicle-mounted apparatus includes various sensors, GNNS receiving modules, and the like.

A terminal device includes a device that provides a user with voice and/or data connectivity, for example, may include a hand-held device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) communications terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, hand-held, or computer built-in mobile apparatus, or the like. For example, the terminal device may be a device, for example, a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may include an information sensing device, for example, a barcode, a radio frequency identification (RFID) device, a sensor, a global positioning system (GPS), or a laser scanner.

As an example instead of a limitation, the terminal device in the embodiments of this application may alternatively be a wearable device. The wearable device may also be referred to as a wearable intelligent device, an intelligent wearable device, or the like, and is a general term for wearable devices that are developed by applying a wearable technology to perform intelligent design on daily wear, for example, glasses, gloves, a watch, clothes, and shoes. The wearable device is a portable device that is directly worn on a body or integrated into clothes or an accessory of a user. The wearable device is not only a hardware device, but also a device for implementing a powerful function through software support, data exchange, and cloud interaction. In a broad sense, the wearable intelligent device includes a full-featured and large-sized device, for example, a smart watch or smart glasses, that can implement complete or partial functions without depending on a smartphone, and includes a device, for example, various smart bands, smart helmets, or smart jewelry for monitoring physical signs, that focuses on only one type of application function and needs to collaboratively work with another device such as a smartphone.

(2) Road side apparatus: The road side apparatus, for example, a road side unit (RSU), may be a fixed infrastructure entity that supports a vehicle-to-everything (V2X) application, and may exchange a message with another entity that supports the V2X application. Alternatively, the road side apparatus may be another apparatus disposed on a road side or at another position.

In an autonomous driving application scenario, the road side unit (RSU) or another vehicle detects a surrounding road environment by using a sensor, and notifies a self-driving car or a vehicle having an assisted driving function of a target (including an obstacle and a traffic participant, such as a vehicle or a pedestrian) and a position of the target in the detected road environment, to enhance a capability of sensing the surrounding target by the vehicle, and expand a detection range of the vehicle. The RSU can obtain a relatively high-precision target position, to enhance sensing precision of the vehicle. The another vehicle can also obtain a target position on a road ahead.

(3) Electronic map: The electronic map is also referred to as a digital map, and is a map storage and queried digitally by using a computer technology, for example, a navigation map and a high-precision map. The navigation map includes map data used by a driver, is an electronic map (or a digital map) that provides a road-level navigation function, and has functions of map display, position positioning, and road guidance. Precision usually reaches a meter level. The high-precision map includes map data (including information such as a lane, a road, a traffic sign, a traffic signal light, and a positioning layer) used by a self-driving car, and is an electronic map that provides a high-precision positioning function and road-level and lane-level planning and guidance functions. Precision of the high-precision map can reach a centimeter level. In addition to high-precision coordinate information, accurate road condition information, such as a length and a width, a gradient, and curvature that are of a lane, is also included. The electronic map may be stored in a map server, or may be stored in a vehicle-mounted apparatus or a road side apparatus. This is not limited herein. A map server that stores the high-precision map may transmit the target position (or a position of a ground object) to a vehicle ("ego-car") having an autonomous driving function or an assisted driving function, so that safe and smooth autonomous driving experience of the vehicle can be improved.

Because coordinate systems of high-precision maps based on different drawing sources may be different, measurement precision of high-precision maps may be different, or the like, map data in the high-precision maps may be incompatible. Therefore, in this application, identifiers of the high-precision maps based on the different drawing sources may be used to distinguish between high-precision maps based on same drawing sources. For example, an identifier of a first high-precision map based on a first drawing source is represented as M1, and an identifier of a second high-precision map based on a second drawing source is represented as M2. Further, identifiers may also be used to distinguish between coordinate systems corresponding to different high-precision maps. For example, a coordinate system identifier of the first high-precision map based on the first drawing source is represented as M1-CS, and a coordinate system identifier of the second high-precision map based on the second drawing source is represented as M2-CS.

A coordinate system of the electronic map may be a geodetic coordinate system (GCS), which is also referred to as a global absolute coordinate system, for example, a world geodetic system 1984 (WGS84), or may be a reference-ellipsoid-centric coordinate system (RECCS), a China geodetic coordinate system 2000 (CGCS2000), or a Beijing 54 coordinate system (BJZ54). The coordinate system used by the electronic map is not limited in the embodiments of this application.

(4) Terms: The terms "system" and "network" may be used interchangeably in the embodiments of this application. "At least one" indicates one or more, and "a plurality of" indicates two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

In addition, unless otherwise specified, ordinal numbers such as "first" and "second" mentioned in the embodiments of this application are used to distinguish between a plurality of objects, and are not used to limit a sequence, a time sequence, a priority, or an importance degree of the plurality of objects. For example, a first road and a second road are merely intended to distinguish between different roads, but do not indicate that the two roads have different priorities, different importance degrees, or the like.

Autonomous driving is based on vehicle-to-everything (V2X). Therefore, in a network architecture shown in FIG. 1A, a sidelink SL belongs to a short-distance communication manner, and a coverage distance of the SL is usually within 1000 meters, so that communication between vehicles, between a vehicle and an RSU, between a vehicle and a pedestrian/a non-motor vehicle, and the like can be implemented. A Uu air interface is a communications interface between a vehicle and a network device or another entity, and may implement communication between the vehicle and the network device. For example, the vehicle may communicate with a core network device by using an access network device, the vehicle may be connected to the access network device through the Uu air interface, and the access network device may be connected to the core network device in a wired manner. The core network device may implement communication with any vehicle or road side infrastructure by using the access network device, to implement a vehicle-to-network-to-everything (V2N2X) scenario. The V2X includes vehicle-to-vehicle (V2V) communication, vehicle-to-infrastructure (V2I) communication, vehicle-to-network (V2N) communication, and vehicle-to-pedestrian (V2P) communication, and is related to real-time communication of value-added applications such as road safety, traffic efficiency, and intelligent traffic system. Based on V2X communication, a vehicle may exchange data with a surrounding environment, vehicles may interact with each other, a vehicle may interact with portable UE carried by a pedestrian, or a vehicle may interact with a surrounding infrastructure such as a traffic light in a specific range. The vehicle may obtain a series of information such as a real-time road condition, road information, and pedestrian information through the interaction, and perform a corresponding prompt/corresponding control on a driving process based on an actual situation, for example, a collision warning ahead, a crossroad giving way, a special vehicle giving way, and a traffic congestion prompt, to improve road safety and traffic efficiency.

For example, FIG. 1A shows a network architecture to which an embodiment of this application is applicable. The network architecture includes one or more of a first vehicle 101, a second vehicle 102, an RSU 103, a non-motor vehicle/pedestrian 104, an internet of vehicles V2X server 105, or a network device 106.

The first vehicle 101 may be connected to the second vehicle 102 through a sidelink (SL). Communication between the first vehicle 101 and the second vehicle 102 may be referred to as vehicle-to-vehicle (V2V) communication, and the connection between the first vehicle 101 and the second vehicle 102 may be referred to as a V2V connection. V2V indicates a connection between different vehicles. The first vehicle 101 may be connected to the RSU 103 through an SL. Communication between the first vehicle 101 and the RSU 103 may be referred to as vehicle-to-infrastructure (V2I) communication, and the connection between the first vehicle 101 and the RSU 103 may be referred to as a V2I connection. V2I indicates a connection between a vehicle and a road infrastructure, for example, a connection between a vehicle and a traffic light. The first vehicle 101 may be connected to the non-motor vehicle/pedestrian 104 through an SL. Communication between the first vehicle 101 and the non-motor vehicle/pedestrian 104 may be referred to as vehicle-to-pedestrian (V2P) communication, and the connection between the first vehicle 101 and the non-motor vehicle/pedestrian 104 is referred to as a V2P connection. V2P may indicate a connection between a vehicle and a pedestrian or a non-motor vehicle. The first vehicle 101 is connected to the V2X server 105 by using the network device 106. For example, the first vehicle 101 may be connected to the network device 106 through a Uu air interface, and the network device 106 may be connected to the V2X server 105 in a wired or wireless manner. The wired manner may be an Ethernet network, an optical network, or the like, and the wireless manner may be a Uu air interface or the like. This is not limited. Communication between the first vehicle 101 and the network device 106 may be referred to as vehicle-to-network (V2N) communication, and the connection between the first vehicle 101 and the network device 106 may be referred to as a V2N connection. V2N may indicate a connection between a vehicle and a network.

Optionally, in the network architecture shown in FIG. 1A, the second vehicle 102 may be connected to the V2X server 105 by using the network device 106. The V2X server 105 may be connected to the RSU 103 in a wired manner or a wireless manner, and is configured to: manage and control the RSU 103. In this application, the V2X server 105 may be a server based on a high-precision map, and is configured to manage position information of each object (for example, the first vehicle 101, the second vehicle 102, or the RSU 103) on the high-precision map. Specifically, the V2X server 105 may obtain position information of a measurement target (an object whose position information is to be determined) on the high-precision map in one or any combination of the following manners: obtaining the position information of the measurement target by using a sensing apparatus disposed on a road side. The sensing apparatus is, for example, a sensor, and the sensing apparatus can obtain information about a road and/or information about an object on the road. The sensing apparatus may be a part of a road side apparatus or a vehicle-mounted apparatus, for example, a function unit of the road side apparatus or the vehicle-mounted apparatus. Alternatively, the sensing apparatus and the road side apparatus or the vehicle-mounted apparatus may be different apparatuses independent of each other, and the sensing apparatus can communicate with the road side apparatus or the vehicle-mounted apparatus. Regardless of whether the sensing apparatus is the part of the road side apparatus or the vehicle-mounted apparatus, the sensing apparatus may be disposed on the road side apparatus or the vehicle-mounted apparatus, or the sensing apparatus may be disposed independently of the road side apparatus or the vehicle-mounted apparatus, for example, the sensing apparatuses may be disposed on a road side in a distributed manner, to collect more information. Alternatively, the sensing apparatus receives position information of at least one vehicle on the road. Alternatively, the sensing apparatus may obtain the position information of the measurement target by using a cloud server. The cloud server is, for example, a server disposed in a traffic management department. This is not specifically limited.

FIG. 1A is merely an example for description, and is not intended to limit this application. For example, in the architecture shown in FIG. 1A, the RSU may be replaced with a road infrastructure or the like. Alternatively, another quantity of vehicles, non-motor vehicles/pedestrians, RSUs, and the like may be included. Alternatively, the V2X server may be directly connected to the first vehicle 101, the second vehicle 102, and the like through a Uu air interface. This is not limited.

Figure 1B:
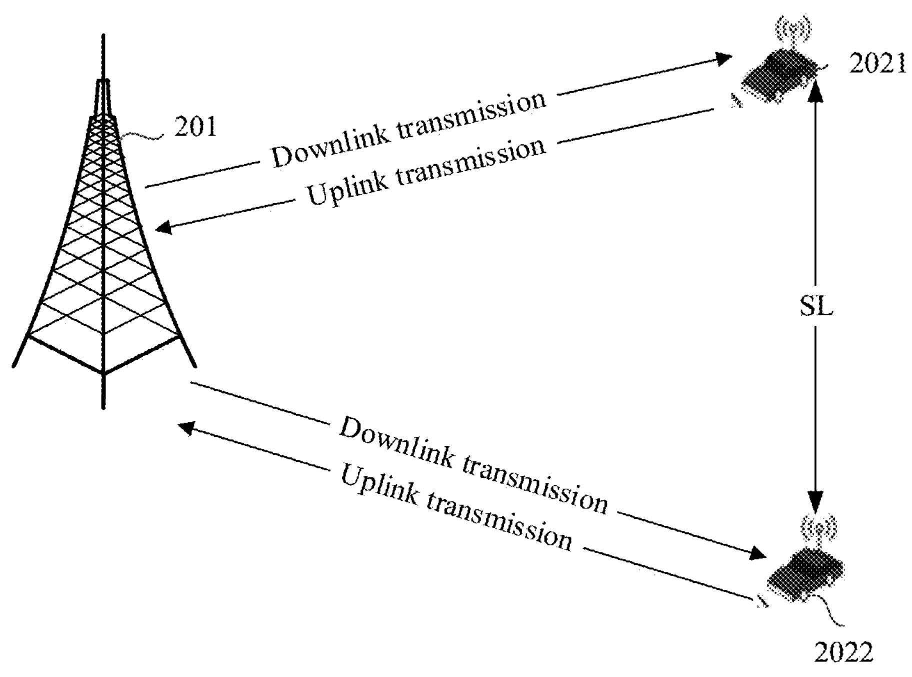

FIG. 1B shows another network architecture to which an embodiment of this application is applicable. The network architecture includes the V2X server 105, the network device 106, a measurement device 2021, and a vehicle-mounted apparatus 2022. The measurement device 2021 may be any one of the first vehicle 101, the second vehicle 102, and the RSU 103 in FIG. 1A. The vehicle-mounted apparatus 2022 may be either of the first vehicle 101 and the second vehicle 102 in FIG. 1A. For ease of description, an example in which the measurement device 2021 is a device that measures a position of a target, and the vehicle-mounted apparatus 2022 is a device (for example, a vehicle) that requests to measure position information of a target is used for description.

Data transmission may be performed between the measurement device 2021 and the V2X server 105, and between the vehicle-mounted apparatus 2022 and the V2X server 105 by using a Uu air interface resource of the network device 106. Data transmission may include downlink data transmission and/or uplink data transmission. The downlink data (for example, data carried on a PDSCH) transmission may indicate that the network device sends data to the terminal device, and the uplink data (for example, data carried on a PUSCH) transmission may indicate that the terminal device sends data to the network device. The data may be data in a broad sense, for example, may be user data, or may be system information, broadcast information, or other information. In the network architecture shown in FIG. 1B, data transmission may also be performed between the measurement device 2021 and the vehicle-mounted apparatus 2022 by using a sidelink (SL) resource. Similar to the air interface resource, the sidelink resource may also include at least one of a time domain resource, a frequency domain resource, and a code domain resource. Specifically, a physical channel for data transmission between the vehicle-mounted apparatus 2022 and the measurement device 2021 may include a physical sidelink shared channel (PSSCH) and/or a physical sidelink control channel (PSCCH). The PSSCH is used to transmit data, and the PSCCH is used to transmit control information, for example, scheduling assignment (SA) information. It should be noted that the embodiments of this application may be applied to a 4th generation (4G) communications system, for example, a long term evolution (LTE) system, a 5th generation (5G) communications system, for example, a new radio (NR) system, various future evolved communications systems, for example, the internet of things, the internet of vehicles, and a sixth generation (6G) communications system, or the like. This is not limited. FIG. 1B shows an example of one network device and two devices. Optionally, the network architecture may further include a plurality of network devices and may include another quantity of devices in a coverage area of one network device. This is not limited in this embodiment of this application.

Based on the network architectures shown in FIG. 1A and FIG. 1B, this application provides an application scenario. In an assisted driving scenario or an autonomous driving scenario, a driving vehicle needs to sense a surrounding environment. To maintain a safe driving environment, the driving vehicle needs to learn of status information of a surrounding vehicle, for example, position information. For example, the driving vehicle may obtain the position information of the surrounding vehicle through detection by using a vehicle sensor installed on the vehicle. For another example, the driving vehicle may obtain the position information of the surrounding vehicle in a V2X manner. Certainly, the driving vehicle may alternatively obtain position information of a surrounding vehicle on a high-precision map by using the V2X server. Subsequently, the driving vehicle may plan a possible driving route for an assisted driving function or an autonomous driving function based on obtained information such as a distance of a surrounding environment with reference to related information such as a vehicle posture of the driving vehicle, provide a corresponding control command with reference to a vehicle dynamics model, and send the control command to an executor for execution, to complete the assisted driving function and the autonomous driving function.

In a possible solution, for example, the measurement device is the RSU 103. The RSU 103 may periodically report measured position information of a measurement target, to notify the vehicle-mounted apparatus or the V2X server. The measurement target may be any one of a vehicle, a non-motor vehicle/pedestrian, an RSU, and the like. The vehicle-mounted apparatus or the V2X server may learn of the position information of the measurement target, for example, a real-time position, by using a reported message, to perform path planning, control, and the like. For example, the first vehicle 101 is the measurement target. The RSU 103 may periodically report measured position information of the first vehicle 101, to notify the second vehicle 102 and the V2X server 105. The second vehicle 102 and the V2X server 105 may learn of the position information of the first vehicle 101 by using a reported message. Certainly, the second vehicle 102 or the V2X server 105 may further send a query request for the position information of the first vehicle 101 to the RSU 103, so that the RSU 103 measures a position of the first vehicle 101, to obtain position information of the first vehicle 101 relative to the RSU 103.

In another possible solution, the vehicle-mounted apparatus may be a vehicle adjacent to the measurement target. For example, the second vehicle 102 may measure a position of the first vehicle 101 relative to the second vehicle 101, and the second vehicle 102 may periodically report position information of the first vehicle 101 relative to the second vehicle 101, to notify the V2X server 105 or the vehicle-mounted apparatus. The V2X server 105 or the vehicle-mounted apparatus may learn of the position information of the first vehicle 101 relative to the second vehicle 101 by using a message reported by the second vehicle 102, to perform path planning, control, and the like on the vehicle-mounted apparatus.

Figure 2:
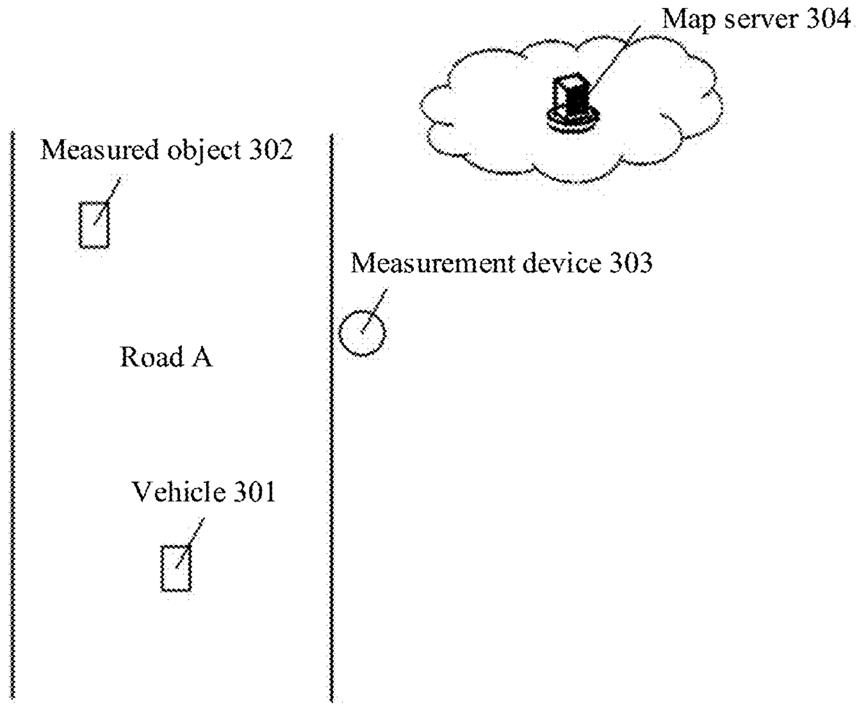
FIG. 2 is a schematic diagram of an application scenario according to an embodiment of this application.

FIG. 2 is a schematic diagram of a typical application scenario of a positioning method according to an embodiment of the present application. A vehicle 301 is a vehicle driving on a road A, and the vehicle 301 needs to learn of precise position information of a measured object 302 in front of the vehicle 301, to provide an autonomous driving system on the vehicle 301 for decision-making and control. The measured object 302 is typically another vehicle or pedestrian moving on the road A, or may be another moving object. A measurement device 303 is configured to measure a position of the measured object 302. The measurement device 303 is typically a road side unit RSU, or may be another device having a measurement function, for example, another vehicle or mobile terminal. A cloud map server 304 stores a high-precision map, and may obtain position information of the vehicle 301 on the high-precision map. To obtain relatively precise relative position information between the measured object 302 and the vehicle 301, in this embodiment of the present application, the position information that is of the measured object 302 and that is obtained by the measurement device 303 through measurement is transformed into the position information on the high-precision map. Specifically, the transformation manner is determined based on a position and a posture that are of the measurement device on the high-precision map. According to this embodiment of the present application, this can overcome a technical problem that there is a relatively large deviation in estimation of a relative distance between a positioning position of the vehicle and a target position because a positioning offset that is of the vehicle and that is positioned based on the high-precision map is inconsistent with an offset that is of the measured object 302 and that is detected by the measurement device 303 that does not use the high-precision map.

Figure 3:
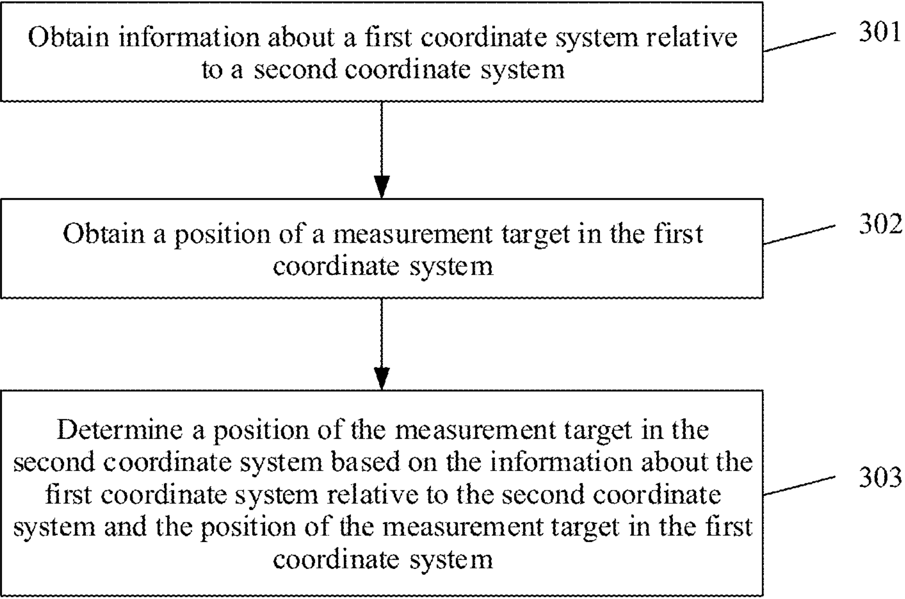
FIG. 3 is a flowchart of a positioning method according to an embodiment of this application.

As shown in FIG. 3, the positioning method includes the following steps.

Step S301: A first device obtains information about a first coordinate system relative to a second coordinate system.

The first coordinate system is a coordinate system used by a measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system.

In this embodiment of this application, in a possible design, the first device may obtain an identifier of the measurement device, and further obtains the information about the first coordinate system relative to the second coordinate system based on the identifier of the measurement device. The identifier of the measurement device may include one or more of the following: a number of the measurement device in the second coordinate system, or a unique number of the measurement device. Therefore, position information of the measurement device in the second coordinate system is determined by using the identifier of the measurement device, and the information about the first coordinate system relative to the second coordinate system is further determined, to distinguish between different second coordinate systems used by different maps, thereby effectively distinguishing between different information about the first coordinate system relative to the second coordinate systems, and improving precision of relative positions of measurement targets relative to the vehicle in different map coordinate systems.

For example, the measurement device is an RSU. For ease of description, the first coordinate system may be a coordinate system (RSU-LCS coordinate system) that is established by the RSU and that uses the RSU as an origin, and the second coordinate system used by the map may be a first high-precision map coordinate system (M1-CS). Therefore, the information about the first coordinate system relative to the second coordinate system may be coordinate transformation information that is of the measurement device relative to the first high-precision map coordinate system and that is obtained when the measurement device determines a position of a measurement target in the first coordinate system. The coordinate transformation information may be coordinate transformation information of the LCS coordinate system in which the measurement device is located and that is relative to the first high-precision map coordinate system (M1-CS).

For example, one of a center point of the RSU, an origin of a coordinate system of the RSU, or an outer line vertex of the RSU may be used as a position point of the RSU in the coordinate system, and the position point of the RSU is used as the origin of the RSU-LCS coordinate system. In this case, position information of the RSU in the RSU-LCS coordinate system may include one or more of the following: coordinate information of the RSU in the RSU-LCS coordinate system, and initial rotation information (for example, a horizontal angle or a pitch angle. For ease of description, an initial posture of the RSU may be used as a coordinate axis of the RSU-LCS coordinate system. To be specific, the initial rotation information is 0) of the RSU in the RSU-LCS coordinate system. Because coordinates of the RSU in the RSU-LCS coordinate system are the origin, the position information of the RSU in the RSU-LCS coordinate system is position information of the origin of the RSU-LCS coordinate system. Certainly, the RSU-LCS coordinate system may alternatively be a coordinate system established without using the RSU as the origin. In this case, the coordinate information of the RSU in the RSU-LCS coordinate system is not the origin. The RSU coordinate system may be established in a plurality of manners. This is not limited herein.

For ease of description, an example in which the origin of the RSU-LCS coordinate system is the RSU is used below for description. In this case, in the second coordinate system of a first high-precision map M1-CS, the position information of the RSU may include coordinate position information of the RSU in the second coordinate system of the M1-CS and rotation information of the RSU in the second coordinate system of the M1-CS. The coordinate position information of the RSU in the M1-CS coordinate system may be represented as coordinate position information of the origin of the RSU-LCS coordinate system in the M1-CS coordinate system, and the rotation information of the RSU in the M1-CS coordinate system may be represented as rotation information of the origin of the RSU-LCS coordinate system in the M1-CS coordinate system, namely, rotation information of the coordinate axis that is of the RSU-LCS and that is relative to a coordinate axis of the M1-CS.

According to a coordinate transformation principle, coordinate transformation between the first coordinate system (RSU-LCS) and the second coordinate system (first high-precision map coordinate system M1-CS) may be implemented through translation transformation and/or rotation transformation. To be specific, the coordinate transformation information of the RSU-LCS coordinate system relative to the M1-CS coordinate system may include at least one of the following: translation transformation information of the RSU-LCS coordinate system relative to the M1-CS coordinate system, and rotation transformation information of the RSU-LCS coordinate system relative to the M1-CS coordinate system.

(1) The translation transformation information of the RSU-LCS coordinate system in the M1-CS may be represented as a coordinate position $(p_{RSU})_{M1\text{-}CS}$ of the origin of the RSU-LCS coordinate system in the M1-CS coordinate system, or a translation vector from the RSU-LCS coordinate system to the M1-CS coordinate system.

In a possible design, in a scenario in which a coordinate position of the measurement device is fixed (for example, the measurement device is the RSU, and the coordinate position of the measurement device may be fixed), the translation transformation information of the origin of the LCS coordinate system relative to the M1-CS coordinate system is a fixed value. Therefore, the fixed value may be referred to as initial translation transformation information of the origin of the LCS coordinate system relative to the M1-CS coordinate system, and the initial translation transformation information is used as one item in initial information of the measurement device and is pre-stored in a server or the measurement device. Another device may obtain the initial translation transformation information from the server or the measurement device by sending a query request for an initial position of the measurement device on the first high-precision map.

In a possible design, in a scenario in which a coordinate position of the measurement device is not fixed (for example, the measurement device is the RSU, and the coordinate position of the measurement device may change with different high-precision maps), the translation transformation information of the LCS coordinate system in the M1-CS changes with movement of the measurement device. Therefore, when obtaining a measurement value of the measurement target, the measurement device needs to report a coordinate position $(p_{301})_{M1\text{-}CS}$ that is of the origin of the LCS coordinate system in the M1-CS coordinate system and that is obtained when the measurement device determines the position of the measurement target in the first coordinate system, or the translation vector that is from the LCS coordinate system to the M1-CS coordinate system and that is obtained when the measurement device determines the position of the measurement target in the first coordinate system. In a possible manner, the translation transformation information of the LCS relative to the M1-CS coordinate system may be used as one item in the measurement value of the measurement target, and is sent together with measurement information reported by the RSU, or may be separately sent. This is not limited herein.

(2) The rotation transformation information of the LCS coordinate system relative to the M1-CS coordinate system may include at least one of the following: Euler angles (α, β, γ) of the LCS coordinate system with respect to the M1-CS coordinate system, a rotation quaternion from the LCS coordinate system to the M1-CS coordinate system, a rotation vector from the LCS coordinate system to the M1-CS coordinate system, or a rotation matrix $$R_{LCS}^{M1-CS}$$

from the LCS coordinate system to the M1-CS coordinate system; or

Euler angles (α, β, γ) of the M1-CS coordinate system with respect to the LCS coordinate system, a rotation vector from the M1-CS coordinate system to the LCS coordinate system, a rotation quaternion from the M1-CS coordinate system to the LCS coordinate system, or a rotation matrix $$R_{M1-CS}^{LCS}$$

from the M1-CS coordinate system to the LCS coordinate system.

Euler angles: The Euler angles are a group of three independent angle parameters (α, β, γ) used to determine a position of a fixed-point rotation rigid body, and include a nutation angle, a precession angle, and an intrinsic rotation angle.

Rotation matrix: The rotation matrix from the LCS coordinate system to the M1-CS coordinate system or the rotation matrix from the M1-CS coordinate system to the LCS coordinate system can be obtained based on the Euler angles of the LCS coordinate system with respect to the M1-CS coordinate system.

The rotation matrix may be represented by using a rotation quaternion. The rotation quaternion may be represented as $q=[s, v]^T$, and a relationship between the rotation quaternion and the rotation matrix $$R_{LCS}^{M1-CS}$$

is as follows:

$$R=vv^T+s^2I+2sv^{\wedge}+(v^{\wedge})^2$$

The rotation matrix may be represented by using a rotation vector. The rotation vector may be represented by a rotation axis n (n is a vector) and a rotation angle θ. In other words, the rotation vector is θn. A relationship between the rotation vector and the rotation matrix $$R_{LCS}^{M1-CS}$$

is as follows:

$$R=\cos\theta I+(1-\cos\theta)nn^T+\sin\theta n^{\wedge}$$

Herein, $n^T$ indicates transposition of n.

$$n^{\wedge}=\begin{bmatrix} 0 & -n_3 & n_2 \\ n_3 & 0 & -n_1 \\ -n_2 & n_1 & 0 \end{bmatrix};$$

$$n=[n1, n2, n3]^T; \text{ and}$$

$$\theta=\arccos\frac{tr(R)-1}{2}.$$

n is an eigenvector corresponding to a maximum eigenvalue of R.

Therefore, the rotation matrix $$R_{LCS}^{M1-CS}$$

may be obtained through calculation based on one or more of the Euler angles of the LCS coordinate system with respect to the M1-CS coordinate system, the rotation vector, and the rotation quaternion.

In a possible design, in a scenario in which a posture of the measurement device is fixed, the rotation transformation information of the LCS coordinate system in the M1-CS is a fixed value. The fixed value may be used as initial rotation information in the initial information of the measurement device and is pre-stored in the server or the measurement device. The server or the measurement device does not need to obtain the initial rotation information by sending a request. For ease of description, when the coordinate transformation information of the LCS coordinate system relative to the M1-CS coordinate system is established, posture information of the measurement device in the M1-CS coordinate system may be referred to as the initial rotation information of the measurement device in the M1-CS coordinate system below. In a specific implementation process, the initial rotation information of the measurement device in the M1-CS coordinate system may be used as one item in the initial information of the measurement device and is pre-stored in the map server or the measurement device.

In a possible design, in a scenario in which a posture of the measurement device is not fixed, the rotation transformation information of the LCS coordinate system in the M1-CS changes with the position of the measurement target of the measurement device. Therefore, when the measurement device needs to obtain a measurement value of the measurement object, the measurement device further needs to report the rotation transformation information that is of the measurement device and that is obtained when the measurement device determines the position of the measurement target in the first coordinate system, for example, rotation information that is of the measurement device or rotation differential information that is of the measurement device and that is obtained when the measurement device determines the position of the measurement target in the first coordinate system.

The rotation information of the measurement device may be rotation transformation information that is of the LCS coordinate system in the M1-CS and that is obtained when the measurement device determines the position of the measurement target in the first coordinate system. The rotation differential information may be rotation information that is of the LCS coordinate system relative to an LCS coordinate system corresponding to the measurement device in the initial position and that is obtained when the measurement device determines the position of the measurement target in the first coordinate system. Further, the rotation information of the measurement device in the M1-CS coordinate system may be determined by using the initial rotation information of the measurement device in the M1-CS coordinate system and the rotation differential information of the measurement device. For example, when the LCS coordinate system is in the initial position, Euler angles corresponding to the initial rotation information are [0, 0, 90]. When determining the position of the measurement target in the first coordinate system, the measurement device rotates 30 degrees counterclockwise in a horizontal direction. In this case, an intrinsic rotation angle of the measurement device increases by 30 degrees relative to the Euler angles in the initial position. That is, Euler angles corresponding to the rotation differential information are [0, 0, 30]. The rotation information of the measurement device may be determined based on the initial rotation information and the rotation differential information. That is, Euler angles corresponding to the rotation information of the measurement device are [0, 0, 120].

In another possible manner, the rotation differential information of the measurement device may be rotation differential information of the measurement device relative to last reported posture information. Further, previous rotation information of the measurement device in the M1-CS coordinate system may be determined by using rotation differential information last reported by the measurement device. The rotation information of the origin of the LCS coordinate system in the M1-CS coordinate system may be determined based on the previous rotation information of the measurement device in the M1-CS coordinate system and rotation differential information currently reported by the measurement device. For example, when position information is last reported in the LCS coordinate system, Euler angles corresponding to the rotation information are [0, 0, 120]. When determining the position of the measurement target in the first coordinate system, the measurement device rotates 30 degrees counterclockwise in a horizontal direction. In this case, an intrinsic rotation angle of the measurement device increases by 30 degrees relative to the Euler angles in the initial position. That is, Euler angles corresponding to the rotation differential information are [0, 0, 30]. The rotation information of the measurement device may be determined based on the rotation information and the rotation differential information that are last reported. That is, Euler angles corresponding to the rotation information of the measurement device are [0, 0, 150].

In conclusion, the position information that is of the measurement target and that is measured in the LCS coordinate system may be transformed into position information of a measurement target in the M1-CS coordinate system by determining the coordinate transformation information of the LCS coordinate system relative to the M1-CS coordinate system.

Step S302: The first device obtains the position of the measurement target in the first coordinate system.

The position of the measurement target in the first coordinate system is obtained by the measurement device through measurement. To be specific, position information $(q_{target})_{LCS}$ of the measurement target relative to the measurement device is obtained.

Step S303: The first device determines a position of the measurement target in the second coordinate system based on the information about the first coordinate system relative to the second coordinate system and the position of the measurement target in the first coordinate system.

Specifically, the position information $(q_{target})_{LCS}$ that is of the measurement target in the LCS coordinate system and that is measured by the measurement device may be transformed into position information $(p_{target})_{M1-CS}$ of the measurement target in the M1-CS through coordinate transformation.

Specifically, coordinate transformation may be performed according to the following method.

$$(p_{target})_{M1-CS} = g_{LCStoM1-CS}\left((q_{target})_{LCS}, R_{LCS}^{M1-CS}, (p_{301})_{M1-CS}\right) = R_{LCS}^{M1-CS} \times (q_{target})_{LCS} + (p_{RSU})_{M1-CS}$$

The rotation matrix is used as an example. The rotation matrix is determined based on an initial rotation matrix of the measurement device on the first high-precision map and rotation differential information obtained when the measurement device determines the position of the measurement target in the first coordinate system. Alternatively, the rotation matrix is determined based on rotation information of the measurement device on the first high-precision map.

A first vehicle V1 performs vehicle positioning based on a high-precision map. For example, the first vehicle V1 performs visual positioning based on positioning layer information that is in the first high-precision map coordinate system (M1-CS) and that is provided by the first high-precision map and surrounding environment information collected by the first vehicle V1, to obtain a positioning position $p_{ego-car}$ of the first vehicle V1 in the high-precision map coordinate system (M1-CS) through estimation.

In a process of preparing the high-precision map, due to measurement precision of a sensing apparatus (for example, an RSU or a device on which a sensing apparatus is disposed) or the like, in the first high-precision map coordinate system (M1-CS), an absolute offset $\Delta_0$ may be generated between a position of a ground object on the first high-precision map and an actual position of the ground object. For example, a position of the road A on the first high-precision map has an offset of 0.5 m to 1 m to the right relative to an actual position of the road A, and a position of the RSU on the first high-precision map has an offset of 0.5 m to 1 m to the right relative to an actual position of the RSU. Therefore, the positioning position $p_{ego-car}$ that is of the first vehicle V1 and that is positioned based on the first high-precision map also has at least a measurement error of the absolute offset $\Delta_0$. In addition, due to limitations of a weather condition and precision of the measurement device, a position $q_{target}$ that is of a second vehicle V2 relative to the RSU and that is detected by the RSU based on the coordinate system of the RSU also has an offset Δ'. Herein, Δ' is not affected by the absolute offset $\Delta_0$ of preparing the high-precision map. Therefore, Δ' and $\Delta_0$ are independent of each other. For example, Δ'=+0.5 m (indicating that there is an offset of 0.5 m to the right); and $\Delta_0$=0 m (indicating that there is no offset). Because the two offsets are inconsistent with each other, an error of a relative position between the positioning position $p_{ego-car}$ of the first vehicle V1 and the position $q_{target}$ of the second vehicle V2 relative to the RSU includes at least $\Delta_0$+Δ', and an error of a relative position between the positioning position $p_{ego-car}$ of the first vehicle V1 and a position $p_{target}$ of the second vehicle V2 includes at least $2\Delta_0$+Δ'. Therefore, an error of estimating a relative position between the first vehicle V1 and the second vehicle V2 increases. This is unfavorable for the first vehicle to obtain safe and smooth autonomous driving experience.

In conclusion, in a process of performing path planning, security threat analysis, and the like on a current vehicle, the current vehicle needs to use information such as a position of each object in an environment to determine the relative position between the first vehicle and the second vehicle. The position information $(p_{target})_{M1-CS}$ that is of the measurement target in the M1-CS and that is obtained through coordinate transformation adapts to the first high-precision map coordinate system M1-CS, to effectively reduce an error of estimating a relative position between the vehicle-mounted apparatus and the measurement target.

In this embodiment of this application, the first device may be the vehicle 301 or a component in the vehicle 301 in FIG. 2. The first device may alternatively be the measurement device 303 in FIG. 2, for example, a road side unit RSU, another vehicle, or a component in another vehicle. The first device may alternatively be the map server 304 in FIG. 2. After obtaining the information about the first coordinate system relative to the second coordinate system and the position of the measurement target in the first coordinate system, the first device may transform the position of the measurement target in the first coordinate system into the position of the measurement target in the second coordinate system based on the information about the first coordinate system relative to the second coordinate system. Because the coordinate system used by the map is the second coordinate system, the position of the measurement target in the second coordinate system and the position of the vehicle may be determined by using the foregoing method, so that the vehicle can obtain the relative position of the measurement target relative to the vehicle, to avoid a case in which an error of the relative position of the measurement target relative to the vehicle is relatively large because the measurement target uses the coordinate system used by the measurement device and the vehicle uses the coordinate system of the map, and consequently autonomous driving safety is affected.

The following describes specific implementations of this application based on specific scenarios. In the following embodiments, an example in which the related map is a high-precision map is used for description. For an implementation of another map, refer to the following embodiments. Details are not described herein.

Figure 4:
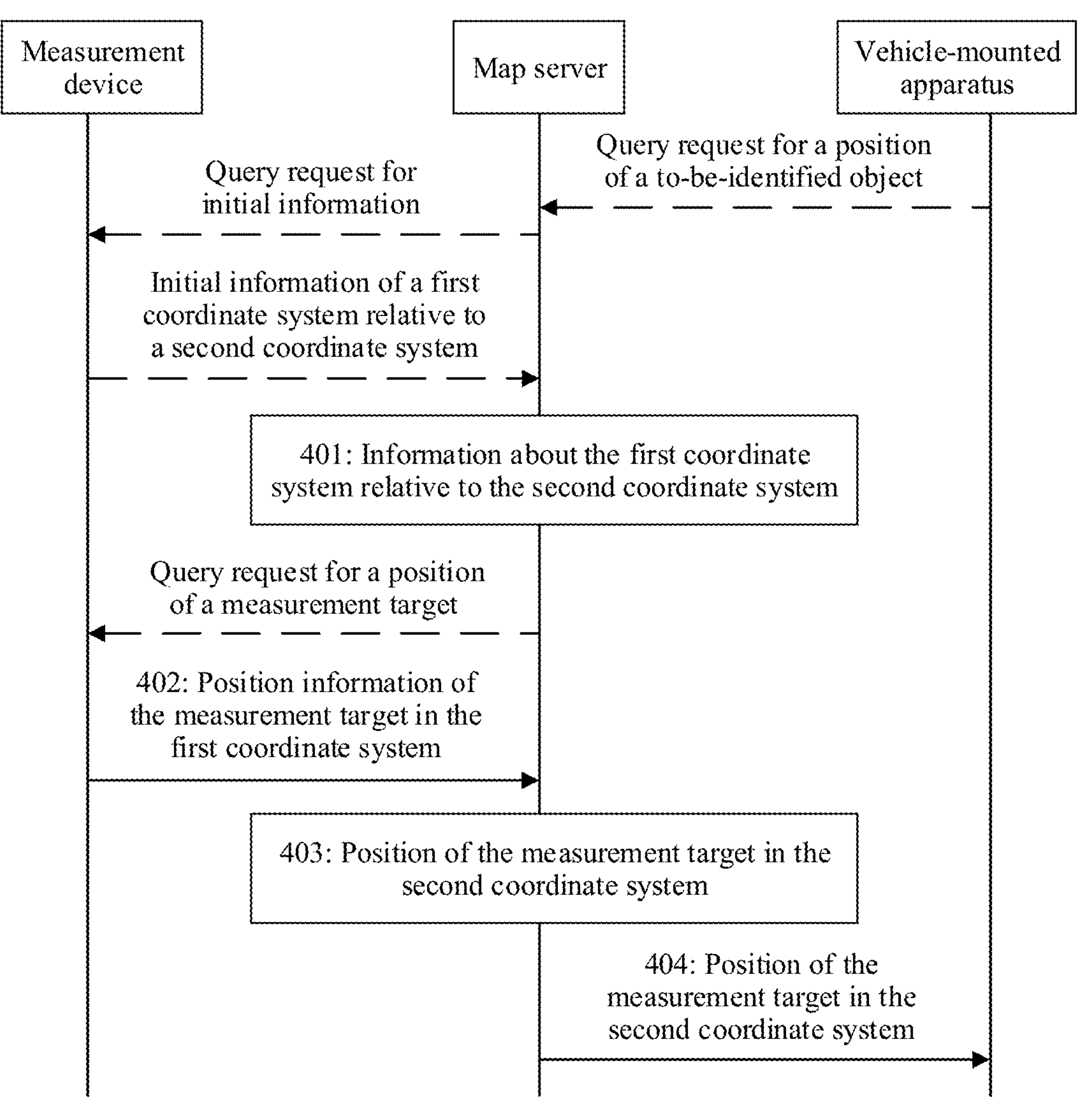
FIG. 4 is a flowchart of a positioning method according to an embodiment of this application.
Figure 5:
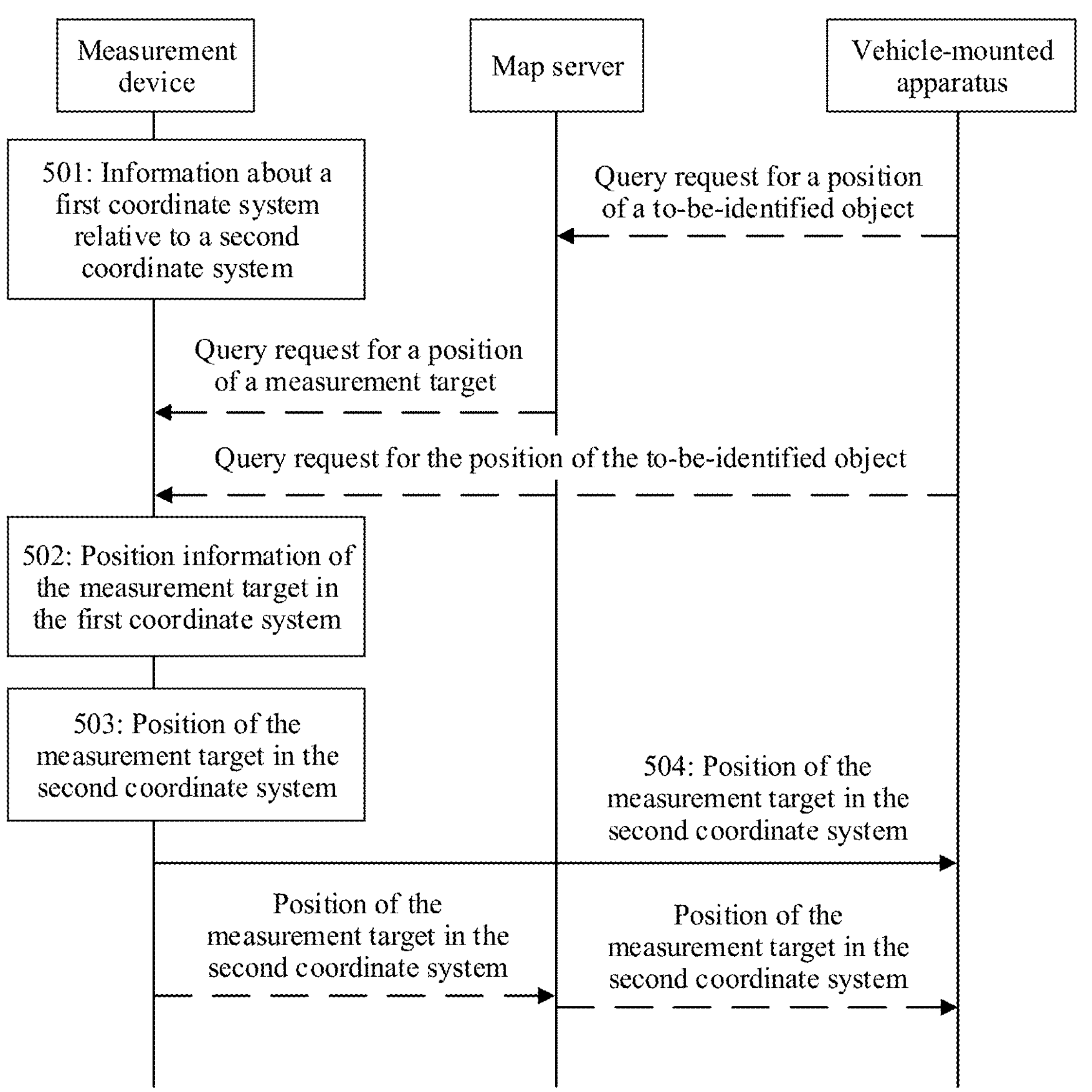
FIG. 5 is a flowchart of a positioning method according to an embodiment of this application.
Figure 6:
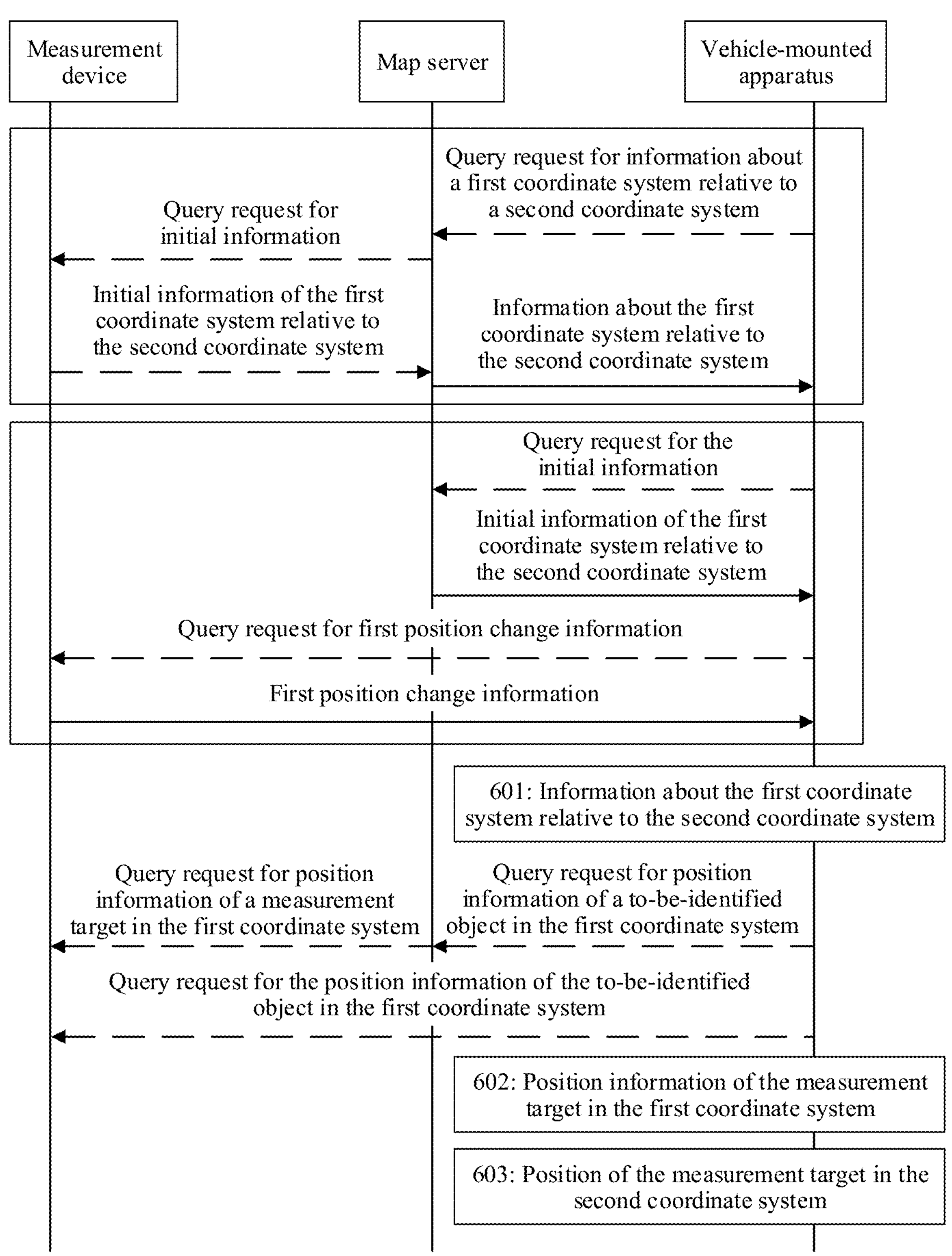
FIG. 6 is a flowchart of a positioning method according to an embodiment of this application.

As shown in FIG. 4 to FIG. 6, a procedure of the positioning method is provided. The procedure may be performed by a measurement device, a vehicle-mounted apparatus, or a map server. The map server may be the V2X server in the foregoing embodiment, or may be another server that stores a high-precision map, or may be a server that performs navigation planning. This is not limited herein. The measurement device in the method includes a sensing apparatus. The measurement device is a device that measures position information of a target, and the measurement device may be the RSU 103, the first vehicle 101, or the second vehicle 102 in FIG. 1A. The vehicle-mounted apparatus 302 may be a device that requests to measure position information of a target, and may be the first vehicle 101 or the second vehicle 102 in FIG. 1A. The measurement target may be a to-be-identified object that needs to be obtained by a vehicle corresponding to the vehicle-mounted apparatus. The to-be-identified object may be an object such as an object or a pedestrian in a preset range, for example, the first vehicle 101 or the second vehicle 102 in FIG. 1A.

The map server may store position information of the measurement device in a high-precision map coordinate system. The position information may include initial information, historical information, and the like. The initial information includes initial translation transformation information of the measurement device in the high-precision map coordinate system and initial rotation information of the measurement device in the high-precision map coordinate system. The high-precision map coordinate system includes at least a first high-precision map coordinate system. For example, the map server may store initial information of the measurement device in the first high-precision map coordinate system (M1-CS). The initial information includes initial translation transformation information of the measurement device in the M1-CS coordinate system and initial rotation information of the measurement device in the M1-CS coordinate system. The map server may further store an identifier of the measurement device in the M1-CS, for example, an RSU-M1-ID. The map server may further store initial information of the measurement device in a second high-precision map coordinate system (M2-CS). The initial information includes initial translation transformation information of the measurement device in the M2-CS coordinate system and initial rotation information of the measurement device in the M2-CS coordinate system. The map server may further store an identifier of the measurement device in the M2-CS, for example, an RSU-M2-ID.

An example in which coordinate transformation is performed by a map server is used for description. As shown in FIG. 4, the procedure includes the following steps.

Step 401: The map server obtains information about a first coordinate system relative to a second coordinate system.

The map server may store the information about the first coordinate system relative to the second coordinate system, namely, position information of the measurement device in a high-precision map coordinate system. The position information may include position information, initial information, historical information, and the like. The map server may further read the position information of the measurement device in the high-precision map coordinate system from a memory.

The map server may further receive position change information that is of the measurement device and that is periodically reported by the measurement device. For example, when the measurement device determines, in the first coordinate system, a position of a measurement target in the first coordinate system, the position change information of the measurement device on a first high-precision map includes at least one of the following: translation transformation information of the measurement device on the first high-precision map, rotation information of the measurement device on the first high-precision map, or rotation differential information of the measurement device on the first high-precision map. It should be noted that a measurement device with a fixed position may not report the translation transformation information (a position change), and a measurement device with a fixed posture may not report the rotation information or the rotation differential information (a posture change). In this case, the rotation information of the measurement device is initial rotation information of the measurement device. In a specific implementation process, the position change information of the measurement device may be determined based on positioning information obtained by the measurement device from the first high-precision map, or may be determined based on a sensing apparatus of the measurement device. This is not limited herein.

The map server may further determine the position information of the measurement device based on the initial information or the historical information. The initial information includes initial translation transformation information of the measurement device in the high-precision map coordinate system and initial rotation information of the measurement device in the high-precision map coordinate system. The historical information may be determined based on the position change information obtained when the measurement device determines the position of the measurement target in the first coordinate system. For a specific determining manner, refer to the foregoing embodiment.

For example, the map server stores initial information of the first coordinate system relative to the second coordinate system. The map server receives an identifier of the measurement device and first position change information of the measurement device. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The map server determines the information about the first coordinate system relative to the second coordinate system based on the first position change information of the measurement device and the initial information of the first coordinate system relative to the second coordinate system.

The high-precision map coordinate system includes at least a first high-precision map coordinate system. For example, the map server stores initial information (the initial information of the first coordinate system relative to the second coordinate system) of the measurement device in the first high-precision map coordinate system (M1-CS). The initial information includes initial translation transformation information of the measurement device in the M1-CS coordinate system and initial rotation information of the measurement device in the M1-CS coordinate system. The server may further store initial information of the measurement device in a second high-precision map coordinate system (M2-CS). The initial information includes initial translation transformation information of the measurement device in the M2-CS coordinate system and initial rotation information of the measurement device in the M2-CS coordinate system.

In addition, the server may further store an identifier of the measurement device. For example, the server may further store an identifier of the measurement device in the M1-CS, for example, an RSU-M1-ID. The server may further store an identifier of the measurement device in the M2-CS, for example, an RSU-M2-ID, or a unique identifier (L-ID) of the measurement device.

The map server may further send a query request for the first position change information of the measurement device to the measurement device. The query request for the first position change information of the measurement device is used to query a measurement position that is of the measurement device relative to an initial position and that is obtained when the measurement device determines the position of the measurement target in the first coordinate system. The query request for the first position change information of the measurement device includes the identifier of the measurement device and/or an identifier of the second coordinate system. According to the foregoing method, the measurement device sends the first position change information of the measurement device only when the map server requests the first position change information of the measurement device, so that the measurement device can be prevented from sending the first position change information of the measurement device to an irrelevant device, thereby protecting privacy of the measurement device and the map coordinate system, and reducing signaling overheads.

Alternatively, the map server stores historical information of the first coordinate system relative to the second coordinate system. The map server receives an identifier of the measurement device and second position change information of the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system. The map server determines the information about the first coordinate system relative to the second coordinate system based on the second position change information of the measurement device and the historical information of the first coordinate system relative to the second coordinate system.

For example, the map server stores historical information of the measurement device in the first high-precision map coordinate system (M1-CS). The historical information includes historical translation transformation information of the measurement device in the M1-CS coordinate system and historical rotation information of the measurement device in the M1-CS coordinate system. The historical information may be position information determined when the measurement device measures a previous measurement target, or may be position information that is of a measurement historical target corresponding to a previous measurement target and that is reported by the measurement device to the map server. The historical information may be determined based on an update requirement of the map server. This is not limited herein. The server may further store historical information of the measurement device in a second high-precision map coordinate system (M2-CS). The historical information includes historical translation transformation information of the measurement device in the M2-CS coordinate system and historical rotation information of the measurement device in the M2-CS coordinate system.

The map server may further send a query request for the second position change information of the measurement device to the measurement device. The query request for the second position change information of the measurement device is used to query a measurement position that is of the measurement device relative to a historical position and that is obtained when the measurement device determines the position of the measurement target in the first coordinate system. The query request for the second position change information of the measurement device includes the identifier of the measurement device and/or an identifier of the second coordinate system. According to the foregoing method, the measurement device sends the second position change information of the measurement device only when the map server requests the second position change information of the measurement device, so that the measurement device can be prevented from sending the second position change information of the measurement device to an irrelevant device, thereby protecting privacy of the measurement device and the map coordinate system, and reducing signaling overheads.

Step 402: The measurement device sends the position information of the measurement target in the first coordinate system to the map server, and the map server further receives the position information that is of the measurement target in the first coordinate system and that is sent by the measurement device.

In a possible implementation, the measurement device actively reports the position information of the measurement target of the measurement device in the first coordinate system to the server. The position information of the measurement target in the first coordinate system includes at least one of the following: position information of the measurement target in the first coordinate system LCS and the identifier of the measurement device.

The position information of the measurement target in the first coordinate system LCS may include at least one of the following:

- coordinate information of a center of the measurement target in the LCS coordinate system, coordinate information of an origin of the TCS coordinate system that is established by using a position point of the measurement target as an origin in the LCS, rotation information of the measurement target TCS coordinate system in the LCS, vertex coordinates of an outer line (an external rectangle or a polygon) of the measurement target in the LCS coordinate system, and the like.

In a possible implementation, before step 402, the vehicle-mounted apparatus may further send a query request for a position of a to-be-identified object in the second coordinate system to the server. The server may further determine, based on the query request for the position of the to-be-identified object in the second coordinate system, the measurement device corresponding to the to-be-identified object, and further send the query request for the position of the to-be-identified object to the measurement device. The measurement device may determine the measurement target based on the query request for the position of the to-be-identified object, and measure the position of the measurement target. Specifically, the query request for the position of the to-be-identified object on the first high-precision map may include the identifier of the measurement device and the identifier of the second coordinate system (or a high-precision map). If the identifier of the measurement device is a unique identifier, an identifier of a high-precision map used by the vehicle-mounted apparatus needs to be carried, so that the server can determine, based on the identifier of the high-precision map, a second high-precision map coordinate system that needs to be transformed for the measurement object. If the identifier of the measurement device is an identifier of the measurement device on a high-precision map, an identifier of the high-precision map used by the vehicle-mounted apparatus may not be carried, so that the server can determine, based on the identifier of the measurement device on the high-precision map, a second coordinate system that needs to be transformed for the measurement object.

In another possible manner, before step 402, the map server may further send a query request for the position of the measurement target in the first coordinate system to the measurement device. Specifically, the map server determines, based on the identifier that is of the measurement device and that is in the query request for the position of the measurement target in the first coordinate system, the measurement device configured to measure the position of the target, and further sends the query request for the position of the measurement target in the first coordinate system to the measurement device. The measurement device further returns, to the map server based on the query request for the position of the measurement target in the first coordinate system, the position information of the measurement target in the first coordinate system (LCS) corresponding to the measurement device.

Step 403: The map server determines a position of the measurement target in the second coordinate system based on the information about the first coordinate system relative to the second coordinate system and the position of the measurement target in the first coordinate system.

In a possible implementation, the map server determines the position information of the measurement target in the M1-CS coordinate system based on the position information of the measurement target in the LCS coordinate system and coordinate transformation information that is from the LCS coordinate system to the M1-CS coordinate system and that is obtained when the measurement device determines the position of the measurement target in the first coordinate system.

In another possible implementation, the map server determines, based on the first position change information of the measurement device and the initial information of the measurement device on the first high-precision map, coordinate transformation information that is from the LCS coordinate system to the M1-CS coordinate system and that is obtained when the measurement device determines the position of the measurement target in the first coordinate system. Alternatively, the map server determines, based on the second position change information of the measurement device and the historical information of the measurement device on the first high-precision map, coordinate transformation information that is from the LCS coordinate system to the M1-CS coordinate system and that is obtained when the measurement device determines the position of the measurement target in the first coordinate system. The map server further determines the position information of the measurement target in the M1-CS coordinate system based on the position information of the measurement target in the LCS coordinate system and the coordinate transformation information that is from the LCS coordinate system to the M1-CS coordinate system and that is obtained when the measurement device determines the position of the measurement target in the first coordinate system.

Step 404: The map server sends the position information of the measurement target in the second coordinate system M1-CS coordinate system to the vehicle-mounted apparatus.

The vehicle-mounted apparatus further receives the position information that is of the measurement target in the second coordinate system M1-CS coordinate system and that is sent by the map server, so that the vehicle-mounted apparatus can determine relative position information of the measurement target relative to the vehicle-mounted apparatus based on the position information of the measurement target in the M1-CS coordinate system and position information of the vehicle-mounted apparatus in the M1-CS coordinate system.

The map server transforms the position of the measurement target in the first coordinate system (RSU-LCS) into the position of the measurement target in the second coordinate system (M1-CS), so that the vehicle-mounted apparatus determines an estimated position of the measurement target relative to the vehicle by using the position of the measurement target in the second coordinate system (M1-CS), to achieve a better effect with high estimation precision and a small deviation that are consistent with an actual situation.

An example in which coordinate transformation is performed by a measurement device is used for description. As shown in FIG. 5, the procedure includes the following steps.

Step 501: The measurement device obtains information about a first coordinate system relative to a second coordinate system.

Example b2: The map server stores the information about the first coordinate system relative to the second coordinate system. The measurement device receives, from the map server, the information that is about the first coordinate system relative to the second coordinate system and that is obtained when the measurement device determines a position of a measurement target in the first coordinate system. The measurement device may further send a query request for the information about the first coordinate system relative to the second coordinate system to the map server. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes an identifier of the measurement device and/or an identifier of the second coordinate system.

The measurement device may further send a query request for the information about the first coordinate system relative to the second coordinate system to the map server. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes an identifier of the measurement device and/or an identifier of the second coordinate system. According to the foregoing method, the map server sends the information about the first coordinate system relative to the second coordinate system only when the first device requests the information, so that the map server can be prevented from sending the information about the first coordinate system relative to the second coordinate system to an irrelevant device, thereby protecting privacy of the measurement device, and reducing signaling overheads.

Example b3.1: If the map server stores initial information of the measurement device, the measurement device may obtain first position change information (for example, first position change information that is of the measurement device relative to an initial position and that is obtained when the measurement device determines the position of the measurement target in the first coordinate system) of the measurement device by using a sensing apparatus. The measurement device may receive initial information of the measurement device on a first high-precision map by using the map server.

The measurement device may further determine the information about the first coordinate system relative to the second coordinate system based on the first position change information of the measurement device and the initial information of the first coordinate system relative to the second coordinate system.

The measurement device may further send a query request for the initial information of the first coordinate system relative to the second coordinate system to the map server. The query request for the initial information of the first coordinate system relative to the second coordinate system is used to query position information (for example, position information of the initial position of the measurement device on the first high-precision map) of the initial position of the measurement device in the second coordinate system. The query request for the initial information of the first coordinate system relative to the second coordinate system includes an identifier of the measurement device and/or an identifier of the second coordinate system. The measurement device further determines, based on the position information of the initial position of the measurement device on the first high-precision map and the first position change information that is of the measurement device relative to the initial position and that is obtained when the measurement device determines the position of the measurement target in the first coordinate system that are sent by the map server, coordinate transformation information that is of the first coordinate system (LCS) relative to the second coordinate system (a first high-precision map coordinate system) and that is obtained when the measurement device determines the position of the measurement target in the first coordinate system.

Example b4.1: If the map server stores position change information of the measurement device and the initial information of the measurement device on the first high-precision map that are historically reported by the measurement device, the map server may determine historical information of the measurement device, and the measurement device may further receive historical information of the measurement device on the first high-precision map and historical information of the first coordinate system relative to the second coordinate system that are sent by the map server. Alternatively, the map server receives position information that is of the measurement device, that is obtained when the measurement device measures a historical target, and that is historically reported by the measurement device, and the map server may use the position information that is of the measurement device, that is obtained when the measurement device measures the historical target, and that is historically reported by the measurement device as the historical information of the measurement device.

The measurement device may further send a query request for the historical information of the first coordinate system relative to the second coordinate system to the map server. In this case, the measurement device may receive the historical information of the measurement device on the first high-precision map by using the map server. In addition, the measurement device may obtain second position change information (for example, second position change information of position information that is obtained when the measurement device determines the position of the measurement target in the first coordinate system and that is relative to position information obtained when the measurement device measures a position of the historical target) of the measurement device by using the sensing apparatus. The measurement device may further determine, based on the historical information of the measurement device on the first high-precision map and the second position change information that is of the measurement device and that is obtained when the measurement device determines the position of the measurement target in the first coordinate system, coordinate transformation information that is of the measurement device on the first high-precision map and that is obtained when the measurement device determines the position of the measurement target in the first coordinate system.

Step 502: The measurement device obtains position information of the measurement target in the first coordinate system.

Example A1: The measurement device obtains the position of the measurement target in the first coordinate system through measurement by using a sensor. For a specific determining manner, refer to the foregoing embodiment. Details are not described herein again.

Step 503: The measurement device transforms position information of the measurement target relative to the measurement device into position information of the measurement target on the first high-precision map based on the coordinate transformation information.

For example, the measurement device RSU detects a target position in the first coordinate system RSU-LCS, and obtains a position $(p_{RSU})_{M1\text{-}CS}$ of the measurement device RSU in the second coordinate system M1-CS coordinate system and rotation information of the first coordinate system RSU-LCS in the second coordinate system M1-CS, to complete transformation from the position of the measurement target in the first coordinate system RSU-LC S to a position of a measurement target in the second coordinate system M1-CS.

Step 504: The measurement device sends the position of the measurement target in the second coordinate system to the vehicle-mounted apparatus. The vehicle-mounted apparatus further receives the position that is of the measurement target in the second coordinate system and that is sent by the measurement device.

The vehicle-mounted apparatus may further determine relative position information of the measurement target relative to the vehicle-mounted apparatus based on the position information of the measurement target in the M1-CS coordinate system and position information of the vehicle-mounted apparatus in the M1-CS coordinate system.

The measurement device transforms a target position in the first coordinate system RSU-LCS into a target position in the second coordinate system M1-CS, and delivers the target position to the vehicle, so that the vehicle determines an estimated position of the target relative to the vehicle by using the target position in the second coordinate system M1-CS, to achieve a better effect with high estimation precision and a small deviation that are consistent with an actual situation.

In a possible implementation, before step 503 or before step 501, the vehicle-mounted apparatus may send a query request for a position of a to-be-identified object in the second coordinate system to the measurement device. For specific content of the query request for the position of the to-be-identified object in the second coordinate system, refer to the implementation in which the vehicle-mounted apparatus sends the query request for the position of the to-be-identified object in the second coordinate system to the map server in the embodiment in FIG. 4. Details are not described herein again.

In another possible implementation, before step 501, the vehicle-mounted apparatus may send a query request for a position of a to-be-identified object in the second coordinate system to the map server. For specific content of the query request for the position of the to-be-identified object in the second coordinate system, refer to the implementation in which the vehicle-mounted apparatus sends the query request for the position of the to-be-identified object in the second coordinate system to the map server in the embodiment in FIG. 4. Details are not described herein again. The map server may further forward the query request for the position of the measurement target in the second coordinate system to the measurement device. The measurement device may perform step 501 based on the query request for the position of the measurement target in the second coordinate system.

An example in which coordinate transformation is performed by a vehicle-mounted apparatus is used for description. As shown in FIG. 6, the procedure includes the following steps.

Step 601: The vehicle-mounted apparatus obtains information about a first coordinate system relative to a second coordinate system.

Example c2.1: The map server stores the information about the first coordinate system relative to the second coordinate system. The map server sends, to the vehicle-mounted apparatus, the information that is about the first coordinate system relative to the second coordinate system and that is obtained when the measurement device determines a position of a measurement target in the first coordinate system, and the vehicle-mounted apparatus further receives, from the map server, the information that is about the first coordinate system relative to the second coordinate system and that is obtained when the measurement device determines the position of the measurement target in the first coordinate system.

The vehicle-mounted apparatus further sends a query request for the information about the first coordinate system relative to the second coordinate system to the map server. The map server further sends the query request for the information about the first coordinate system relative to the second coordinate system to the measurement device based on an identifier of the measurement device that is in the query request, so that the measurement device returns the position of the measurement target in the first coordinate system to the vehicle-mounted apparatus based on the query request. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

Example c3.1: The map server stores initial information of the first coordinate system relative to the second coordinate system. The measurement device sends, to the vehicle-mounted apparatus, first position change information that is of the measurement device and that is obtained when the measurement device determines the position of the measurement target in the first coordinate system. The vehicle-mounted apparatus further receives the first position change information that is of the measurement device and that is sent by the measurement device. The first position change information of the measurement device is used to indicate a difference between position information that is of the measurement device and that is obtained when the measurement device determines the position of the measurement target in the first coordinate system and the initial information. The vehicle-mounted apparatus receives the initial information of the first coordinate system relative to the second coordinate system from the map server. The vehicle-mounted apparatus determines the information about the first coordinate system relative to the second coordinate system based on the first position change information of the measurement device and the initial information of the first coordinate system relative to the second coordinate system.

Example c4.1: The map server stores historical information of the first coordinate system relative to the second coordinate system. The measurement device sends second position change information of the measurement device to the vehicle-mounted apparatus. The vehicle-mounted apparatus receives the second position change information that is of the measurement device and that is sent by the measurement device. The second position change information of the measurement device is used to indicate a difference between position information that is of the measurement device and that is obtained when the measurement device determines the position of the measurement target in the first coordinate system and the historical information. The vehicle-mounted apparatus receives the historical information of the first coordinate system relative to the second coordinate system from the map server. The vehicle-mounted apparatus determines the information about the first coordinate system relative to the second coordinate system based on the second position change information of the measurement device and the historical information of the first coordinate system relative to the second coordinate system.

The vehicle-mounted apparatus further sends a query request for the initial information of the first coordinate system relative to the second coordinate system to the map server. Alternatively, the vehicle-mounted apparatus sends a query request for the initial information of the first coordinate system relative to the second coordinate system to the measurement device. Alternatively, the vehicle-mounted apparatus sends a query request for the first position change information of the measurement device to the measurement device. Alternatively, the vehicle-mounted apparatus sends a query request for the first position change information of the measurement device to the map server. Alternatively, the vehicle-mounted apparatus sends a query request for the historical information of the first coordinate system relative to the second coordinate system to the map server. Alternatively, the vehicle-mounted apparatus sends a query request for the historical information of the first coordinate system relative to the second coordinate system to the measurement device. Alternatively, the vehicle-mounted apparatus sends a query request for the second position change information of the measurement device to the measurement device. Alternatively, the vehicle-mounted apparatus sends a query request for the second position change information of the measurement device to the map server.

A specific manner of sending the query request may be determined based on whether the position information of the measurement target in the first coordinate system carries the position change information of the measurement device. For example, if the vehicle-mounted apparatus determines that the position information of the measurement target in the first coordinate system includes the position change information of the measurement device, and the position change information of the measurement device includes translation transformation information of the measurement device on a first high-precision map and rotation transformation information of the measurement device on the first high-precision map, the vehicle-mounted apparatus may directly determine coordinate transformation information of the measurement device relative to the first high-precision map based on the position change information of the measurement device. Therefore, the vehicle-mounted apparatus may not send the query request to the map server.

For example, if the vehicle-mounted apparatus determines that the position information of the measurement target in the first coordinate system includes the first position change information of the measurement device, and the first position change information of the measurement device indicates a position change of position information that is obtained when the measurement device determines the position of the measurement target in the first coordinate system and that is relative to the initial information, the vehicle-mounted apparatus may further receive the initial information of the measurement device. The vehicle-mounted apparatus may further send a query request for the initial information of the measurement device to the map server, and further determine coordinate transformation information of the measurement device relative to the first high-precision map based on initial information that is of the measurement device on the first high-precision map and that is sent by the map server and the first position change information of the measurement device.

For another example, if the vehicle-mounted apparatus determines that the position information of the measurement target in the first coordinate system includes the second position change information of the measurement device, and the position change information of the measurement device indicates a position change of position information that is obtained when the measurement device determines the position of the measurement target in the first coordinate system and that is relative to the historical information, the vehicle-mounted apparatus may further receive the historical information of the measurement device. The vehicle-mounted apparatus may further send a query request for the historical information of the measurement device to the map server, and further determine coordinate transformation information of the measurement device relative to the first high-precision map based on historical information of the measurement device on the first high-precision map and the position change information of the measurement device that are returned by the map server.

Alternatively, if the vehicle-mounted apparatus determines that the position information of the measurement target in the first coordinate system does not include the position change information of the measurement device, the vehicle-mounted apparatus may send a query request for the position information of the measurement device to the map server, and further determine coordinate transformation information of the measurement device relative to the first high-precision map based on position information that is of the measurement device on the first high-precision map and that is returned by the map server. Alternatively, the vehicle-mounted apparatus may send a query request for the position change information of the measurement device to the measurement device. This is not limited herein.

In a possible implementation, the vehicle-mounted apparatus sends a query request for a position of the measurement device on the first high-precision map to the map server based on the obtained identifier of the measurement device. The query request for the position of the measurement device on the first high-precision map includes the identifier of the measurement device and/or an identifier of the first high-precision map.

It should be noted that to ensure accuracy of performing coordinate transformation by the vehicle-mounted apparatus by using the initial information of the measurement device, it needs to be ensured that an identifier (for example, the identifier M1-CS of the first high-precision map) of a high-precision map used by the vehicle-mounted apparatus is the same as an identifier that is of a high-precision map and that corresponds to the identifier of the measurement device that is carried in the position information of the measurement target of the measurement device in the first coordinate system.

If the identifier of the measurement device is a unique identifier, the identifier of the high-precision map used by the vehicle-mounted apparatus needs to be carried, so that the map server can determine position information of the measurement device in a corresponding first high-precision map coordinate system based on the identifier of the first high-precision map. If the identifier of the measurement device is an identifier of the measurement device on the high-precision map, the identifier of the first high-precision map may not be carried, so that the map server can determine position information of the measurement device in the first high-precision map coordinate system based on the identifier of the measurement device on the first high-precision map.

For example, if the vehicle-mounted apparatus determines that in the position information that is of the measurement target of the measurement device in the first coordinate system and that is sent by the measurement device, the identifier of the measurement device corresponds to an identifier M2-CS of a second high-precision map, and the high-precision map used by the vehicle-mounted apparatus is the first high-precision map M1-CS, the vehicle-mounted apparatus may send a query request for the position of the measurement target in the first coordinate system to the map server. The query request for the position of the measurement target in the first coordinate system includes the identifier M1-CS of the first high-precision map and an identifier of the measurement target. The map server may further determine, based on the identifier M1-CS of the first high-precision map and the identifier of the measurement target, a device that can measure a position of the target, where the device stores corresponding position information on the first high-precision map, and sends a measurement position query request for the position of the measurement target to the device.

In another possible implementation, the vehicle-mounted apparatus already knows that the measurement device may obtain a position of a to-be-identified object in the first coordinate system, and the first high-precision map stores the position information of the measurement device. In this case, the vehicle-mounted apparatus may send a query request for the position of the to-be-identified object in the second coordinate system to the measurement device. The query request for the position of the to-be-identified object in the second coordinate system may include the identifier of the measurement device and/or the identifier of the high-precision map used by the vehicle-mounted apparatus.

Step 602: The vehicle-mounted apparatus obtains the position information of the measurement target in the first coordinate system.

The measurement device actively sends the position information of the measurement target of the measurement device in the first coordinate system to the vehicle-mounted apparatus. The position information of the measurement target in the first coordinate system includes at least one of the following: position information of the measurement target in the LCS and the identifier of the measurement device.

Example B2.1: The map server sends the position of the measurement target in the first coordinate system to the vehicle-mounted apparatus. The vehicle-mounted apparatus receives, by using a receiver, the position that is of the measurement target in the first coordinate system and that is sent by the map server. The vehicle-mounted apparatus receives the position that is of the measurement target in the first coordinate system and that is sent by the map server, so that the position of the measurement target in the first coordinate system can be flexibly obtained. In addition to sending the position of the measurement target in the first coordinate system to the vehicle-mounted apparatus by the measurement device, effective offloading can be performed by using the map server. This helps implement effective resource utilization.

The vehicle-mounted apparatus may further send a query request for a position of a to-be-identified object in the first coordinate system to the map server. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is an object in a preset range of the measurement device. The map server receives a query request for a target position from the vehicle-mounted apparatus. The map server determines, based on position information of the measurement device in the first coordinate system, that the to-be-identified object includes at least the measurement target.

Example B2.2: The measurement device sends the position of the measurement target in the first coordinate system to the vehicle-mounted apparatus. The vehicle-mounted apparatus receives, by using a receiver, the position that is of the measurement target in the first coordinate system and that is sent by the measurement device.

The vehicle-mounted apparatus may further send a query request for a position of a to-be-identified object in the first coordinate system to the measurement device. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is an object in a preset range of the measurement device. The measurement device receives the query request for the position of the to-be-identified object in the first coordinate system from the vehicle-mounted apparatus; and further determines, based on position information of the measurement device in the first coordinate system, that the to-be-identified object includes at least the measurement target.

Step 603: The vehicle-mounted apparatus determines position information of the measurement target on the first high-precision map based on the coordinate transformation information and position information of the measurement target relative to the measurement device.

The vehicle-mounted apparatus further determines relative position information of the measurement target relative to the vehicle-mounted apparatus based on a target position of the measurement target in the M1-CS coordinate system and position information of the vehicle-mounted apparatus in the M1-CS coordinate system. Specifically, the vehicle-mounted apparatus receives a position $(p_{RSU})_{M1\text{-}CS}$ that is of the measurement device in the second coordinate system that is sent by the map server, a position that is of the measurement target in the first coordinate system RSU-LCS and that is sent by the measurement device, and rotation information that is of the first coordinate system RSU-LCS in the second coordinate system M1-CS and that is sent by the map server or the measurement device, to determine a relative position of the measurement target relative to a vehicle corresponding to the vehicle-mounted apparatus. Further, the vehicle is updated in a coverage area of the measurement device, transforms the position of the measurement target in the first coordinate system RSU-LCS into a position of the measurement target in the second coordinate system M1-CS, and determines an estimated position of a measurement target relative to the vehicle by using the position of the measurement target in the second coordinate system M1-CS, to achieve an effect with high estimation precision and a small deviation that are consistent with an actual situation.

Figure 7:
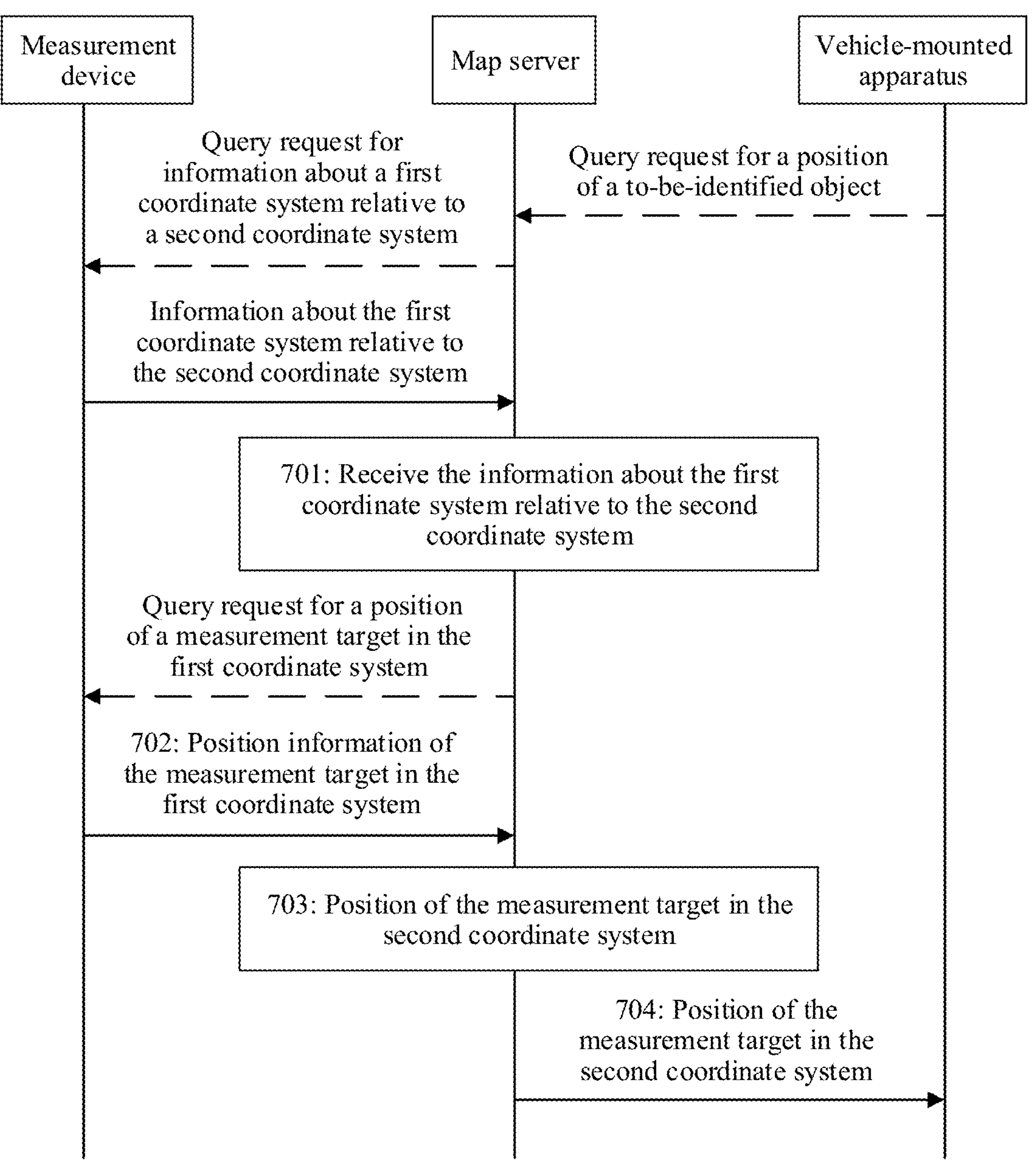
FIG. 7 is a flowchart of a positioning method according to an embodiment of this application.
Figure 8:
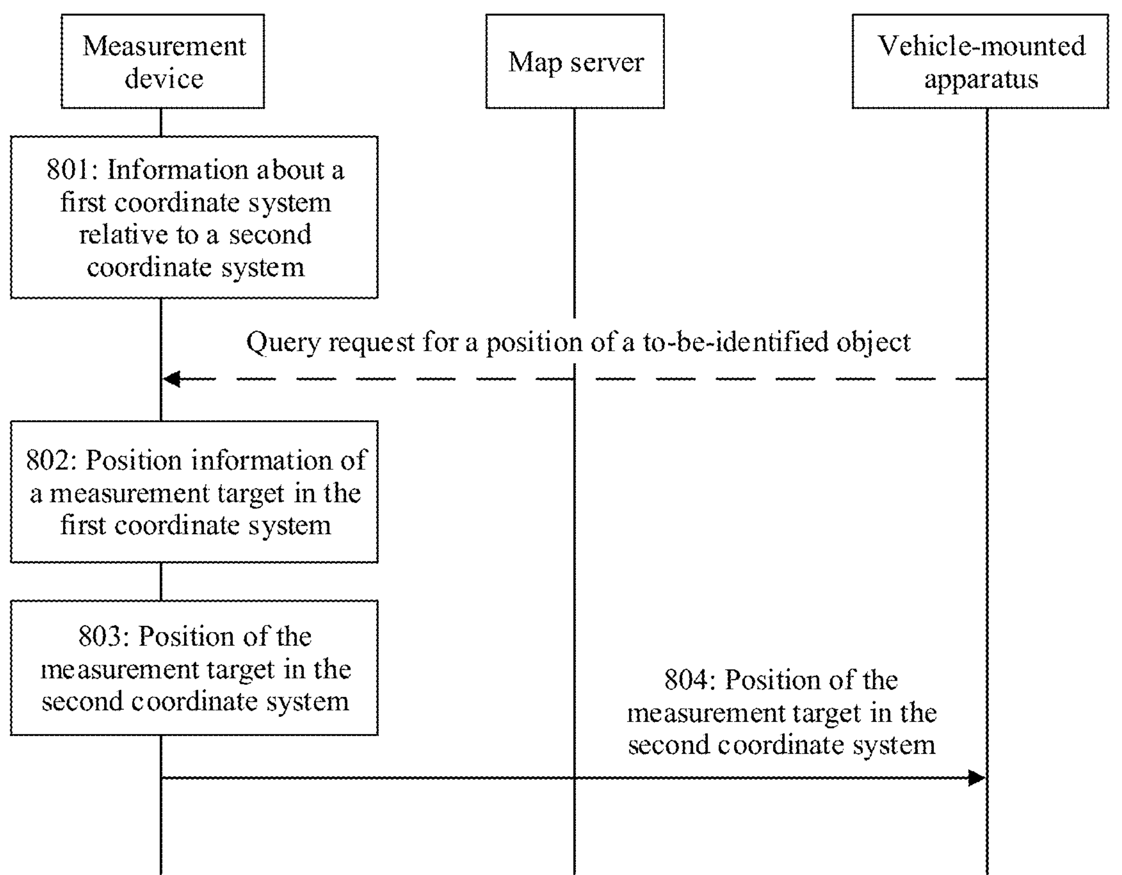
FIG. 8 is a flowchart of a positioning method according to an embodiment of this application.
Figure 9:
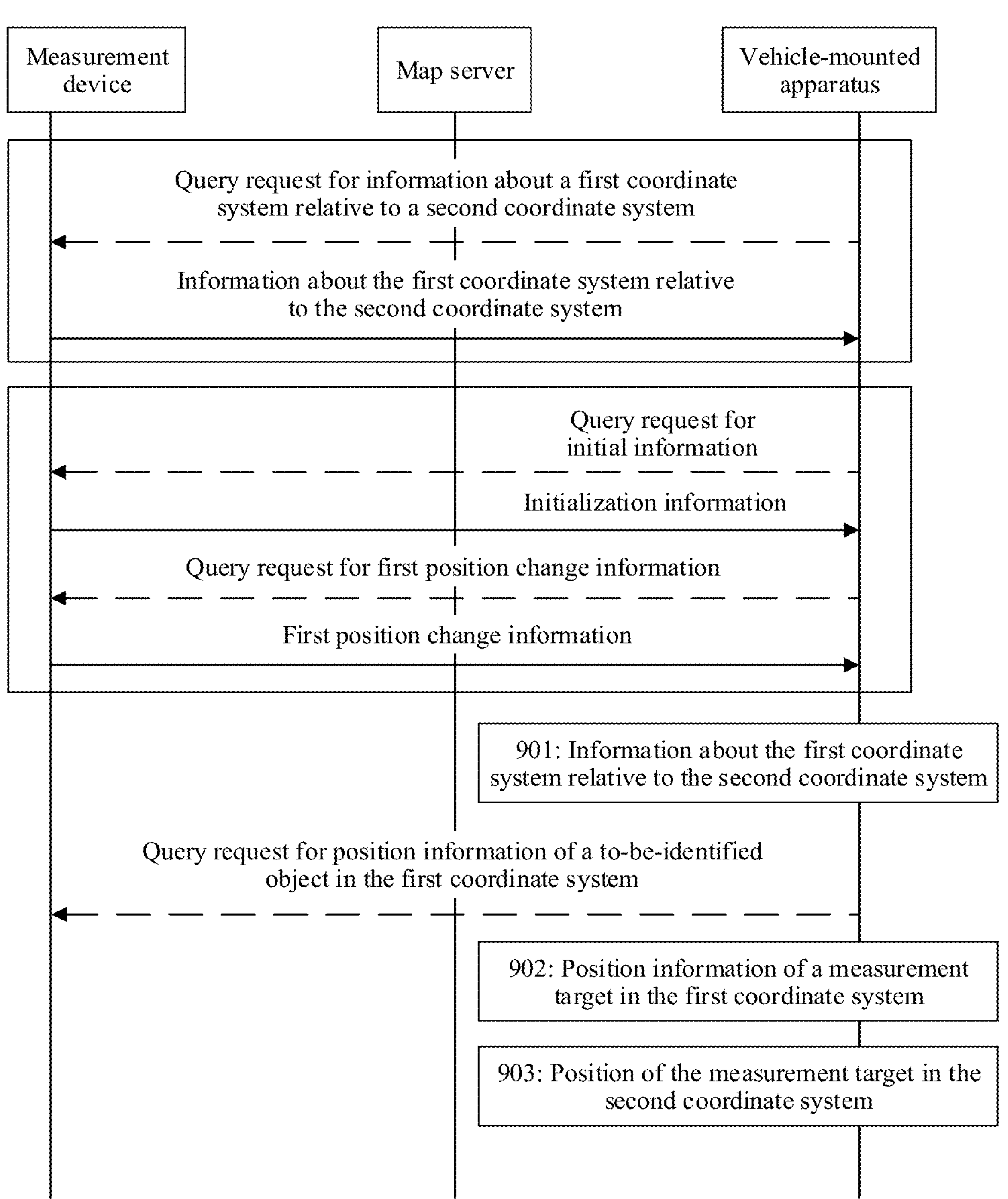
FIG. 9 is a flowchart of a positioning method according to an embodiment of this application.

As shown in FIG. 7 to FIG. 9, a procedure of the positioning method is provided. The procedure may be performed by a measurement device, a vehicle-mounted apparatus, a map server, and the like. The map server may be the V2X server in the foregoing embodiment, or may be another server that stores a high-precision map, or may be a server that performs navigation planning. This is not limited herein. The measurement device in the method includes a sensing apparatus. The measurement device is a device configured to measure position information of a target, and the measurement device may be the RSU 103, the first vehicle 101, or the second vehicle 102 in FIG. 1A. The vehicle-mounted apparatus 302 may be a device that requests to measure position information of a target, and may be the first vehicle 101 or the second vehicle 102 in FIG. 1A. The measurement target may be a to-be-identified object that needs to be obtained by a vehicle corresponding to the vehicle-mounted apparatus. The to-be-identified object may be an object such as an object or a pedestrian in a preset range of the vehicle corresponding to the vehicle-mounted apparatus, for example, the first vehicle 101 or the second vehicle 102 in FIG. 1A.

The measurement device stores position information of the measurement device in a high-precision map coordinate system. The position information may include initial information, historical information, and the like. The initial information includes initial translation transformation information (initial position) of the measurement device in the high-precision map coordinate system and initial rotation information (initial posture) of the measurement device in the high-precision map coordinate system. The high-precision map coordinate system includes at least a first high-precision map coordinate system. For example, the measurement device stores initial information of the measurement device in the first high-precision map coordinate system (M1-CS). The initial information includes initial translation transformation information of the measurement device in the M1-CS coordinate system and initial rotation information of the measurement device in the M1-CS coordinate system. The measurement device may further store an identifier of the measurement device in the M1-CS, for example, an RSU-M1-ID. The measurement device may further store initial information of the measurement device in a second high-precision map coordinate system (M2-CS). The initial information includes initial translation transformation information of the measurement device in the M2-CS coordinate system and initial rotation information of the measurement device in the M2-CS coordinate system. The measurement device may further store an identifier of the measurement device in the M2-CS, for example, an RSU-M2-ID.

An example in which coordinate transformation is performed by a map server is used for description. As shown in FIG. 7, the procedure includes the following steps.

Step 701: A measurement device sends information about a first coordinate system relative to a second coordinate system to the map server, and the map server further receives the information that is about the first coordinate system relative to the second coordinate system and that is sent by the measurement device.

Example a2: The measurement device stores the information about the first coordinate system relative to the second coordinate system. The map server further receives, from the measurement device, the information that is about the first coordinate system relative to the second coordinate system and that is obtained when the measurement device determines a position of a measurement target in the first coordinate system.

In another possible implementation, to reduce resources occupied by position information of the measurement target in the first coordinate system, the position information of the measurement target in the first coordinate system may not carry position information of the measurement device on a first high-precision map, and the position information of the measurement target in the first coordinate system may include at least one of the following: position change information of the measurement device on the first high-precision map, an identifier of the measurement device, and an identifier of the second coordinate system.

Example a3.2: The measurement device stores initial information of the first coordinate system relative to the second coordinate system in a memory, namely, initial information of the measurement device on the first high-precision map. The measurement device may further send the initial information of the first coordinate system relative to the second coordinate system to the map server in advance. When the measurement device may determine the position of the measurement target, the measurement device may store first position change information. When the measurement device determines the position of the measurement target, the measurement device stores a difference between position information of the measurement device and the initial information, and sends the first position transformation information to the map server. For example, if the measurement device determines to send the first position change information that is of the measurement device and that is obtained when the measurement device determines the position of the measurement target in the first coordinate system to the map server, and the first position change information indicates a position change of a position in which the measurement device measures the target and that is relative to an initial position of the measurement device, the measurement device may determine the position information of the measurement device on the first high-precision map based on the initial information of the measurement device and the first position change information that is of the measurement device and that is obtained when the measurement device determines the position of the measurement target in the first coordinate system, and further determine coordinate transformation information that is of the measurement device on the first high-precision map and that is obtained when the measurement device determines the position of the measurement target in the first coordinate system. The initial information of the measurement device may be sent by the measurement device to the map server, and may also be carried in the position information of the measurement target in the first coordinate system, or may be separately sent. This is not limited herein.

Example a4.2: The measurement device stores historical information of the first coordinate system relative to the second coordinate system in a memory, namely, historical information of the measurement device on the first high-precision map. The measurement device may further send the historical information of the first coordinate system relative to the second coordinate system to the map server in advance. When determining the position of the measurement target, the measurement device may store second position change information, namely, the second position change information. When determining the position of the measurement target, the measurement device stores a difference between position information of the measurement device and information obtained when the measurement device measures a position of a historical target, and sends the second position change information to the map server. For example, if the measurement device determines to send the second position change information that is of the measurement device and that is obtained when the measurement device determines the position of the measurement target in the first coordinate system to the map server, and the position change information indicates a position change of a position in which the measurement device measures the target and that is relative to a last reported position of the map server, the map server may determine the position information of the measurement device on the first high-precision map based on last determined historical information of the measurement device and the second position change information that is of the measurement device and that is obtained when the measurement device determines the position of the measurement target in the first coordinate system, and further determine coordinate transformation information that is of the measurement device on the first high-precision map and that is obtained when the measurement device determines the position of the measurement target in the first coordinate system.

In a possible implementation, before step 701, the vehicle-mounted apparatus may further send a query request for a position of a to-be-identified object in the second coordinate system to the map server. The map server may further send a query request for the position of the measurement target to the measurement device based on the query request for the position of the to-be-identified object in the second coordinate system. The measurement device may measure the position of the measurement target based on the query request for the position of the measurement target. Specifically, the query request for the position of the to-be-identified object in the second coordinate system may include an identifier of the measurement device or an identifier of the second coordinate system. If the identifier of the measurement device is a unique identifier, an identifier of a high-precision map used by the vehicle-mounted apparatus needs to be carried, so that the map server can determine, based on the identifier of the high-precision map, a high-precision map coordinate system that needs to be transformed for the measurement object. If the identifier of the measurement device is an identifier of the measurement device on a high-precision map, an identifier of the high-precision map used by the vehicle-mounted apparatus may not be carried, so that the map server can determine, based on the identifier of the measurement device on the high-precision map, a high-precision map coordinate system that needs to be transformed for the measurement object.

In another possible manner, before step 701, the map server may further actively send a query request for the position of the measurement target in the first coordinate system to the measurement device. Specifically, the map server determines, based on the identifier that is of the measurement device and that is in the query request for the position of the to-be-identified object in the second coordinate system, a measurement device configured to measure the position of the target, and further sends a measurement query request of the measurement target in the measurement device to the measurement device. The measurement device further returns, to the map server based on the measurement query request of the measurement target in the measurement device, position information of the measurement target in the LCS coordinate system corresponding to the measurement device.

Further, if the map server has obtained the initial information of the measurement device on the first high-precision map, the map server may send a query request for the position change of the measurement device to the measurement device. Therefore, the measurement device determines that the initial information of the measurement device does not need to be carried. Alternatively, if the map server needs to obtain the initial information of the measurement device on the first high-precision map, the map server may send a query request for the position of the measurement device to the measurement device. Therefore, the measurement device determines that the initial information of the measurement device and the position change information of the measurement device need to be carried. Certainly, the map server may further send a query request for the position change of the measurement device to the measurement device, to obtain the position change that is of the measurement device and that is obtained when the measurement device determines the position of the measurement target in the first coordinate system.

Step 702: The measurement device sends the position information of the measurement target in the first coordinate system to the map server, and the map server further receives the position information that is of the measurement target in the first coordinate system and that is sent by the measurement device.

Example A2: The measurement device obtains the position of the measurement target in the first coordinate system through measurement by using a sensor. The measurement device further actively reports the position information of the measurement target in the first coordinate system to the map server, and the map server receives the position of the measurement target in the first coordinate system from the measurement device by using a receiver. The position information of the measurement target in the first coordinate system includes at least one of the following: position information of the measurement target in the LCS coordinate system and the identifier of the measurement device.

For a manner of determining the position information of the measurement target in the LCS coordinate system, refer to the foregoing embodiment. Details are not described herein again.

The map server may further send a query request for the position of the measurement target in the first coordinate system to the measurement device. The query request for the position of the measurement target in the first coordinate system is used to query a relative position relationship between the measurement device and the measurement target. The query request for the position of the measurement target in the first coordinate system includes the identifier of the measurement device and/or the identifier of the second coordinate system. For a specific implementation, refer to the foregoing embodiment. Details are not described herein again.

Step 703: The map server determines a position of the measurement target in the second coordinate system M1-CS coordinate system based on coordinate transformation information that is from the first coordinate system LCS coordinate system to the second coordinate system M1-CS coordinate system and that is obtained when the measurement device determines the position of the measurement target in the first coordinate system and the position information of the measurement target in the first coordinate system LCS coordinate system.

Step 704: The map server sends the position of the measurement target in the second coordinate system M1-CS coordinate system to the vehicle-mounted apparatus. The vehicle-mounted apparatus further receives the position that is of the measurement target in the second coordinate system M1-CS coordinate system and that is sent by the map server.

Example a: The map server sends at least one of the position of the measurement target in the second coordinate system, the identifier of the second coordinate system, and the identifier of the measurement device to the vehicle-mounted apparatus. The vehicle-mounted apparatus further receives the at least one of the position of the measurement target in the second coordinate system, the identifier of the second coordinate system, and the identifier of the measurement device that are sent by the map server.

The vehicle-mounted apparatus may further send a query request for a position of a to-be-identified object in the second coordinate system to the map server. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system. The map server receives the query request for the position of the to-be-identified object in the second coordinate system from the vehicle-mounted apparatus. The map server determines, based on the position information of the measurement target in the second coordinate system, that the to-be-identified object includes at least the measurement target. The map server further returns the position of the measurement target in the second coordinate system to the vehicle-mounted apparatus. For a specific manner in which the map server obtains the position of the measurement target in the second coordinate system, refer to the foregoing embodiment. Details are not described herein again.

The vehicle-mounted apparatus may further determine relative position information of the measurement target relative to the vehicle-mounted apparatus based on the position information of the measurement target in the M1-CS coordinate system and position information of the vehicle-mounted apparatus in the M1-CS coordinate system.

An example in which coordinate transformation is performed by a measurement device is used for description. As shown in FIG. 8, the procedure includes the following steps.

Step 801: The measurement device obtains coordinate transformation information of the measurement device on a first high-precision map.

Example b1: The measurement device stores information about a first coordinate system relative to a second coordinate system. The measurement device reads, from a memory, the information that is about the first coordinate system relative to the second coordinate system and that is obtained when the measurement device determines a position of a measurement target in the first coordinate system.

Step 802: The measurement device obtains the position of the measurement target in the first coordinate system.

In a possible implementation, if the measurement device records position information of the measurement device on the first high-precision map when determining the position of the measurement target in the first coordinate system, the measurement device may directly determine the coordinate transformation information of the measurement device on the first high-precision map based on the position information of the measurement device on the first high-precision map.

In a possible implementation, if the measurement device records only position change information of the measurement device when determining the position of the measurement target in the first coordinate system, and the position change information of the measurement device is used to indicate a position change of a position that is of the measurement device, that is obtained when the measurement device determines the position of the measurement target in the first coordinate system, and that is relative to a position obtained during previous measurement, the measurement device needs to determine position information of the measurement device on the first high-precision map based on historical information of the measurement device on the first high-precision map and the position change information of the measurement device, to determine the coordinate transformation information of the measurement device on the first high-precision map.

In another possible implementation, if the measurement device records only position change information of the measurement device when determining the position of the measurement target in the first coordinate system, and the position change information of the measurement device is used to indicate a position change of a position that is of the measurement device, that is obtained when the measurement device determines the position of the measurement target in the first coordinate system, and that is relative to an initial position of the measurement device, the measurement device needs to determine position information of the measurement device on the first high-precision map based on initial information of the measurement device on the first high-precision map and the position change information of the measurement device, to determine the coordinate transformation information of the measurement device on the first high-precision map.

Step 803: The measurement device transforms the position information of the measurement target in the first coordinate system into position information of a measurement target in the second coordinate system based on the coordinate transformation information.

For a specific implementation, refer to the foregoing embodiment. Details are not described herein again.

Step 804: The measurement device sends the position information of the measurement target on the first high-precision map to the vehicle-mounted apparatus. The vehicle-mounted apparatus further receives the position that is of the measurement target in the second coordinate system M1-CS coordinate system and that is sent by the map server, so that the vehicle-mounted apparatus can determine relative position information of the measurement target relative to the vehicle-mounted apparatus based on the position information of the measurement target in the M1-CS coordinate system and position information of the vehicle-mounted apparatus in the M1-CS coordinate system.

Example b: The measurement device sends at least one of the position of the measurement target in the second coordinate system, an identifier of the second coordinate system, and an identifier of the measurement device to the vehicle-mounted apparatus. The vehicle-mounted apparatus further receives the at least one of the position of the measurement target in the second coordinate system, the identifier of the second coordinate system, and the identifier of the measurement device that are sent by the measurement device. The measurement device sends the position of the measurement target in the second coordinate system to the vehicle-mounted apparatus, so that the vehicle-mounted apparatus directly determines the position of the measurement target in the second coordinate system by using the measurement device, and the vehicle-mounted apparatus does not need to further determine the position of the measurement target in the second coordinate system, thereby reducing processing complexity of the vehicle-mounted apparatus, reducing a response time of the vehicle-mounted apparatus, and improving autonomous driving safety of the vehicle-mounted apparatus.

The vehicle-mounted apparatus further sends a query request for a position of a to-be-identified object in the second coordinate system to the measurement device. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system. The measurement device receives the query request for the position of the to-be-identified object in the second coordinate system from the vehicle-mounted apparatus. The measurement device determines, based on the position information of the measurement target in the second coordinate system, that the to-be-identified object includes at least the measurement target. The measurement device further returns the position of the measurement target in the second coordinate system to the vehicle-mounted apparatus.

In another possible implementation, before step 801, the vehicle-mounted apparatus may send a query request for a position of a to-be-identified object in the second coordinate system to the map server. For specific content of the query request for the position of the to-be-identified object in the second coordinate system, refer to the embodiment in FIG. 7. Details are not described herein again. The map server may further forward the query request for the position of the to-be-identified object in the second coordinate system to the measurement device. The measurement device may perform step 801 based on the query request for the position of the to-be-identified object in the second coordinate system. For a specific manner in which the measurement device obtains the position of the measurement target in the second coordinate system, refer to the foregoing embodiment. Details are not described herein again.

An example in which coordinate transformation is performed by a vehicle-mounted apparatus is used for description. As shown in FIG. 9, the procedure includes the following steps.

Step 901: The vehicle-mounted apparatus obtains coordinate transformation information of a measurement device in a second coordinate system.

Example c2.2: The measurement device sends information that is about a first coordinate system relative to the second coordinate system and that is obtained when the measurement device determines a position of a measurement target in the first coordinate system to the vehicle-mounted apparatus. The vehicle-mounted apparatus further receives, from the measurement device, the information that is about the first coordinate system relative to the second coordinate system and that is obtained when the measurement device determines the position of the measurement target in the first coordinate system.

The vehicle-mounted apparatus further sends a query request for the information about the first coordinate system relative to the second coordinate system to the measurement device. The query request for the information about the first coordinate system relative to the second coordinate system is used to query the information that is about the first coordinate system relative to the second coordinate system and that is obtained when the measurement device determines the position of the measurement target in the first coordinate system. The query request for the information about the first coordinate system relative to the second coordinate system includes an identifier of the measurement device and/or an identifier of the second coordinate system.

In another possible implementation, the measurement device may further actively send position change information that is of the measurement device on a first high-precision map and that is obtained when the measurement device determines the position of the measurement target in the first coordinate system to the vehicle-mounted apparatus, so that the vehicle-mounted apparatus determines, based on initial information of the measurement device on the first high-precision map or historical information of the measurement device on the first high-precision map, and the position change information, position information that is of the measurement device on the first high-precision map and that is obtained when the measurement device determines the position of the measurement target in the first coordinate system, to determine coordinate transformation information of the measurement device in a first high-precision map coordinate system.

Example c3.2: The measurement device sends initial information that is of the first coordinate system relative to the second coordinate system and that is obtained when the measurement device determines the position of the measurement target in the first coordinate system and first position change information to the vehicle-mounted apparatus. The vehicle-mounted apparatus further determines the information about the first coordinate system relative to the second coordinate system based on the first initial information and the first position change information.

The vehicle-mounted apparatus may further send a query request for the initial information of the first coordinate system relative to the second coordinate system and a query request for the first position change information to the measurement device. For a specific implementation, refer to the foregoing embodiment. Details are not described herein again.

Example c4.2: The measurement device sends historical information that is of the first coordinate system relative to the second coordinate system and that is obtained when the measurement device determines the position of the measurement target in the first coordinate system and second position change information to the vehicle-mounted apparatus. The vehicle-mounted apparatus further determines the information about the first coordinate system relative to the second coordinate system based on the historical information and the second position change information. For a specific manner of determining the initial information of the first coordinate system relative to the second coordinate system, the first position change information, the historical information of the first coordinate system relative to the second coordinate system, and the second position change information, refer to the foregoing embodiment. Details are not described herein again.

The vehicle-mounted apparatus may further send a query request for the historical information of the first coordinate system relative to the second coordinate system and a query request for the second position change information to the measurement device. For a specific implementation, refer to the foregoing embodiment. Details are not described herein again.

Step 902: The vehicle-mounted apparatus obtains position information of the measurement target of the measurement device in the first coordinate system.

in a possible implementation, the measurement device actively sends the position information of the measurement target of the measurement device in the first coordinate system to the vehicle-mounted apparatus. The position information of the measurement target in the first coordinate system may include at least one of the following: position information of the measurement target in the LCS and the identifier of the measurement device.

Example B2.1: The vehicle-mounted apparatus receives, by using a receiver, the position that is of the measurement target in the first coordinate system and that is sent by the measurement device. The vehicle-mounted apparatus receives the position that is of the measurement target in the first coordinate system and that is sent by the measurement device, so that the position of the measurement target in the first coordinate system can be directly obtained. This helps reduce a delay and increase a speed of obtaining the position information of the measurement target in the first coordinate system.

The vehicle-mounted apparatus further sends a query request for a position of a to-be-identified object in the first coordinate system to the measurement device. The request for the position of the to-be-identified object in the first coordinate system is used to query position information of the to-be-identified object in the first coordinate system. The to-be-identified object is an object in a preset range of the measurement device. The query request for the position of the to-be-identified object in the first coordinate system includes the identifier of the measurement device. The measurement device receives the query request for the position of the to-be-identified object in the first coordinate system from the vehicle-mounted apparatus. The measurement device determines, based on the query request for the position of the to-be-identified object in the first coordinate system, that the to-be-identified object includes at least the measurement target.

Example B2.2: The vehicle-mounted apparatus receives, by using a receiver, the position that is of the measurement target in the first coordinate system and that is sent by the map server. The vehicle-mounted apparatus receives the position that is of the measurement target in the first coordinate system and that is sent by the map server, so that the position of the measurement target in the first coordinate system can be flexibly obtained. In addition to sending the position of the measurement target in the first coordinate system to the vehicle-mounted apparatus by the measurement device, effective offloading can be performed by using the map server. This helps implement effective resource utilization.

The vehicle-mounted apparatus may further send a query request for a position of a to-be-identified object in the first coordinate system to the map server. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is an object in a preset range of the measurement device. The map server receives a query request for a target position from the vehicle-mounted apparatus. The map server determines, based on position information of the measurement device in the first coordinate system, that the to-be-identified object includes at least the measurement target. According to the foregoing method, the vehicle-mounted apparatus may actively initiate the query request for the position of the to-be-identified object in the first coordinate system to the map server, so that the map server determines the to-be-identified object and the position that is of the measurement target in the first coordinate system and that corresponds to the to-be-identified object, to prevent the map server from sending the position of the measurement target in the first coordinate system to an irrelevant device.

Step 903: The vehicle-mounted apparatus determines position information of the measurement target in the second coordinate system based on the coordinate transformation information and position information of the measurement target relative to the measurement device.

The vehicle-mounted apparatus further determines relative position information of the measurement target relative to the vehicle-mounted apparatus based on a target position of the measurement target in the second coordinate system M1-CS coordinate system and position information of the vehicle-mounted apparatus in the second coordinate system M1-CS coordinate system.

Figure 10:
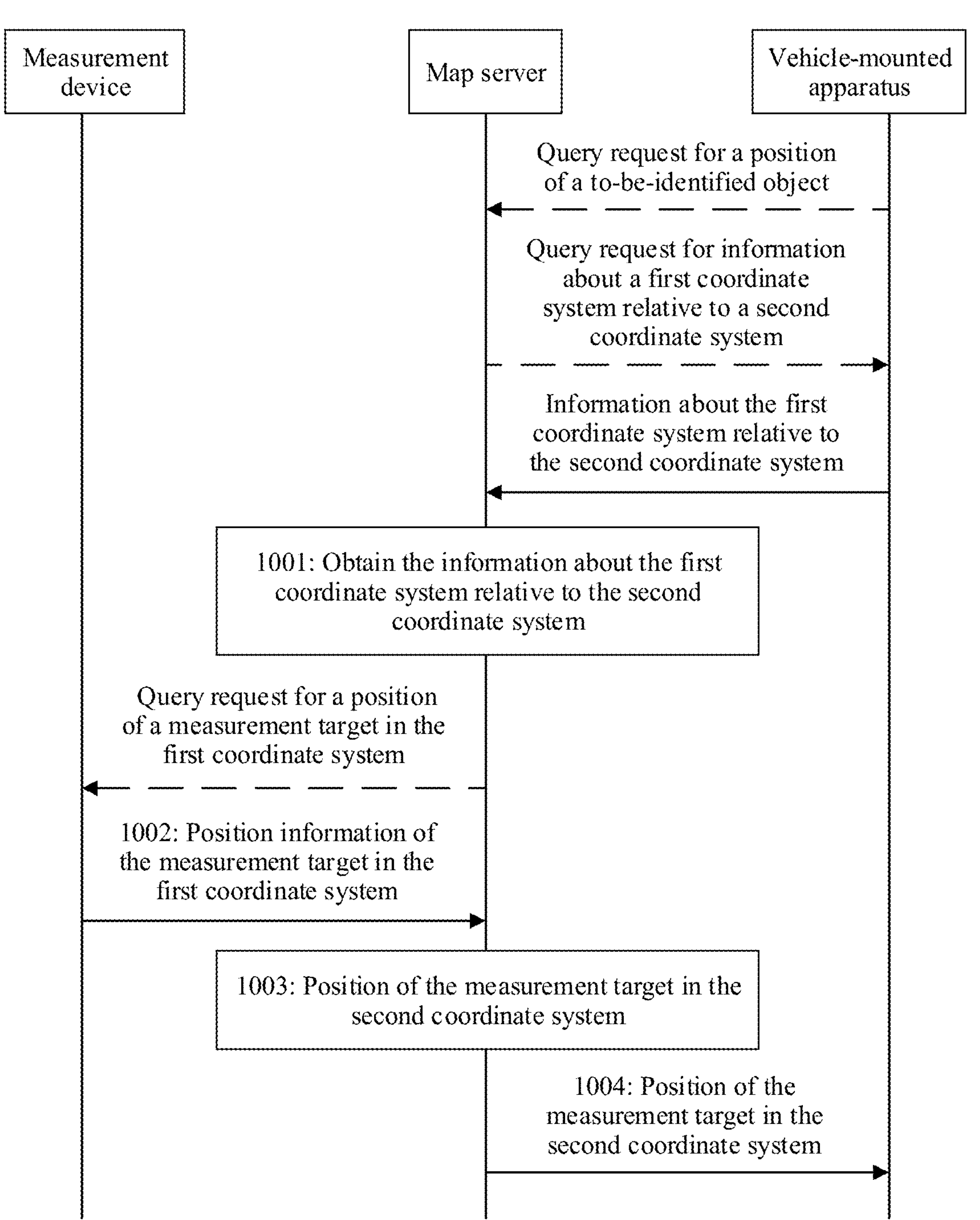
FIG. 10 is a flowchart of a positioning method according to an embodiment of this application.

As shown in FIG. 10, a procedure of the positioning method is provided. The procedure may be performed by a measurement device, a vehicle-mounted apparatus, a map server, and the like. The map server may be the V2X server in the foregoing embodiment, or may be another server that stores a high-precision map, or may be a server that performs navigation planning. This is not limited herein. The measurement device in the method includes a sensing apparatus. The measurement device is a device configured to measure position information of a target, and the measurement device may be the RSU 103, the first vehicle 101, or the second vehicle 102 in FIG. 1A. The vehicle-mounted apparatus 302 may be a device that requests to measure position information of a target, and may be the first vehicle 101 or the second vehicle 102 in FIG. 1A. The measurement target may be a to-be-identified object that needs to be obtained by a vehicle corresponding to the vehicle-mounted apparatus. The to-be-identified object may be an object such as an object or a pedestrian in a preset range of the vehicle corresponding to the vehicle-mounted apparatus, for example, the first vehicle 101 or the second vehicle 102 in FIG. 1A.

The vehicle-mounted apparatus stores position information of the measurement device in a high-precision map coordinate system. The position information may include initial information, historical information, and the like. The initial information includes initial translation transformation information of the measurement device in the high-precision map coordinate system and initial rotation information of the measurement device in the high-precision map coordinate system. The high-precision map coordinate system includes at least a first high-precision map coordinate system. For example, the vehicle-mounted apparatus stores initial information of the measurement device in the first high-precision map coordinate system (M1-CS). The initial information includes initial translation transformation information of the measurement device in the M1-CS coordinate system and initial rotation information of the measurement device in the M1-CS coordinate system. The measurement device may further store an identifier of the measurement device in the M1-CS, for example, an RSU-M1-ID. The vehicle-mounted apparatus may further store initial information of the measurement device in a second high-precision map coordinate system (M2-CS). The initial information includes initial translation transformation information of the measurement device in the M2-CS coordinate system and initial rotation information of the measurement device in the M2-CS coordinate system. The vehicle-mounted apparatus may further store an identifier of the measurement device in the M2-CS, for example, an RSU-M2-ID.

An example in which coordinate transformation is performed by a map server is used for description. As shown in FIG. 10, the procedure includes the following steps.

Step 1001: The map server obtains information about a first coordinate system relative to a second coordinate system.

In a possible implementation, the map server may receive the information about the first coordinate system relative to the second coordinate system by using a receiver.

Example a2.2: The vehicle-mounted apparatus stores the information about the first coordinate system relative to the second coordinate system. The map server receives, from the vehicle-mounted apparatus, the information that is about the first coordinate system relative to the second coordinate system and that is obtained when the measurement device determines a position of a measurement target in the first coordinate system. According to the foregoing method, in a manner in which the vehicle-mounted apparatus actively sends the information about the first coordinate system relative to the second coordinate system, the first device does not need to request the information, thereby reducing signaling overheads.

The map server may further send a query request for the information about the first coordinate system relative to the second coordinate system to the vehicle-mounted apparatus. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes an identifier of the measurement device and/or an identifier of the second coordinate system. According to the foregoing method, the vehicle-mounted apparatus sends the information about the first coordinate system relative to the second coordinate system only when the first device requests the information, so that the vehicle-mounted apparatus can be prevented from sending the information about the first coordinate system relative to the second coordinate system to an irrelevant device, thereby protecting privacy of the measurement device, and reducing signaling overheads.

Example a3.3: The vehicle-mounted apparatus stores initial information of the first coordinate system relative to the second coordinate system. The map server receives the initial information of the first coordinate system relative to the second coordinate system from the vehicle-mounted apparatus. The map server receives the identifier of the measurement device and first position change information of the measurement device from the measurement device. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The map server determines the information about the first coordinate system relative to the second coordinate system based on the first position change information of the measurement device and the initial information of the first coordinate system relative to the second coordinate system.

According to the foregoing method, the vehicle-mounted apparatus may send the initial information of the first coordinate system relative to the second coordinate system to the map server based on a requirement, and the measurement device may send the first position change information of the measurement device to the map server based on a requirement. For example, the initial information of the first coordinate system relative to the second coordinate system may be sent to the map server in advance, and the first position change information of the measurement device may be sent together with the position of the measurement target in the first coordinate system, to adapt to more application scenarios and improve positioning flexibility of the map server.

The map server may further send a query request for the initial information of the first coordinate system relative to the second coordinate system to the vehicle-mounted apparatus. The query request for the initial information of the first coordinate system relative to the second coordinate system is used to query position information of an initial position of the measurement device in the second coordinate system. The query request for the initial information of the first coordinate system relative to the second coordinate system includes the identifier of the measurement device and/or the identifier of the second coordinate system. According to the foregoing method, the vehicle-mounted apparatus sends the initial information of the first coordinate system relative to the second coordinate system only when the first device requests the initial information, so that the vehicle-mounted apparatus can be prevented from sending the initial information of the first coordinate system relative to the second coordinate system to an irrelevant device, thereby protecting privacy of the measurement device, and reducing signaling overheads.

Example a4.3: The first device is the map server. The vehicle-mounted apparatus stores historical information of the first coordinate system relative to the second coordinate system. The map server receives the historical information of the first coordinate system relative to the second coordinate system from the vehicle-mounted apparatus. The map server receives the identifier of the measurement device and second position change information of the measurement device from the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system. The map server determines the information about the first coordinate system relative to the second coordinate system based on the second position change information of the measurement device and the historical information of the first coordinate system relative to the second coordinate system. According to the foregoing method, the vehicle-mounted apparatus may send the historical information of the first coordinate system relative to the second coordinate system to the map server based on a requirement, and the measurement device may send the second position change information of the measurement device to the map server based on a requirement. For example, the historical information of the first coordinate system relative to the second coordinate system may be sent to the map server in advance, and the second position change information of the measurement device may be sent together with the position of the measurement target in the first coordinate system, to adapt to more application scenarios and improve positioning flexibility of the map server.

The map server may further send a query request for the historical information of the first coordinate system relative to the second coordinate system to the vehicle-mounted apparatus. The query request for the historical information of the first coordinate system relative to the second coordinate system is used to query position information that is of the measurement device in the second coordinate system and that is obtained when the measurement device measures the position of the historical target. The query request for the historical information of the first coordinate system relative to the second coordinate system includes the identifier of the measurement device and/or the identifier of the second coordinate system. According to the foregoing method, the vehicle-mounted apparatus sends the historical information of the first coordinate system relative to the second coordinate system only when the first device requests the historical information, so that the vehicle-mounted apparatus can be prevented from sending the historical information of the first coordinate system relative to the second coordinate system to an irrelevant device, thereby protecting privacy of the measurement device, and reducing signaling overheads.

The map server further sends a query request for the second position change information of the measurement device to the measurement device. The query request for the second position change information of the measurement device is used to query a measurement position that is of the measurement device relative to a historical position and that is obtained when the measurement device determines the position of the measurement target in the first coordinate system. The query request for the second position change information of the measurement device includes the identifier of the measurement device and/or the identifier of the second coordinate system. According to the foregoing method, the measurement device sends the second position change information of the measurement device only when the map server requests the second position change information of the measurement device, so that the measurement device can be prevented from sending the second position change information of the measurement device to an irrelevant device, thereby protecting privacy of the measurement device and the map coordinate system, and reducing signaling overheads.

Step 1002: The map server obtains the position of the measurement target in the first coordinate system.

For a specific implementation process, refer to the implementation in FIG. 4 or FIG. 7. Details are not described herein again.

Step 1003: The map server determines position information of the measurement target on a first high-precision map based on coordinate transformation information and position information of the measurement target relative to the measurement device.

For a specific implementation process, refer to the implementation in FIG. 4 or FIG. 7. Details are not described herein again.

Step 1004: The map server sends the position information of the measurement target on the first high-precision map to the vehicle-mounted apparatus.

For a specific implementation process, refer to the implementation in FIG. 4 or FIG. 7. Details are not described herein again.

Figure 11:
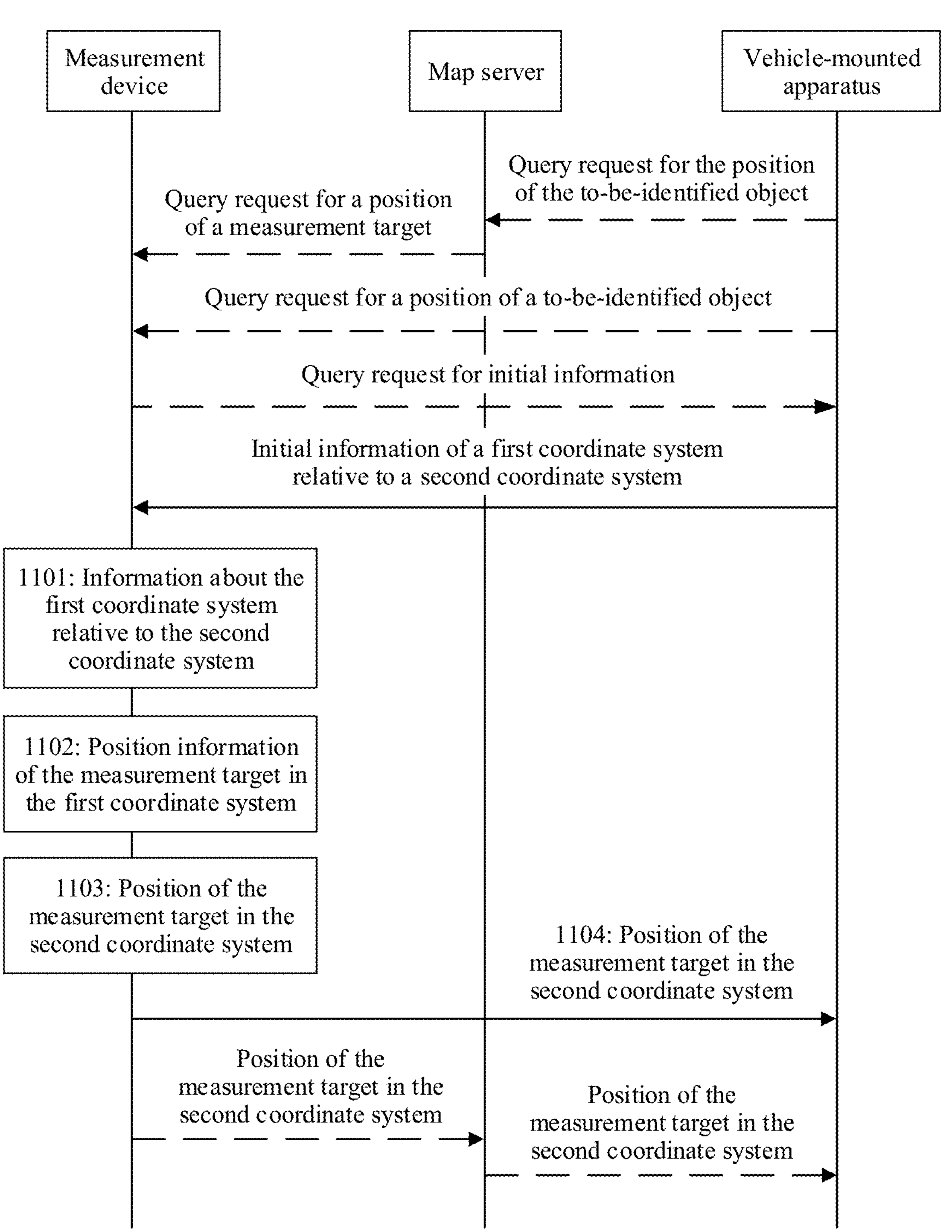
FIG. 11 is a flowchart of a positioning method according to an embodiment of this application.

An example in which coordinate transformation is performed by a measurement device is used for description. As shown in FIG. 11, the procedure includes the following steps.

Step 1101: The measurement device obtains information about a first coordinate system relative to a second coordinate system.

In a possible implementation, the measurement device may receive the information about the first coordinate system relative to the second coordinate system by using a receiver.

Example b2.2: The vehicle-mounted apparatus stores the information about the first coordinate system relative to the second coordinate system. The measurement device receives, from the vehicle-mounted apparatus, the information that is about the first coordinate system relative to the second coordinate system and that is obtained when the measurement device determines a position of a measurement target in the first coordinate system. According to the foregoing method, in a manner in which the vehicle-mounted apparatus actively sends the information about the first coordinate system relative to the second coordinate system, the first device does not need to request the information, thereby reducing signaling overheads.

The measurement device may further send a query request for the information about the first coordinate system relative to the second coordinate system to the vehicle-mounted apparatus. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes an identifier of the measurement device and/or an identifier of the second coordinate system. According to the foregoing method, the vehicle-mounted apparatus sends the information about the first coordinate system relative to the second coordinate system only when the first device requests the information, so that the vehicle-mounted apparatus can be prevented from sending the information about the first coordinate system relative to the second coordinate system to an irrelevant device, thereby protecting privacy of the measurement device, and reducing signaling overheads.

Example b3.3: The vehicle-mounted apparatus stores initial information of the first coordinate system relative to the second coordinate system. The measurement device receives the initial information of the first coordinate system relative to the second coordinate system from the vehicle-mounted apparatus. The measurement device determines the information about the first coordinate system relative to the second coordinate system based on first position change information of the measurement device and the initial information of the first coordinate system relative to the second coordinate system. According to the foregoing method, the measurement device does not need to store the initial information of the first coordinate system relative to the second coordinate system, so that occupation of storage space is reduced, and impact on performance of the measurement device that may be caused by occupation of additional storage space is avoided.

The measurement device may further send a query request for the initial information of the first coordinate system relative to the second coordinate system to the vehicle-mounted apparatus. The query request for the initial information of the first coordinate system relative to the second coordinate system is used to query position information of an initial position of the measurement device in the second coordinate system. The query request for the initial information of the first coordinate system relative to the second coordinate system includes the identifier of the measurement device and/or the identifier of the second coordinate system. According to the foregoing method, the vehicle-mounted apparatus sends the initial information of the first coordinate system relative to the second coordinate system only when the first device requests the initial information, so that the vehicle-mounted apparatus can be prevented from sending the initial information of the first coordinate system relative to the second coordinate system to an irrelevant device, thereby protecting privacy of the measurement device, and reducing signaling overheads.

Example b4.3: The vehicle-mounted apparatus stores historical information of the first coordinate system relative to the second coordinate system. The measurement device receives the historical information of the first coordinate system relative to the second coordinate system from the vehicle-mounted apparatus. The measurement device determines the information about the first coordinate system relative to the second coordinate system based on second position change information of the measurement device and the historical information of the first coordinate system relative to the second coordinate system. According to the foregoing method, the measurement device does not need to store the historical information of the first coordinate system relative to the second coordinate system, so that occupation of storage space is reduced, and impact on performance of the measurement device that may be caused by occupation of additional storage space is avoided.

The measurement device may further send a query request for the historical information of the first coordinate system relative to the second coordinate system to the vehicle-mounted apparatus. The query request for the historical information of the first coordinate system relative to the second coordinate system is used to query position information of a historical position of the measurement device in the second coordinate system. The query request for the historical information of the first coordinate system relative to the second coordinate system includes the identifier of the measurement device and/or the identifier of the second coordinate system. According to the foregoing method, the vehicle-mounted apparatus sends the historical information of the first coordinate system relative to the second coordinate system only when the first device requests the historical information, so that the vehicle-mounted apparatus can be prevented from sending the historical information of the first coordinate system relative to the second coordinate system to an irrelevant device, thereby protecting privacy of the measurement device, and reducing signaling overheads.

Step 1102: The measurement device obtains the position of the measurement target in the first coordinate system.

For a specific implementation process, refer to the implementation in FIG. 5 or FIG. 8. Details are not described herein again.

Step 1103: The measurement device determines position information of the measurement target on a first high-precision map based on coordinate transformation information and position information of the measurement target relative to the measurement device.

For a specific implementation process, refer to the implementation in FIG. 5 or FIG. 8. Details are not described herein again.

Step 1104: The measurement device sends the position information of the measurement target on the first high-precision map to the vehicle-mounted apparatus.

For a specific implementation process, refer to the implementation in FIG. 5 or FIG. 8. Details are not described herein again.

Figure 12:
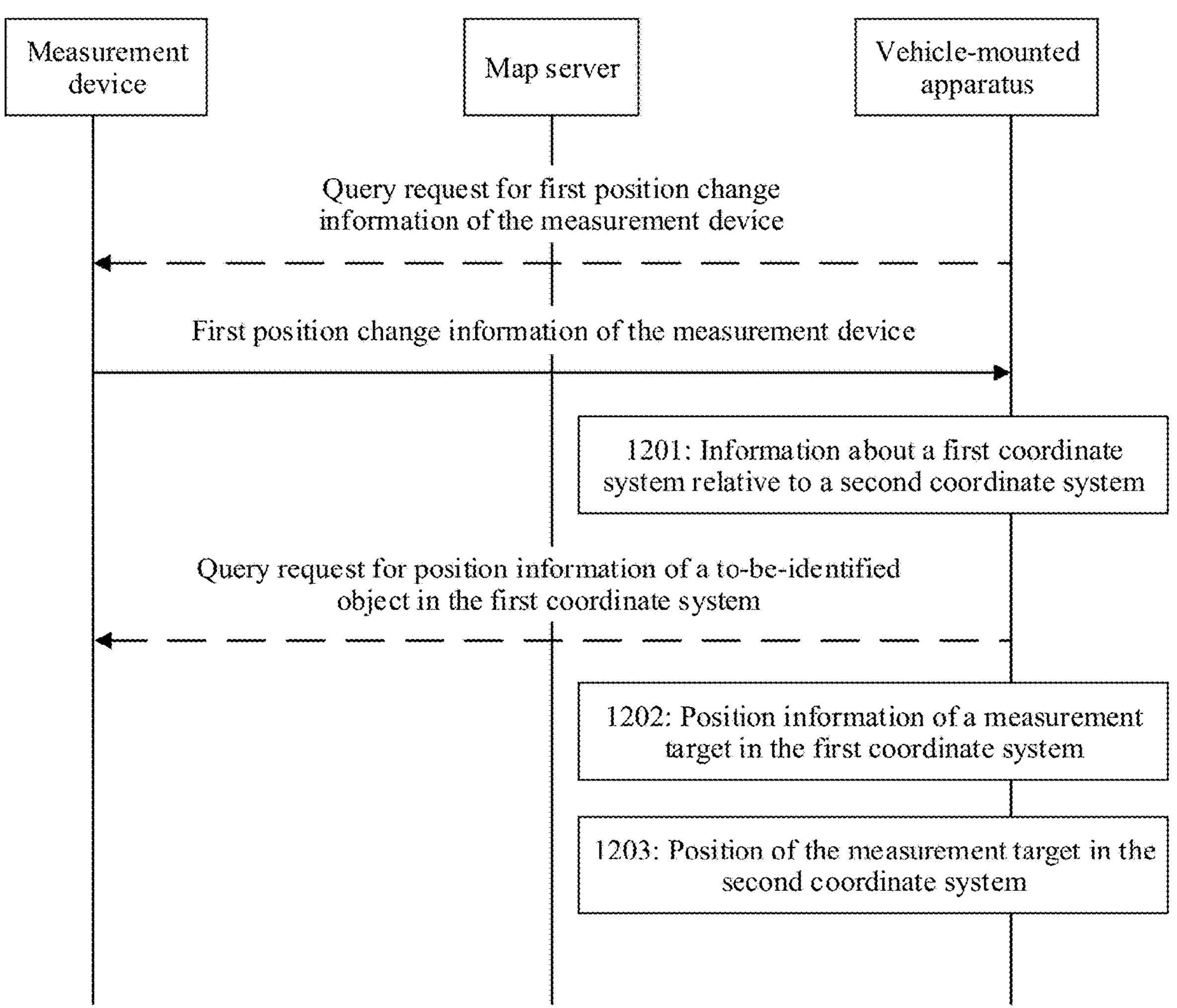
FIG. 12 is a flowchart of a positioning method according to an embodiment of this application.

An example in which coordinate transformation is performed by a vehicle-mounted apparatus is used for description. As shown in FIG. 12, the procedure includes the following steps.

Step 1201: The vehicle-mounted apparatus obtains information about a first coordinate system relative to a second coordinate system.

In a possible implementation, the first device may read the information about the first coordinate system relative to the second coordinate system from a memory.

Example c1: The vehicle-mounted apparatus stores the information about the first coordinate system relative to the second coordinate system. The vehicle-mounted apparatus reads, from the memory, the information that is about the first coordinate system relative to the second coordinate system and that is obtained when the measurement device determines a position of a measurement target in the first coordinate system. The information that is about the first coordinate system relative to the second coordinate system and that is stored in the vehicle-mounted apparatus may be sent by the map server to the vehicle-mounted apparatus in advance, or may be sent by the measurement device to the vehicle-mounted apparatus in advance, so that when determining that coordinate transformation needs to be performed, the vehicle-mounted apparatus can directly read the information about the first coordinate system relative to the second coordinate system from the memory, and does not need to obtain the information online, thereby increasing a response speed, and avoiding a case in which a poor network affects determining of a relative position of the measurement target.

In a possible implementation, the vehicle-mounted apparatus stores initial information of the first coordinate system relative to the second coordinate system, where the initial information is determined based on an initial position and an initial posture that are of the measurement device in the second coordinate system; obtains a position change of a position in which the measurement device measures the measurement target and that is relative to the initial position, and obtains a posture change of a posture in which the measurement device measures the measurement target and that is relative to the initial posture; and determines the information about the first coordinate system relative to the second coordinate system based on the initial information, the position change, and the posture change.

Example c3.2: The vehicle-mounted apparatus receives at least one of the following sent by the measurement device: first position change information of the measurement device and an identifier of the measurement device. The measurement device may further send an identifier of the second coordinate system to the vehicle-mounted apparatus. The vehicle-mounted apparatus further determines the information about the first coordinate system relative to the second coordinate system based on the first position change information of the measurement device and the initial information of the first coordinate system relative to the second coordinate system.

The vehicle-mounted apparatus may further send a query request for the first position change information of the measurement device to the map server. Alternatively, the vehicle-mounted apparatus may further send a query request for the first position change information of the measurement device to the measurement device. The query request for the first position change information of the measurement device is used to query the first position change information that is of the measurement device in the second coordinate system and that is obtained when the measurement device determines the position of the measurement target in the first coordinate system. The query request for the first position change information of the measurement device includes the identifier of the measurement device and/or the identifier of the second coordinate system.

Example c4.2: The vehicle-mounted apparatus stores historical information of the first coordinate system relative to the second coordinate system. The vehicle-mounted apparatus receives at least one of the following of the measurement device: second position change information of the measurement device, an identifier of the measurement device, and an identifier of the second coordinate system. The vehicle-mounted apparatus determines the information about the first coordinate system relative to the second coordinate system based on the second position change information of the measurement device and the historical information of the first coordinate system relative to the second coordinate system.

In a possible implementation, the vehicle-mounted apparatus further sends a query request for the second position change information of the measurement device to the map server. Alternatively, the vehicle-mounted apparatus sends a query request for the second position change information of the measurement device to the measurement device. The query request for the second position change information of the measurement device is used to query the first position change information that is of the measurement device in the second coordinate system and that is obtained when the measurement device determines the position of the measurement target in the first coordinate system. The query request for the second position change information of the measurement device includes the identifier of the measurement device and/or the identifier of the second coordinate system.

Step 1202: The vehicle-mounted apparatus obtains the position of the measurement target in the first coordinate system.

Example B2.1: The map server sends the position of the measurement target in the first coordinate system to the vehicle-mounted apparatus. The vehicle-mounted apparatus further receives the position that is of the measurement target in the first coordinate system and that is sent by the map server.

The vehicle-mounted apparatus receives the position that is of the measurement target in the first coordinate system and that is sent by the map server, so that the position of the measurement target in the first coordinate system can be flexibly obtained. In addition to sending the position of the measurement target in the first coordinate system to the vehicle-mounted apparatus by the measurement device, effective offloading can be performed by using the map server. This helps implement effective resource utilization.

The vehicle-mounted apparatus may further send a query request for a position of a to-be-identified object in the first coordinate system to the map server. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is an object in a preset range of the measurement device. The map server receives a query request for a target position from the vehicle-mounted apparatus. The map server determines, based on position information of the measurement device in the first coordinate system, that the to-be-identified object includes at least the measurement target.

According to the foregoing method, the vehicle-mounted apparatus may actively initiate the query request for the position of the to-be-identified object in the first coordinate system to the map server, so that the map server determines the to-be-identified object and the position that is of the measurement target in the first coordinate system and that corresponds to the to-be-identified object, to prevent the map server from sending the position of the measurement target in the first coordinate system to an irrelevant device.

Example B2.2: The measurement device sends the position of the measurement target in the first coordinate system to the vehicle-mounted apparatus. The vehicle-mounted apparatus further receives, by using a receiver, the position that is of the measurement target in the first coordinate system and that is sent by the measurement device.

The vehicle-mounted apparatus receives the position that is of the measurement target in the first coordinate system and that is sent by the measurement device, so that the position of the measurement target in the first coordinate system can be directly obtained. This helps reduce a delay and increase a speed of obtaining the position information of the measurement target in the first coordinate system.

The vehicle-mounted apparatus further sends a query request for a position of a to-be-identified object in the first coordinate system to the measurement device. The request for the position of the to-be-identified object in the first coordinate system is used to query position information of the to-be-identified object in the first coordinate system. The to-be-identified object is an object in a preset range of the measurement device. The query request for the position of the to-be-identified object in the first coordinate system includes the identifier of the measurement device. The measurement device receives the query request for the position of the to-be-identified object in the first coordinate system from the vehicle-mounted apparatus. The measurement device determines, based on the query request for the position of the to-be-identified object in the first coordinate system, that the to-be-identified object includes at least the measurement target.

According to the foregoing method, the vehicle-mounted apparatus may actively initiate the query request for the position of the to-be-identified object in the first coordinate system to the measurement device, so that the measurement device determines the to-be-identified object and the position that is of the measurement target in the first coordinate system and that corresponds to the to-be-identified object, to prevent the measurement device from sending the position of the measurement target in the first coordinate system to an irrelevant device.

In a possible implementation, if the measurement device sends, to the vehicle-mounted apparatus in a manner of sending the position information of the measurement target in the first coordinate system, position change information that is of the measurement device on the first high-precision map and that is obtained when the measurement device determines the position of the measurement target in the first coordinate system, the measurement device may further actively send initial information of the measurement device on the first high-precision map or historical information of the measurement device on the first high-precision map to the vehicle-mounted apparatus. The initial information of the measurement device on the first high-precision map or the historical information of the measurement device on the first high-precision map may be carried in the position information of the measurement target in the first coordinate system for sending, or may be separately sent. This is not limited herein. Therefore, the vehicle-mounted apparatus determines, based on the initial information of the measurement device on the first high-precision map or the historical information of the measurement device on the first high-precision map, and the position change information, position information that is of the measurement device on the first high-precision map and that is obtained when the measurement device determines the position of the measurement target in the first coordinate system, to determine coordinate transformation information of the measurement device in a first high-precision map coordinate system.

In a possible implementation, the vehicle-mounted apparatus may send a query request for the initial information of the measurement device to the measurement device. Alternatively, the vehicle-mounted apparatus sends a query request for the historical information of the measurement device to the measurement device. Alternatively, the vehicle-mounted apparatus sends a query request for the position information of the measurement device to the measurement device.

A specific manner of sending the query request may be determined based on whether the position information of the measurement target in the first coordinate system carries the position change information of the measurement device. For example, if the vehicle-mounted apparatus determines that the position information of the measurement target in the first coordinate system includes the position change information of the measurement device, and the position change information of the measurement device includes translation transformation information of the measurement device on the first high-precision map and rotation transformation information of the measurement device on the first high-precision map, the vehicle-mounted apparatus may directly determine coordinate transformation information of the measurement device relative to the first high-precision map based on the position change information of the measurement device. Therefore, the vehicle-mounted apparatus may not send the query request to the map server.

For example, if the vehicle-mounted apparatus determines that the position information of the measurement target in the first coordinate system includes the position change information of the measurement device, and the position change information of the measurement device indicates a position change of position information that is obtained when the measurement device determines the position of the measurement target in the first coordinate system and that is relative to the initial information, the vehicle-mounted apparatus may send a query request for the initial information of the measurement device to the measurement device, and determine coordinate transformation information of the measurement device relative to the first high-precision map based on the initial information of the measurement device on the first high-precision map and the position change information of the measurement device that are returned by the measurement device.

For another example, if the vehicle-mounted apparatus determines that the position information of the measurement target in the first coordinate system includes the position change information of the measurement device, and the position change information of the measurement device indicates a position change of position information that is obtained when the measurement device determines the position of the measurement target in the first coordinate system and that is relative to the historical information, the vehicle-mounted apparatus may send a query request for the historical information of the measurement device to the measurement device, and further determine coordinate transformation information of the measurement device relative to the first high-precision map based on the historical information of the measurement device on the first high-precision map and the position change information of the measurement device that are returned by the measurement device.

Alternatively, if the vehicle-mounted apparatus determines that the position information of the measurement target in the first coordinate system does not include the position change information of the measurement device, the vehicle-mounted apparatus may send a query request for the position information of the measurement device to the measurement device, and further determine coordinate transformation information of the measurement device relative to the first high-precision map based on the position information that is of the measurement device on the first high-precision map and that is returned by the measurement device. Alternatively, the vehicle-mounted apparatus may send a query request for the position change information of the measurement device to the measurement device. This is not limited herein.

In a possible implementation, the vehicle-mounted apparatus sends a query request for a position of the measurement device on the first high-precision map to the measurement device based on the obtained identifier of the measurement device. The query request for the position of the measurement device on the first high-precision map includes the identifier of the measurement device and/or an identifier of the first high-precision map.

Step 1203: The vehicle-mounted apparatus determines position information of the measurement target on the first high-precision map based on the coordinate transformation information and position information of the measurement target relative to the measurement device.

The vehicle-mounted apparatus further determines relative position information of the measurement target relative to the vehicle-mounted apparatus based on a target position of the measurement target in the M1-CS coordinate system and position information of the vehicle-mounted apparatus in the M1-CS coordinate system.

A position of the measurement target and a positioning position of the vehicle in the second coordinate system can be better matched by using a position $q_{target}$ of the measurement target in the first coordinate system RSU-LCS and rotation information of the first coordinate system RSU-LCS in the second coordinate system M1-CS that are sent by the measurement device. This resolves a problem that there is a relatively large deviation in estimation of a relative distance between the positioning position of the vehicle and the target position because a positioning offset that is of the vehicle and that is positioned based on the high-precision map is inconsistent with a position offset that is of the measurement target and that is detected by the measurement device based on the first coordinate system.

The following describes, with reference to the accompanying drawings, apparatuses configured to implement the foregoing methods in the embodiments of this application. Therefore, all the foregoing content may be used in subsequent embodiments, and repeated content is not described again.

Figure 13:
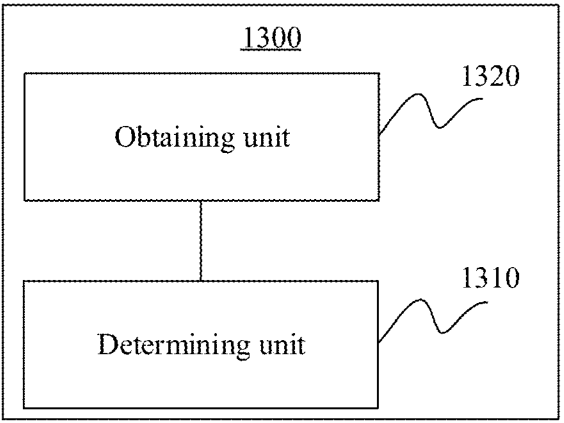
FIG. 13 is a structural block diagram of a positioning apparatus according to an embodiment of this application.

FIG. 13 is a structural block diagram of a positioning apparatus 1300 according to an embodiment of this application. For example, the positioning apparatus 1300 is a first device. The positioning apparatus 1300 includes a determining unit 1310, and optionally, may further include an obtaining unit 1320. Alternatively, the obtaining unit 1320 and the determining unit 1310 may be two apparatuses that are independent of each other. For example, both the determining unit 1310 and the obtaining unit 1320 are carried in a map server, the obtaining unit 1320 may be a communications unit in the map server, and the determining unit 1310 may be a determining unit in the map server. The obtaining unit 1320 and the determining unit 1310 may communicate with each other in a wired manner or a wireless manner. For example, the positioning apparatus 1300 may be a measurement device. For example, the measurement device includes a road side unit, a measurement apparatus in a road side unit, a vehicle, or a measurement apparatus in a vehicle. The measurement device may be a road side unit, or may be a chip applied to a road side unit, or may be a measurement apparatus in a road side unit, or may be a chip applied to a measurement apparatus in a road side unit. Alternatively, the measurement device may be a vehicle having a function of the measurement device, or a chip applied to a vehicle having a function of the measurement device. Alternatively, the measurement device may be a measurement apparatus in a vehicle having a function of the measurement device, a chip applied to a measurement apparatus in a vehicle having a function of the measurement device, a combined component or part having a function of the measurement device in a vehicle-mounted apparatus, or another combined component or part having a function of the measurement device. When the positioning apparatus 1300 is a road side unit, the obtaining unit 1320 may be a transceiver, where the transceiver may include an antenna, a radio frequency circuit, and the like, or may be an interface circuit coupled to a processor, and the determining unit 1310 may be the processor, for example, a baseband processor. The baseband processor may include one or more central processing units (CPU). When the positioning apparatus 1300 is a part having a terminal function, the obtaining unit 1320 may be a radio frequency unit, and the determining unit 1310 may be a processor, for example, a baseband processor. When the positioning apparatus 1300 is a chip system, the obtaining unit 1320 may be an input/output interface in the chip system (for example, a baseband chip), and the determining unit may be a processor in the chip system. The processor may include one or more central processing units.

The determining unit 1310 may be configured to perform all operations performed by the first device except the receiving and sending operations in the embodiment shown in FIG. 3, for example, S403, and/or configured to support another process of the technology described in this specification. The obtaining unit 1320 may be configured to perform all obtaining operations performed by the first device in the embodiment shown in FIG. 3, for example, S302, and/or configured to support another process of the technology described in this specification.

In addition, the obtaining unit 1320 may be a function module, and the function module can complete both a sending operation and a receiving operation. For example, if the obtaining unit 1320 is a module included in the positioning apparatus 1300, the obtaining unit 1320 may be configured to perform all sending operations and receiving operations performed by the first device in the embodiments shown in FIG. 3 to FIG. 11. For example, when a sending operation is performed, it may be considered that the obtaining unit 1320 is a sending module, and when a receiving operation is performed, it may be considered that the obtaining unit 1320 is a receiving module. Alternatively, the obtaining unit 1320 may be a general term of two function modules, and the two function modules are respectively a sending module and a receiving module. The sending module is configured to complete a sending operation. For example, if the obtaining unit 1320 is a module included in the first device, the sending module may be configured to perform all sending operations performed by the first device in the embodiments shown in FIG. 3 to FIG. 12. The receiving module is configured to complete a receiving operation. For example, if the obtaining unit 1320 is a module included in the first device 1100, the receiving module may be configured to perform all receiving operations performed by the first device in the embodiments shown in FIG. 3 to FIG. 12.

The obtaining unit 1320 is configured to: obtain information about a first coordinate system relative to a second coordinate system, where the first coordinate system is a coordinate system used by a measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system; and obtain a position of a measurement target in the first coordinate system, where the position of the measurement target in the first coordinate system is obtained by the measurement device through measurement.

The determining unit 1310 is configured to determine a position of the measurement target in the second coordinate system based on the information about the first coordinate system relative to the second coordinate system and the position of the measurement target in the first coordinate system.

In a possible design, the measurement device includes a road side unit, a measurement apparatus in a road side unit, a vehicle, or a measurement apparatus in a vehicle.

In a possible design, the positioning apparatus is applied to a map server, a road side unit, or a vehicle.

In a possible design, that the obtaining unit 1320 obtains information about a first coordinate system relative to a second coordinate system includes: reading the information about the first coordinate system relative to the second coordinate system from a memory; or receiving the information about the first coordinate system relative to the second coordinate system.

In a possible design, the obtaining unit 1320 is specifically configured to:

- obtain initial information of the first coordinate system relative to the second coordinate system, where the initial information is determined based on an initial position and an initial posture that are of the measurement device in the second coordinate system;
- obtain a position change of a position in which the measurement device measures the measurement target and that is relative to the initial position, and obtain a posture change of a posture in which the measurement device measures the measurement target and that is relative to the initial posture; and
- determine the information about the first coordinate system relative to the second coordinate system based on the initial information, the position change, and the posture change.

In a possible design, that the obtaining unit 1320 obtains a position of a measurement target in the first coordinate system includes: obtaining the position of the measurement target in the first coordinate system through measurement by using a sensor; or receiving the position of the measurement target in the first coordinate system.

In a possible design, the rotation information includes at least one of a rotation matrix from the second coordinate system to the first coordinate system, a rotation matrix from the first coordinate system to the second coordinate system, Euler angles of the first coordinate system with respect to the second coordinate system, Euler angles of the second coordinate system with respect to the first coordinate system, a rotation vector from the second coordinate system to the first coordinate system, a rotation vector from the first coordinate system to the second coordinate system, a rotation quaternion from the second coordinate system to the first coordinate system, or a rotation quaternion from the first coordinate system to the second coordinate system.

In a possible design, that the obtaining unit 1320 obtains information about a first coordinate system relative to a second coordinate system includes: obtaining an identifier of the measurement device; and obtaining the information about the first coordinate system relative to the second coordinate system based on the identifier of the measurement device.

In this embodiment of this application, division into the units is an example, and is merely logical function division, and may be other division in an actual implementation. In addition, function units in this embodiment of this application may be integrated into one processor, or may exist alone physically, or two or more units may be integrated into one unit. The integrated unit may be implemented in a form of hardware, or may be implemented in a form of a software function unit.

Only one or more of the units in FIG. 13 may be implemented by software, hardware, firmware, or a combination thereof. The software or firmware includes but is not limited to a computer program instruction or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 14:
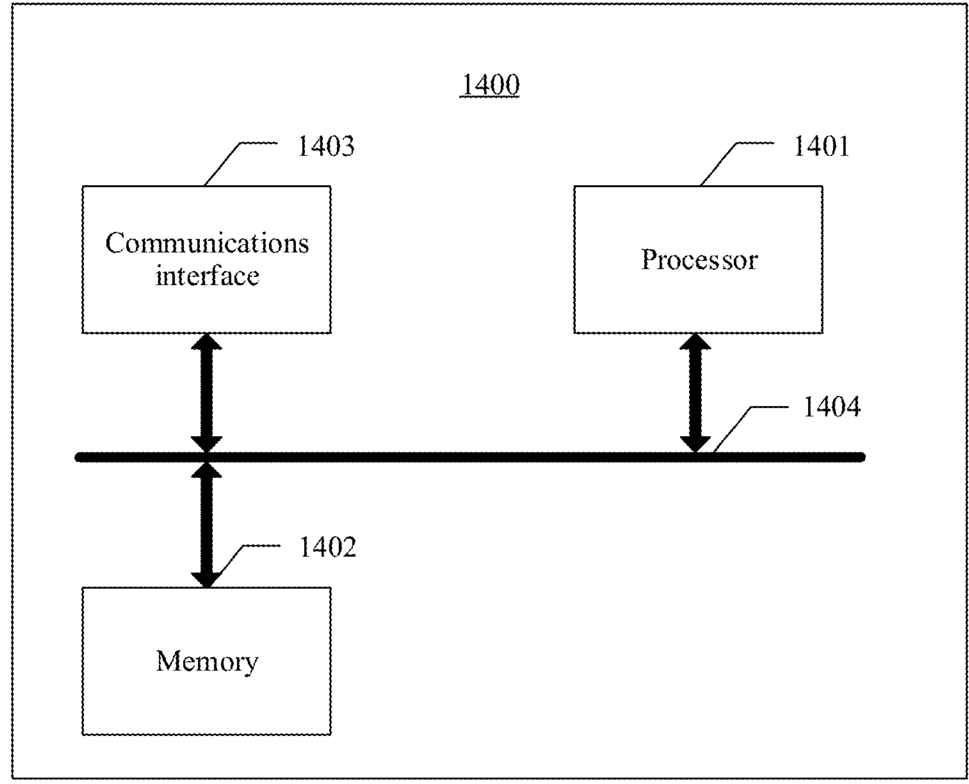
FIG. 14 is a structural block diagram of a positioning apparatus according to an embodiment of this application.

A positioning apparatus 1400 shown in FIG. 14 includes at least one processor 1401. The positioning apparatus 1400 further includes at least one memory 1402, configured to store a program instruction and/or data. The memory 1402 is coupled to the processor 1401. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1401 may cooperate with the memory 1402. The processor 1401 may execute the program instruction stored in the memory 1402. At least one of the at least one memory 1402 may be included in the processor 1401.

The positioning apparatus 1400 may further include a communications interface 1403, configured to communicate with another device through a transmission medium, so that the positioning apparatus 1400 can communicate with the another device. In this embodiment of this application, the communications interface may be a transceiver, a circuit, a bus, a module, or a communications interface of another type. In this embodiment of this application, when the communications interface is a transceiver, the transceiver may include an independent receiver and an independent transmitter, or may be a transceiver integrated with a transceiver function, an interface circuit, or the like.

It should be understood that a connection medium between the processor 1401, the memory 1402, and the communications interface 1403 is not limited in this embodiment of this application. In this embodiment of this application, the memory 1402, the processor 1401, and the communications interface 1403 are connected by using a communications bus 1004 in FIG. 14. The bus is indicated by using a bold line in FIG. 10. A connection manner between other parts is merely an example for description, and is not limited. The bus may include an address bus, a data bus, a control bus, and the like. For ease of representation, only one thick line is used to represent the bus in FIG. 10, but this does not mean that there is only one bus or only one type of bus.

In an example, the positioning apparatus 1400 is configured to implement the steps performed by the map server in the procedures shown in FIG. 3 to FIG. 12. The positioning apparatus 1400 may be a map server, or a chip or a circuit in a map server. The communications interface 1403 is configured to perform related receiving and sending operations on the map server side in the foregoing embodiment. The processor 1401 is configured to perform a related processing operation on the map server side in the foregoing method embodiment.

For example, the processor 1401 is configured to: obtain a position of a measurement target in a first coordinate system, where the position of the measurement target in the first coordinate system is obtained by the measurement device through measurement; obtain information about the first coordinate system relative to a second coordinate system, where the first coordinate system is a coordinate system used by the measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system; and determine a position of the measurement target in the second coordinate system based on the information about the first coordinate system relative to the second coordinate system and the position of the measurement target in the first coordinate system.

In a possible design, the measurement device includes a road side unit, a measurement apparatus in a road side unit, a vehicle, or a measurement apparatus in a vehicle.

In a possible design, the processor 1401 is specifically configured to: obtain an identifier of the measurement device; and obtain the information about the first coordinate system relative to the second coordinate system based on the identifier of the measurement device. The identifier of the measurement device may include one or more of the following: a number of the measurement device in the second coordinate system, or a unique number of the measurement device.

Example a1: The memory 1402 of the map server stores the information about the first coordinate system relative to the second coordinate system. The processor 1401 is configured to read, from the memory 1402, the information that is about the first coordinate system relative to the second coordinate system and that is obtained when the measurement device determines the position of the measurement target in the first coordinate system.

Example a2.1: The measurement device stores the information about the first coordinate system relative to the second coordinate system. The processor 1401 is configured to receive, from the measurement device through the communications interface 1403, the information that is about the first coordinate system relative to the second coordinate system and that is obtained when the measurement device determines the position of the measurement target in the first coordinate system.

The processor 1401 is further configured to send a query request for the information about the first coordinate system relative to the second coordinate system to the measurement device through the communications interface 1403. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

Manner a2.2: The vehicle-mounted apparatus stores the information about the first coordinate system relative to the second coordinate system. The processor 1401 is further configured to receive, from the vehicle-mounted apparatus through the communications interface 1403, the information that is about the first coordinate system relative to the second coordinate system and that is obtained when the measurement device determines the position of the measurement target in the first coordinate system.

The processor 1401 is further configured to send a query request for the information about the first coordinate system relative to the second coordinate system to the vehicle-mounted apparatus through the communications interface 1403. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

In a possible design, the processor 1401 is further configured to: obtain initial information of the first coordinate system relative to the second coordinate system, where the initial information is determined based on an initial position and an initial posture that are of the measurement device in the second coordinate system; and obtain a position change of a position in which the measurement device measures the measurement target and that is relative to the initial position, and obtain a posture change of a posture in which the measurement device measures the measurement target and that is relative to the initial posture.

The processor 1401 is further configured to determine the information about the first coordinate system relative to the second coordinate system based on the initial information of the first coordinate system relative to the second coordinate system, and the position change and the posture change that are of the measurement device.

Example a3.1: The memory 1402 of the map server stores the initial information of the first coordinate system relative to the second coordinate system. The processor 1401 is further configured to: read the initial information of the first coordinate system relative to the second coordinate system from the memory, and receive the identifier of the measurement device and first position change information of the measurement device through the communications interface 1403. The first position change information of the measurement device is used to indicate a difference between position information that is of the measurement device and that is obtained when the measurement device determines the position of the measurement target in the first coordinate system and the initial information. The first position change information of the measurement device includes the position change of the position in which the measurement device measures the measurement target and that is relative to the initial position, and the posture change of the posture in which the measurement device measures the measurement target and that is relative to the initial posture. The identifier of the measurement device is used by the map server to determine the initial information of the first coordinate system relative to the second coordinate system. The processor 1401 is further configured to determine the information about the first coordinate system relative to the second coordinate system based on the first position change information of the measurement device and the initial information of the first coordinate system relative to the second coordinate system.

Example a3.2: The measurement device stores the initial information of the first coordinate system relative to the second coordinate system. The processor 1401 is further configured to: receive the initial information of the first coordinate system relative to the second coordinate system from the measurement device through the communications interface 1403, and receive the identifier of the measurement device and first position change information of the measurement device from the measurement device. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The processor 1401 is further configured to determine the information about the first coordinate system relative to the second coordinate system based on the first position change information of the measurement device and the initial information of the first coordinate system relative to the second coordinate system.

The processor 1401 is further configured to send a query request for the initial information of the first coordinate system relative to the second coordinate system to the measurement device through the communications interface 1403. The query request for the initial information of the first coordinate system relative to the second coordinate system is used to query position information of the initial position of the measurement device in the second coordinate system. The query request for the initial information of the first coordinate system relative to the second coordinate system includes the identifier of the measurement device and/or an identifier of the second coordinate system.

Example a3.3: The vehicle-mounted apparatus stores the initial information of the first coordinate system relative to the second coordinate system. The processor 1401 is further configured to: receive the initial information of the first coordinate system relative to the second coordinate system from the vehicle-mounted apparatus through the communications interface 1403, and receive the identifier of the measurement device and first position change information of the measurement device from the measurement device. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system. The processor 1401 is further configured to determine the information about the first coordinate system relative to the second coordinate system based on the first position change information of the measurement device and the initial information of the first coordinate system relative to the second coordinate system.

The processor 1401 is further configured to send a query request for the initial information of the first coordinate system relative to the second coordinate system to the vehicle-mounted apparatus through the communications interface 1403. The query request for the initial information of the first coordinate system relative to the second coordinate system is used to query position information of the initial position of the measurement device in the second coordinate system. The query request for the initial information of the first coordinate system relative to the second coordinate system includes the identifier of the measurement device and/or an identifier of the second coordinate system.

The processor 1401 is further configured to send a query request for the first position change information of the measurement device to the measurement device through the communications interface 1403. The query request for the first position change information of the measurement device is used to query a measurement position that is of the measurement device relative to the initial position and that is obtained when the measurement device determines the position of the measurement target in the first coordinate system. The query request for the first position change information of the measurement device includes the identifier of the measurement device and/or an identifier of the second coordinate system.

Manner 4: The processor 1401 may be configured to obtain historical information of the first coordinate system relative to the second coordinate system. The historical information is determined based on an initial historical position and a historical posture that are of the measurement device in the second coordinate system. The second position change information includes the position change of the position in which the measurement device measures the measurement target and that is relative to the initial position, and the posture change of the posture in which the measurement device measures the measurement target and that is relative to the initial posture.

The processor 1401 is further configured to determine the information about the first coordinate system relative to the second coordinate system based on the historical information and the second position change information of the measurement device.

Example a4.1: The memory 1402 of the map server stores the historical information of the first coordinate system relative to the second coordinate system. The processor 1401 is configured to receive the identifier of the measurement device and the second position change information of the measurement device through the communications interface 1403. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system.

The processor 1401 is further configured to: read the historical information of the first coordinate system relative to the second coordinate system from the memory 1402, and determine the information about the first coordinate system relative to the second coordinate system based on the second position change information of the measurement device and the historical information of the first coordinate system relative to the second coordinate system.

Example a4.2: The measurement device stores the historical information of the first coordinate system relative to the second coordinate system. The processor 1401 is further configured to: receive the historical information of the first coordinate system relative to the second coordinate system from the measurement device through the communications interface 1403, and receive the identifier of the measurement device and the second position change information of the measurement device from the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system. The processor 1401 is further configured to determine the information about the first coordinate system relative to the second coordinate system based on the second position change information of the measurement device and the historical information of the first coordinate system relative to the second coordinate system.

The processor 1401 is further configured to send a query request for the historical information of the first coordinate system relative to the second coordinate system to the measurement device through the communications interface 1403. The query request for the historical information of the first coordinate system relative to the second coordinate system is used to query position information that is of the measurement device in the second coordinate system and that is obtained when the measurement device measures the position of the historical target. The query request for the historical information of the first coordinate system relative to the second coordinate system includes the identifier of the measurement device and/or an identifier of the second coordinate system.

Example a4.3: The vehicle-mounted apparatus stores the historical information of the first coordinate system relative to the second coordinate system. The processor 1401 is further configured to: receive the historical information of the first coordinate system relative to the second coordinate system from the vehicle-mounted apparatus through the communications interface 1403, and receive the identifier of the measurement device and the second position change information of the measurement device from the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system. The processor 1401 is further configured to determine the information about the first coordinate system relative to the second coordinate system based on the second position change information of the measurement device and the historical information of the first coordinate system relative to the second coordinate system.

The processor 1401 is further configured to send a query request for the historical information of the first coordinate system relative to the second coordinate system to the vehicle-mounted apparatus through the communications interface 1403. The query request for the historical information of the first coordinate system relative to the second coordinate system is used to query position information that is of the measurement device in the second coordinate system and that is obtained when the measurement device measures the position of the historical target. The query request for the historical information of the first coordinate system relative to the second coordinate system includes the identifier of the measurement device and/or an identifier of the second coordinate system.

The processor 1401 is further configured to send a query request for the second position change information of the measurement device to the measurement device through the communications interface 1403. The query request for the second position change information of the measurement device is used to query a measurement position that is of the measurement device relative to the historical position and that is obtained when the measurement device determines the position of the measurement target in the first coordinate system. The query request for the second position change information of the measurement device includes the identifier of the measurement device and/or an identifier of the second coordinate system.

In a possible design, the processor 1401 is configured to receive the position of the measurement target in the first coordinate system from the measurement device through the communications interface 1403.

The processor 1401 is further configured to send a query request for the position of the measurement target in the first coordinate system to the measurement device through the communications interface 1403. The query request for the position of the measurement target in the first coordinate system is used to query a relative position relationship between the measurement device and the measurement target. The query request for the position of the measurement target in the first coordinate system includes the identifier of the measurement device and/or an identifier of the second coordinate system.

In a possible design, the processor 1401 is configured to send the position of the measurement target in the first coordinate system to the vehicle-mounted apparatus through the communications interface 1403.

The processor 1401 is further configured to receive, through the communications interface 1403, a query request that is for a position of a to-be-identified object in the first coordinate system and that is sent by the vehicle-mounted apparatus. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is the object in the preset range of the measurement device.

The processor 1401 is further configured to determine, based on position information of the measurement device in the first coordinate system, that the to-be-identified object includes at least the measurement target.

In a possible design, the processor 1401 is configured to send at least one of the position of the measurement target in the second coordinate system, the identifier of the second coordinate system, and the identifier of the measurement device to the vehicle-mounted apparatus through the communications interface 1403.

The processor 1401 is further configured to receive, through the communications interface 1403, a query request that is for a position of a to-be-identified object in the second coordinate system and that is sent by the vehicle-mounted apparatus. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system.

The processor 1401 is further configured to determine, based on position information of the measurement target in the second coordinate system, that the to-be-identified object includes at least the measurement target.

In an example, the positioning apparatus 1400 is configured to implement the steps performed by the measurement device in the procedures shown in FIG. 3 to FIG. 12. The positioning apparatus 1400 may be a measurement device, or a chip or a circuit in a measurement device. For example, the measurement device includes a road side unit, a measurement apparatus in a road side unit, a vehicle, or a measurement apparatus in a vehicle. The measurement device may be a road side unit, or may be a chip applied to a road side unit, or may be a measurement apparatus in a road side unit, or may be a chip applied to a measurement apparatus in a road side unit. Alternatively, the measurement device may be a vehicle having a function of the measurement device, or a chip applied to a vehicle having a function of the measurement device. Alternatively, the measurement device may be a measurement apparatus in a vehicle having a function of the measurement device, a chip applied to a measurement apparatus in a vehicle having a function of the measurement device, a combined component or part having a function of the measurement device in a vehicle-mounted apparatus, or another combined component or part having a function of the measurement device. The communications interface 1403 is configured to perform related receiving and sending operations on the measurement device side in the foregoing embodiment. The processor 1401 is configured to perform a related processing operation on the measurement device side in the foregoing method embodiment.

The processor 1401 is configured to: obtain a position of a measurement target in a first coordinate system, where the position of the measurement target in the first coordinate system is obtained by the measurement device through measurement; determine a position of a measurement target in a second coordinate system based on information about the first coordinate system relative to the second coordinate system and the position of the measurement target in the first coordinate system; and obtain the information about the first coordinate system relative to the second coordinate system, where the first coordinate system is a coordinate system used by the measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system; or obtain the information about the first coordinate system relative to the second coordinate system through the communications interface 1403. In a possible design, the processor 1401 is specifically configured to: obtain an identifier of the measurement device; and obtain the information about the first coordinate system relative to the second coordinate system based on the identifier of the measurement device. The identifier of the measurement device may include one or more of the following: a number of the measurement device in the second coordinate system, or a unique number of the measurement device.

Example b1: The memory 1402 of the measurement device stores the information about the first coordinate system relative to the second coordinate system. The processor 1401 reads, from the memory 1402, the information that is about the first coordinate system relative to the second coordinate system and that is obtained when the measurement device determines the position of the measurement target in the first coordinate system.

Example b2.1: The map server stores the information about the first coordinate system relative to the second coordinate system. The processor 1401 is configured to receive, from the map server through the communications interface 1403, the information that is about the first coordinate system relative to the second coordinate system and that is obtained when the measurement device determines the position of the measurement target in the first coordinate system.

The processor 1401 is further configured to send a query request for the information about the first coordinate system relative to the second coordinate system to the map server through the communications interface 1403. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

Example b2.2: The vehicle-mounted apparatus stores the information about the first coordinate system relative to the second coordinate system. The processor 1401 is configured to receive, from the vehicle-mounted apparatus through the communications interface 1403, the information that is about the first coordinate system relative to the second coordinate system and that is obtained when the measurement device determines the position of the measurement target in the first coordinate system.

The processor 1401 is further configured to send a query request for the information about the first coordinate system relative to the second coordinate system to the vehicle-mounted apparatus through the communications interface 1403. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

Example b3.1: The map server stores initial information of the first coordinate system relative to the second coordinate system. The processor 1401 is further configured to: read first position change information of the measurement device from the memory 1402, and receive the identifier of the measurement device and the initial information that is from the map server and that is of the first coordinate system relative to the second coordinate system through the communications interface 1403; and determine the information about the first coordinate system relative to the second coordinate system based on the first position change information of the measurement device and the initial information of the first coordinate system relative to the second coordinate system. The first position change information of the measurement device is used to indicate a difference between position information that is of the measurement device and that is obtained when the measurement device determines the position of the measurement target in the first coordinate system and the initial information. The identifier of the measurement device is used by the map server to determine the initial information of the first coordinate system relative to the second coordinate system.

The processor 1401 is further configured to send a query request for the initial information of the first coordinate system relative to the second coordinate system to the map server through the communications interface 1403. The query request for the initial information of the first coordinate system relative to the second coordinate system is used to query position information of an initial position of the measurement device in the second coordinate system. The query request for the initial information of the first coordinate system relative to the second coordinate system includes the identifier of the measurement device and/or an identifier of the second coordinate system.

Example b3.2: The memory 1402 of the measurement device stores the initial information of the first coordinate system relative to the second coordinate system. The processor 1401 is configured to: read the initial information that is of the measurement device and that is of the first coordinate system relative to the second coordinate system from the memory 1402, and read first position change information of the measurement device from the memory 1402; and determine the information about the first coordinate system relative to the second coordinate system based on the first position change information of the measurement device and the initial information of the first coordinate system relative to the second coordinate system.

Example b3.3: The vehicle-mounted apparatus stores the initial information of the first coordinate system relative to the second coordinate system. The processor 1401 is configured to: read first position change information of the measurement device from the memory 1402, and receive the initial information of the first coordinate system relative to the second coordinate system from the vehicle-mounted apparatus through the communications interface 1403; and determine the information about the first coordinate system relative to the second coordinate system based on the first position change information of the measurement device and the initial information of the first coordinate system relative to the second coordinate system.

The processor 1401 is further configured to send a query request for the initial information of the first coordinate system relative to the second coordinate system to the vehicle-mounted apparatus through the communications interface 1403. The query request for the initial information of the first coordinate system relative to the second coordinate system is used to query position information of an initial position of the measurement device in the second coordinate system. The query request for the initial information of the first coordinate system relative to the second coordinate system includes the identifier of the measurement device and/or an identifier of the second coordinate system.

Example b4.1: The map server stores historical information of the first coordinate system relative to the second coordinate system. The processor 1401 is further configured to: read first position change information of the measurement device from the memory 1402, and receive the identifier of the measurement device and second position change information of the measurement device through the communications interface 1403; and determine the information about the first coordinate system relative to the second coordinate system based on the second position change information of the measurement device and the historical information of the first coordinate system relative to the second coordinate system. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The identifier of the measurement device is used by the map server to determine the historical information of the first coordinate system relative to the second coordinate system.

The processor 1401 is further configured to send a query request for the historical information of the first coordinate system relative to the second coordinate system to the map server through the communications interface 1403. The query request for the historical information of the first coordinate system relative to the second coordinate system is used to query position information of a historical position of the measurement device in the second coordinate system. The query request for the historical information of the first coordinate system relative to the second coordinate system includes the identifier of the measurement device and/or an identifier of the second coordinate system.

Example b4.2: The memory 1402 of the measurement device stores historical information of the first coordinate system relative to the second coordinate system. The processor 1401 is configured to: read the historical information that is of the measurement device and that is of the first coordinate system relative to the second coordinate system from the memory 1402, and read second position change information of the measurement device from the memory 1402; and determine the information about the first coordinate system relative to the second coordinate system based on the second position change information of the measurement device and the historical information of the first coordinate system relative to the second coordinate system.

Example b4.3: The vehicle-mounted apparatus stores historical information of the first coordinate system relative to the second coordinate system. The processor 1401 is further configured to: read second position change information of the measurement device from the memory 1402, and receive the historical information of the first coordinate system relative to the second coordinate system from the vehicle-mounted apparatus through the communications interface 1403; and determine the information about the first coordinate system relative to the second coordinate system based on the second position change information of the measurement device and the historical information of the first coordinate system relative to the second coordinate system.

The processor 1401 is further configured to send a query request for the historical information of the first coordinate system relative to the second coordinate system to the vehicle-mounted apparatus through the communications interface 1403. The query request for the historical information of the first coordinate system relative to the second coordinate system is used to query position information of a historical position of the measurement device in the second coordinate system. The query request for the historical information of the first coordinate system relative to the second coordinate system includes the identifier of the measurement device and/or an identifier of the second coordinate system.

In a possible design, the processor 1401 is further configured to obtain the position of the measurement target in the first coordinate system through measurement by using a sensor.

The processor 1401 is further configured to receive, through the communications interface 1403, a query request for the position that is of the measurement target in the first coordinate system and that is sent by the map server. The query request for the position of the measurement target in the first coordinate system includes the identifier of the measurement device and/or the identifier of the second coordinate system.

In a possible design, the processor 1401 is configured to send the position of the measurement target in the first coordinate system to the vehicle-mounted apparatus through the communications interface 1403.

The processor 1401 is further configured to receive, through the communications interface 1403, a query request that is for a position of a to-be-identified object in the first coordinate system and that is sent by the vehicle-mounted apparatus. The to-be-identified object is an object in a preset range of the measurement device. The query request for the position of the to-be-identified object in the first coordinate system is used to query position information of the to-be-identified object in the first coordinate system. The query request for the position of the to-be-identified object in the first coordinate system includes the identifier of the measurement device. The to-be-identified object is the object in the preset range of the measurement device.

The processor 1401 is further configured to determine, based on position information of the measurement device in the first coordinate system, that the to-be-identified object includes at least the measurement target.

In a possible design, the processor 1401 is configured to send at least one of the position of the measurement target in the second coordinate system, the identifier of the second coordinate system, and the identifier of the measurement device to the vehicle-mounted apparatus through the communications interface 1403.

The processor 1401 is further configured to receive, through the communications interface 1403, a query request that is for a position of a to-be-identified object in the second coordinate system and that is sent by the vehicle-mounted apparatus. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system. The processor 1401 is further configured to determine, based on position information of the measurement target in the second coordinate system, that the to-be-identified object includes at least the measurement target.

In an example, the positioning apparatus 1400 is configured to implement the steps performed by the vehicle-mounted apparatus in the procedures shown in FIG. 3 to FIG. 12. The positioning apparatus 1400 may be a vehicle-mounted apparatus, a vehicle to which a vehicle-mounted apparatus belongs, or a chip or a circuit in a vehicle-mounted apparatus, or a chip or a circuit in a vehicle to which a vehicle-mounted apparatus belongs. The communications interface 1403 is configured to perform related receiving and sending operations of the vehicle-mounted apparatus in the foregoing embodiment. The processor 1401 is configured to perform a related processing operation of the vehicle-mounted apparatus in the foregoing method embodiment.

The processor 1401 is configured to: obtain information about a first coordinate system relative to a second coordinate system, where the first coordinate system is a coordinate system used by a measurement device, the second coordinate system is a coordinate system used by a map, and the information about the first coordinate system relative to the second coordinate system includes translation information and rotation information that are of the first coordinate system mapped to the second coordinate system; and the translation information is determined based on a position of the measurement device in the second coordinate system, and the rotation information is determined based on a posture of the measurement device in the second coordinate system; determine a position of the measurement target in the second coordinate system based on the information about the first coordinate system relative to the second coordinate system and a position of a measurement target in the first coordinate system; and obtain the position of the measurement target in the first coordinate system through the communications interface 1403, where the position of the measurement target in the first coordinate system is obtained by the measurement device through measurement.

In a possible design, the measurement device includes a road side unit, a measurement apparatus in a road side unit, a vehicle, or a measurement apparatus in a vehicle.

In a possible design, the processor 1401 is specifically configured to: obtain an identifier of the measurement device; and obtain the information about the first coordinate system relative to the second coordinate system based on the identifier of the measurement device. The identifier of the measurement device may include one or more of the following: a number of the measurement device in the second coordinate system, or a unique number of the measurement device.

Example c1: The memory 1402 of the positioning apparatus stores the information about the first coordinate system relative to the second coordinate system. The processor 1401 reads, from the memory 1402, the information that is about the first coordinate system relative to the second coordinate system and that is obtained when the measurement device determines the position of the measurement target in the first coordinate system.

Example c2.1: The map server stores the information about the first coordinate system relative to the second coordinate system. The processor 1401 is configured to receive, from the map server through the communications interface 1403, the information that is about the first coordinate system relative to the second coordinate system and that is obtained when the measurement device determines the position of the measurement target in the first coordinate system.

The processor 1401 is further configured to send a query request for the information about the first coordinate system relative to the second coordinate system to the map server through the communications interface 1403. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

Example c2.2: The measurement device stores the information about the first coordinate system relative to the second coordinate system. The processor 1401 is configured to receive, through the communications interface 1403, the information that is about the first coordinate system relative to the second coordinate system, that is obtained when the measurement device determines the position of the measurement target in the first coordinate system, and that is sent by the measurement device.

The processor 1401 is further configured to send a query request for the information about the first coordinate system relative to the second coordinate system to the measurement device through the communications interface 1403. The query request for the information about the first coordinate system relative to the second coordinate system is used to query the information that is about the first coordinate system relative to the second coordinate system and that is obtained when the measurement device determines the position of the measurement target in the first coordinate system. The request for the information about the first coordinate system relative to the second coordinate system includes the identifier of the measurement device and/or an identifier of the second coordinate system.

Example c3.1: The map server stores initial information of the first coordinate system relative to the second coordinate system. The processor 1401 is configured to receive, through the communications interface 1403, first position change information that is of the measurement device and that is sent by the measurement device. The first position change information of the measurement device is used to indicate a difference between position information that is of the measurement device and that is obtained when the measurement device determines the position of the measurement target in the first coordinate system and the initial information. The processor 1401 is configured to receive the initial information of the first coordinate system relative to the second coordinate system from the map server through the communications interface 1403; and determine the information about the first coordinate system relative to the second coordinate system based on the first position change information of the measurement device and the initial information of the first coordinate system relative to the second coordinate system.

The processor 1401 is further configured to send a query request for the first position change information of the measurement device to the map server through the communications interface 1403. The query request for the first position change information of the measurement device is used to query a measurement position that is of the measurement device relative to the initial position and that is obtained when the measurement device determines the position of the measurement target in the first coordinate system. The query request for the first position change information of the measurement device includes the identifier of the measurement device and/or an identifier of the second coordinate system.

In a possible implementation, the processor 1401 is further configured to send a query request for the initial information of the first coordinate system relative to the second coordinate system to the map server through the communications interface 1403; or send a query request for the initial information of the first coordinate system relative to the second coordinate system to the measurement device. The query request for the initial information of the first coordinate system relative to the second coordinate system is used to query an initial position of the measurement device in the second coordinate system. The query request for the initial information of the first coordinate system relative to the second coordinate system includes the identifier of the measurement device and/or an identifier of the second coordinate system.

Example c3.2: The measurement device stores initial information of the first coordinate system relative to the second coordinate system. The processor 1401 is configured to receive, through the communications interface 1403, first position change information that is of the measurement device and that is sent by the measurement device. The first position change information of the measurement device is used to indicate a difference between position information that is of the measurement device and that is obtained when the measurement device determines the position of the measurement target in the first coordinate system and the initial information; and determine the information about the first coordinate system relative to the second coordinate system based on the first position change information of the measurement device and the initial information of the first coordinate system relative to the second coordinate system. The processor 1401 is configured to receive the initial information of the first coordinate system relative to the second coordinate system from the measurement device through the communications interface 1403.

In a possible implementation, the processor 1401 is further configured to send a query request for the initial information of the first coordinate system relative to the second coordinate system to the measurement device through the communications interface 1403. The query request for the initial information of the first coordinate system relative to the second coordinate system is used to query an initial position of the measurement device in the second coordinate system. The query request for the initial information of the first coordinate system relative to the second coordinate system includes the identifier of the measurement device and/or an identifier of the second coordinate system.

Example c3.3: The memory 1402 of the positioning apparatus stores initial information of the first coordinate system relative to the second coordinate system. The processor 1401 is configured to receive, through the communications interface 1403, at least one of the following of the measurement device: first position change information of the measurement device, the identifier of the measurement device, and an identifier of the second coordinate system.

The processor 1401 is further configured to determine the information about the first coordinate system relative to the second coordinate system based on the first position change information of the measurement device and the initial information of the first coordinate system relative to the second coordinate system.

In a possible implementation, the processor 1401 is further configured to: send a query request for the first position change information of the measurement device to the map server through the communications interface 1403; or send a query request for the first position change information of the measurement device to the measurement device. The query request for the first position change information of the measurement device is used to query the first position change information that is of the measurement device in the second coordinate system and that is obtained when the measurement device determines the position of the measurement target in the first coordinate system. The query request for the first position change information of the measurement device includes the identifier of the measurement device and/or an identifier of the second coordinate system.

Example c4.1: The map server stores historical information of the first coordinate system relative to the second coordinate system. The processor 1401 is configured to receive, through the communications interface 1403, second position change information that is of the measurement device and that is sent by the measurement device. The second position change information of the measurement device is used to indicate a difference between position information that is of the measurement device and that is obtained when the measurement device determines the position of the measurement target in the first coordinate system and the historical information. The processor 1401 is further configured to receive the historical information of the first coordinate system relative to the second coordinate system from the map server through the communications interface 1403; and determine the information about the first coordinate system relative to the second coordinate system based on the second position change information of the measurement device and the historical information of the first coordinate system relative to the second coordinate system.

In a possible implementation, the processor 1401 is further configured to send a query request for the historical information of the first coordinate system relative to the second coordinate system to the map server through the communications interface 1403; or send a query request for the historical information of the first coordinate system relative to the second coordinate system to the measurement device. The query request for the historical information of the first coordinate system relative to the second coordinate system is used to query a historical position of the measurement device in the second coordinate system. The query request for the historical information of the first coordinate system relative to the second coordinate system includes the identifier of the measurement device and/or an identifier of the second coordinate system.

Example c4.2: The measurement device stores initial information of the first coordinate system relative to the second coordinate system. The processor 1401 is configured to receive, through the communications interface 1403, second position change information that is of the measurement device and that is sent by the measurement device. The second position change information of the measurement device is used to indicate a difference between position information that is of the measurement device and that is obtained when the measurement device determines the position of the measurement target in the first coordinate system and position information that is of the measurement device and that is obtained when the measurement device measures a position of a historical target. The processor 1401 is further configured to receive the historical information of the first coordinate system relative to the second coordinate system from the measurement device through the communications interface 1403; and determine the information about the first coordinate system relative to the second coordinate system based on the second position change information of the measurement device and the historical information of the first coordinate system relative to the second coordinate system.

In a possible implementation, the processor 1401 is further configured to send a query request for the historical information of the first coordinate system relative to the second coordinate system to the measurement device through the communications interface 1403. The query request for the historical information of the first coordinate system relative to the second coordinate system is used to query a historical position of the measurement device in the second coordinate system. The query request for the initial information of the first coordinate system relative to the second coordinate system includes the identifier of the measurement device and/or an identifier of the second coordinate system.

Example c4.3: The memory 1402 of the positioning apparatus stores historical information of the first coordinate system relative to the second coordinate system. The processor 1401 is configured to receive, through the communications interface 1403, at least one of the following of the measurement device: second position change information of the measurement device, the identifier of the measurement device, and an identifier of the second coordinate system. The processor 1401 is further configured to determine the information about the first coordinate system relative to the second coordinate system based on the second position change information of the measurement device and the historical information of the first coordinate system relative to the second coordinate system.

In a possible implementation, the processor 1401 is further configured to: send a query request for the second position change information of the measurement device to the map server through the communications interface 1403; or send a query request for the second position change information of the measurement device to the measurement device. The query request for the second position change information of the measurement device is used to query the first position change information that is of the measurement device in the second coordinate system and that is obtained when the measurement device determines the position of the measurement target in the first coordinate system. The query request for the second position change information of the measurement device includes the identifier of the measurement device and/or an identifier of the second coordinate system.

Example B2.1: The processor 1401 is configured to receive the position of the measurement target in the first coordinate system from the map server through the communications interface 1403.

The processor 1401 is further configured to send a query request for a position of a to-be-identified object in the first coordinate system to the map server through the communications interface 1403. The request for the position of the to-be-identified object in the first coordinate system is used to query position information of the to-be-identified object in the first coordinate system. The to-be-identified object is an object in a preset range of the measurement device. The query request for the position of the to-be-identified object in the first coordinate system includes the identifier of the measurement device.

Example B2.2: The processor 1401 is configured to receive the position of the measurement target in the first coordinate system from the measurement device through the communications interface 1403.

The processor 1401 is further configured to send a query request for a position of a to-be-identified object in the first coordinate system to the measurement device through the communications interface 1403. The request for the position of the to-be-identified object in the first coordinate system is used to query position information of the to-be-identified object in the first coordinate system. The to-be-identified object is an object in a preset range of the measurement device. The query request for the position of the to-be-identified object in the first coordinate system includes the identifier of the measurement device.

Example a: The processor 1401 is configured to receive at least one of the position of the measurement target in the second coordinate system, the identifier of the second coordinate system, and the identifier of the measurement device from the map server through the communications interface 1403.

The processor 1401 is further configured to send a query request for a position of a to-be-identified object in the second coordinate system to the map server through the communications interface 1403. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system.

Example b: The processor 1401 is configured to receive, through the communications interface 1403, at least one of the position of the measurement target in the second coordinate system, the identifier of the second coordinate system, and the identifier of the measurement device that are sent by the measurement device.

The processor 1401 is further configured to send a query request for a position of a to-be-identified object in the second coordinate system to the measurement device through the communications interface 1403. The request for the position of the to-be-identified object in the second coordinate system is used to query position information of the to-be-identified object in the second coordinate system. The to-be-identified object is an object in a preset range of the measurement device. The query request for the position of the to-be-identified object in the second coordinate system includes the identifier of the measurement device and/or the identifier of the second coordinate system.

In the embodiments of this application, the processor may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by a combination of hardware in the processor and a software module.

In the embodiments of this application, the memory may be a nonvolatile memory, such as a hard disk drive (HDD) or a solid-state drive (SSD), or may be a volatile memory, such as a random access memory (RAM). The memory is any other medium that can be used to carry or store expected program code in a form of an instruction or a data structure and that can be accessed by a computer, but is not limited thereto. The memory in the embodiments of this application may alternatively be a circuit or any other apparatus that can implement a storage function, and is configured to store a program instruction and/or data.

All or some of the foregoing methods in the embodiments of this application may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present application are all or partially generated. The computer may be a general-purpose computer, a dedicated computer, a computer network, a network device, user equipment, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

In the embodiments of this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "I" usually indicates an "or" relationship between the associated objects. "At least one of the following" or a similar expression thereof indicates any combination of the following, including any combination of one or more of the following. For example, at least one of a, b, or c may represent: a, b, c, a and b, a and c, b and c, or a, b, and c, and a, b, and c may be singular or plural.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer usable storage media (including but not limited to a magnetic disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In the several embodiments provided in this application, it should be understood that the disclosed apparatus and method may be implemented in other manners without departing from the scope of this application. For example, the embodiments described above are merely examples. For example, division into the modules or units is merely logical function division, and may be other division in an actual implementation. For example, a plurality of units or components may be combined or integrated into another system, or some features may be ignored or not performed. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of the embodiments. A person of ordinary skill in the art may understand and implement the embodiments without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical, or another form.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A positioning method applied to a positioning apparatus to obtain real-time positioning information of a measurement target for autonomous driving of a vehicle, wherein the positioning apparatus comprises at least one processor and at least one memory coupled to the at least one processor and storing program instructions, which when executed by the at least one processor, cause the positioning apparatus to implement operations comprising:

obtaining, by the positioning apparatus, information about a first coordinate system relative to a second coordinate system, wherein the first coordinate system is a coordinate system used by a measurement device, the second coordinate system is a coordinate system used by a map server, and the information comprises translation information and rotation information that are of the first coordinate system mapped to the second coordinate system, wherein the translation information is determined based on the position of the measurement device in the second coordinate system, wherein the rotation information is determined based on a posture of the measurement device in the second coordinate system;

obtaining, by the positioning apparatus, a position of the measurement target in the first coordinate system, wherein the position of the measurement target in the first coordinate system is obtained by the measurement device through measurement;

determining, by the positioning apparatus, a real-time position of the measurement target in the second coordinate system based on the information and the position of the measurement target in the first coordinate system, wherein the obtaining the information about the first coordinate system relative to the second coordinate system comprises:

obtaining initial information of the first coordinate system relative to the second coordinate system, wherein the initial information is determined based on an initial position and an initial posture that are of the measurement device in the second coordinate system;

obtaining a position change of a position in which the measurement device measures the measurement target and that is relative to the initial position, and obtaining a posture change of a posture in which the measurement device measures the measurement target and that is relative to the initial posture; and determining the information based on the initial information, the position change, and the posture change, wherein the positioning method further comprises: controlling the vehicle to perform autonomous driving based on the information.

2. The method according to claim 1, wherein the measurement device comprises a road side unit, a measurement apparatus in the road side unit, the vehicle, or a measurement apparatus in the vehicle.

3. The method according to claim 1, wherein the method is applied to a map server, a road side unit, or the vehicle.

4. The method according to claim 1, wherein the obtaining the information about the first coordinate system relative to the second coordinate system comprises:

reading the information from the at least one memory.

5. The method according to claim 1, wherein the obtaining the information about the first coordinate system relative to the second coordinate system comprises:

receiving the information through a receiver.

6. The method according to claim 1, wherein the obtaining the position of the measurement target in the first coordinate system comprises:

obtaining the position of the measurement target in the first coordinate system through measurement by a sensor.

7. The method according to claim 1, wherein the obtaining the position of the measurement target in the first coordinate system comprises:

receiving the position of the measurement target in the first coordinate system through a receiver.

8. The method according to claim 1, wherein the rotation information further comprises at least one of:

a rotation matrix from the second coordinate system to the first coordinate system, a rotation matrix from the first coordinate system to the second coordinate system, Euler angles of the first coordinate system with respect to the second coordinate system, Euler angles of the second coordinate system with respect to the first coordinate system, a rotation vector from the second coordinate system to the first coordinate system, or a rotation vector from the first coordinate system to the second coordinate system.

9. The method according to claim 1, wherein the information about the first coordinate system relative to the second coordinate system is different from information about the first coordinate system relative to other different second coordinate systems used by different maps.

10. The method according to claim 1, wherein the initial information includes initial translation transformation information comprising a translation vector from the first coordinate system to the second coordinate system, and the translation vector is prestored in the measurement device.

11. A positioning apparatus comprising:

at least one processor; and at least one memory coupled to the at least one processor and storing program instructions which are executed by the at least one processor and cause the positioning apparatus for autonomous driving of a vehicle to implement operations including:

obtaining information about a first coordinate system relative to a second coordinate system, wherein the first coordinate system is a coordinate system used by a measurement device, the second coordinate system is a coordinate system used by a map, and the information comprises translation information and rotation information that are of the first coordinate system mapped to the second coordinate system, wherein the translation information is determined based on a position of the measurement device in the second coordinate system, wherein the rotation information is determined based on a posture of the measurement device in the second coordinate system;

obtaining a position of a measurement target in the first coordinate system, wherein the position of the measurement target in the first coordinate system is obtained by the measurement device through measurement;

determining a real-time position of the measurement target in the second coordinate system based on the information and the position of the measurement target in the first coordinate system, wherein the obtaining the information about the first coordinate system relative to the second coordinate system comprises:

obtaining initial information of the first coordinate system relative to the second coordinate system, wherein the initial information is determined based on an initial position and an initial posture that are of the measurement device in the second coordinate system;

obtaining a position change of a position in which the measurement device measures the measurement target and that is relative to the initial position, and obtaining a posture change of a posture in which the measurement device measures the measurement target and that is relative to the initial posture; and determining the information based on the initial information, the position change, and the posture change, wherein the operations further comprise: controlling the vehicle to perform autonomous driving based on the information.

12. The apparatus according to claim 11, wherein the measurement device comprises a road side unit, a measurement apparatus in the road side unit, the vehicle, or a measurement apparatus in the vehicle.

13. The apparatus according to claim 11, wherein the apparatus is a map server, a road side unit, or the vehicle.

14. The apparatus according to claim 11, wherein the operations further include:

reading the information from the at least one memory.

15. The apparatus according to claim 11, wherein the operations further include:

receiving the information through a receiver.

16. The apparatus according to claim 11, wherein the operations further include:

obtaining the position of the measurement target in the first coordinate system through measurement by a sensor.

17. The apparatus according to claim 11, wherein the operations further include:

receiving the position of the measurement target in the first coordinate system through a receiver.

18. The apparatus according to claim 11, wherein the rotation information comprises at least one of:

a rotation matrix from the second coordinate system to the first coordinate system, a rotation matrix from the first coordinate system to the second coordinate system, Euler angles of the first coordinate system with respect to the second coordinate system, Euler angles of the second coordinate system with respect to the first coordinate system, a rotation vector from the second coordinate system to the first coordinate system, or a rotation vector from the first coordinate system to the second coordinate system.

19. The apparatus according to claim 11, wherein the information about the first coordinate system relative to the second coordinate system is different from information about the first coordinate system relative to other different second coordinate systems used by different maps.

20. The apparatus according to claim 11, wherein the initial information includes initial translation transformation information comprising a translation vector from the first coordinate system to the second coordinate system, and the translation vector is prestored in the measurement device.

21. A non-transitory computer-readable medium comprising computer-executable instructions which are executed by at least one processor, and cause a positioning apparatus for autonomous driving of a vehicle to implement operations including:

obtaining information about a first coordinate system relative to a second coordinate system, wherein the first coordinate system is a coordinate system used by a measurement device, the second coordinate system is a coordinate system used by a map, and the information comprises translation information and rotation information that are of the first coordinate system mapped to the second coordinate system, wherein the translation information is determined based on a position of the measurement device in the second coordinate system, wherein the rotation information is determined based on a posture of the measurement device in the second coordinate system;

obtaining a position of a measurement target in the first coordinate system, wherein the position of the measurement target in the first coordinate system is obtained by the measurement device through measurement;

determining a real-time position of the measurement target in the second coordinate system based on the information and the position of the measurement target in the first coordinate system, wherein the obtaining the information about the first coordinate system relative to the second coordinate system comprises:

obtaining initial information of the first coordinate system relative to the second coordinate system, wherein the initial information is determined based on an initial position and an initial posture that are of the measurement device in the second coordinate system;

obtaining a position change of a position in which the measurement device measures the measurement target and that is relative to the initial position, and obtaining a posture change of a posture in which the measurement device measures the measurement target and that is relative to the initial posture; and determining the information based on the initial information, the position change, and the posture change, wherein the operations further comprise: controlling the vehicle to perform autonomous driving based on the information.

22. The non-transitory computer-readable medium according to claim 21, wherein the measurement device comprises a road side unit, a measurement apparatus in the road side unit, the vehicle, or a measurement apparatus in the vehicle.

23. The non-transitory computer-readable medium according to claim 21, wherein the positioning apparatus is a map server, a road side unit, or the vehicle.

24. The non-transitory computer-readable medium according to claim 21, wherein the operations further include:

reading the information from a memory.

25. The non-transitory computer-readable medium according to claim 21, wherein the operations further include:

receiving the information through a receiver.

26. The non-transitory computer-readable medium according to claim 21, wherein the operations further include:

obtaining the position of the measurement target in the first coordinate system through measurement by a sensor.

27. The non-transitory computer-readable medium according to claim 21, wherein the operations further include:

receiving the position of the measurement target in the first coordinate system through a receiver.

28. The non-transitory computer-readable medium according to claim 21, wherein the rotation information comprises at least one of:

a rotation matrix from the second coordinate system to the first coordinate system, a rotation matrix from the first coordinate system to the second coordinate system, Euler angles of the first coordinate system with respect to the second coordinate system, Euler angles of the second coordinate system with respect to the first coordinate system, a rotation vector from the second coordinate system to the first coordinate system, or a rotation vector from the first coordinate system to the second coordinate system.

29. The non-transitory computer-readable medium according to claim 21, wherein the information about the first coordinate system relative to the second coordinate system is different from information about the first coordinate system relative to other different second coordinate systems used by different maps.

30. The non-transitory computer-readable medium according to claim 21, wherein the initial information includes initial translation transformation information comprising a translation vector from the first coordinate system to the second coordinate system, and the translation vector is prestored in the measurement device.

* * * * *